United States Patent
Kang et al.

(10) Patent No.: US 12,256,342 B2
(45) Date of Patent: Mar. 18, 2025

(54) METHOD FOR REPORTING POWER INFORMATION IN WIRELESS COMMUNICATION SYSTEM AND DEVICE THEREFOR

(71) Applicant: LG ELECTRONICS INC., Seoul (KR)

(72) Inventors: Jiwon Kang, Seoul (KR); Jonghyun Park, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 608 days.

(21) Appl. No.: 17/604,688

(22) PCT Filed: Apr. 27, 2020

(86) PCT No.: PCT/KR2020/005498
§ 371 (c)(1),
(2) Date: Oct. 18, 2021

(87) PCT Pub. No.: WO2020/218900
PCT Pub. Date: Oct. 29, 2020

(65) Prior Publication Data
US 2022/0217654 A1    Jul. 7, 2022

Related U.S. Application Data

(60) Provisional application No. 62/838,324, filed on Apr. 25, 2019.

(51) Int. Cl.
*H04W 52/36* (2009.01)
*H04W 52/14* (2009.01)

(52) U.S. Cl.
CPC ......... *H04W 52/365* (2013.01); *H04W 52/14* (2013.01); *H04W 52/367* (2013.01)

(58) Field of Classification Search
CPC .. H04W 52/365; H04W 52/14; H04W 52/367
See application file for complete search history.

(56) References Cited

U.S. PATENT DOCUMENTS 9,220,072 B2    12/2015    Hsu et al.
2011/0250918 A1*  10/2011    Jen .................... H04W 52/365
                                                                        455/517
(Continued)

FOREIGN PATENT DOCUMENTS

KR    10-2019-0025900 A    3/2019
KR    10-2019-0039398 A    4/2019

OTHER PUBLICATIONS

International Search Report from PCT/KR2020/005498 dated Aug. 11, 2020.
(Continued)

*Primary Examiner* — Walter J Divito
(74) *Attorney, Agent, or Firm* — BRYAN CAVE LEIGHTON PAISNER LLP

(57) ABSTRACT

Proposed are a method for reporting power information in a wireless communication system and a device therefor. In detail, the method, performed by a terminal, comprises the steps of: receiving power report configuration information from a base station; and reporting power information to the base station on the basis of the power report configuration information, wherein the terminal comprises a plurality of panels, and the power information can comprise power headroom information regarding the plurality of panels and maximum transmission power information regarding the plurality of panels.

20 Claims, 22 Drawing Sheets

(56) References Cited

U.S. PATENT DOCUMENTS

2020/0022094 A1*  1/2020  You .................. H04W 72/21
2020/0229104 A1*  7/2020  MolavianJazi ..... H04W 52/146

OTHER PUBLICATIONS

Written Opinion of the ISA from PCT/KR2020/005498, dated Aug. 11, 2020.
ITRI, 'Power headroom reporting issue for sTTI operation', R1-1702386, 3GPP TSG RAN WG1 Meeting #88, Athens, Greece, Feb. 3, 2017; pp. 1-2.
Samsung, 'Extended PHR for NB-IoT', R1-1801940, 3GPP TSG RAN WG1 Meeting #92, Athens, Greece, Feb. 16, 2018, pp. 1-3.

* cited by examiner

[FIG. 1]
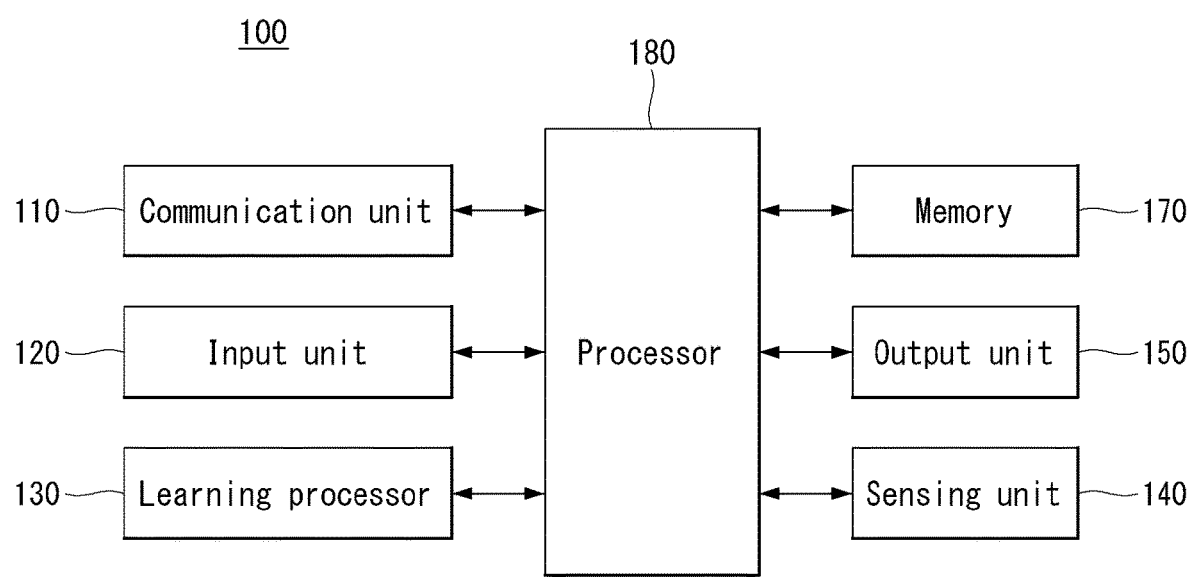

[FIG. 2]
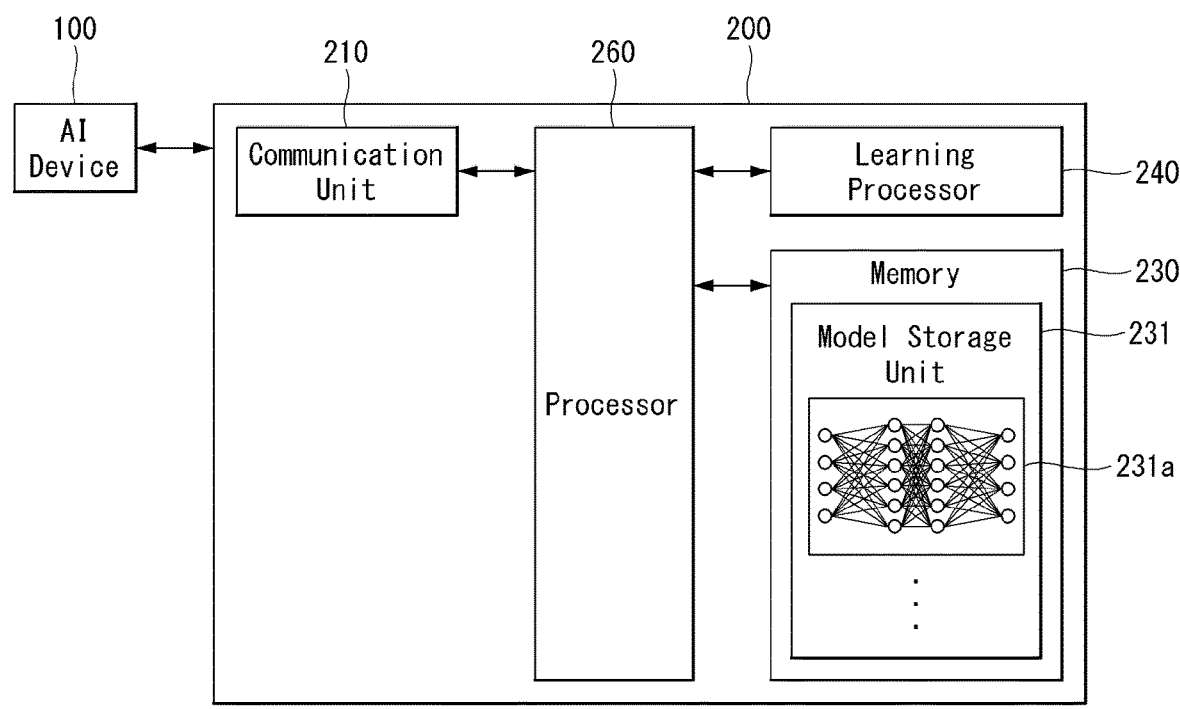

[FIG. 3]
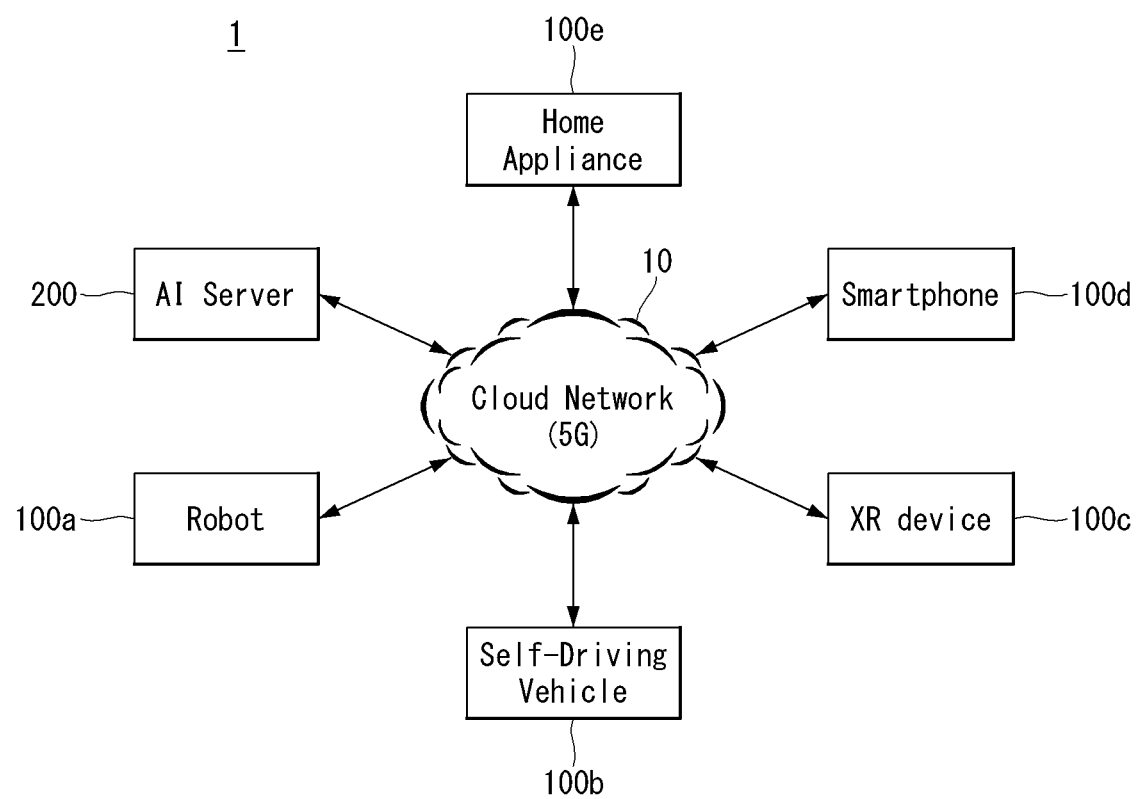

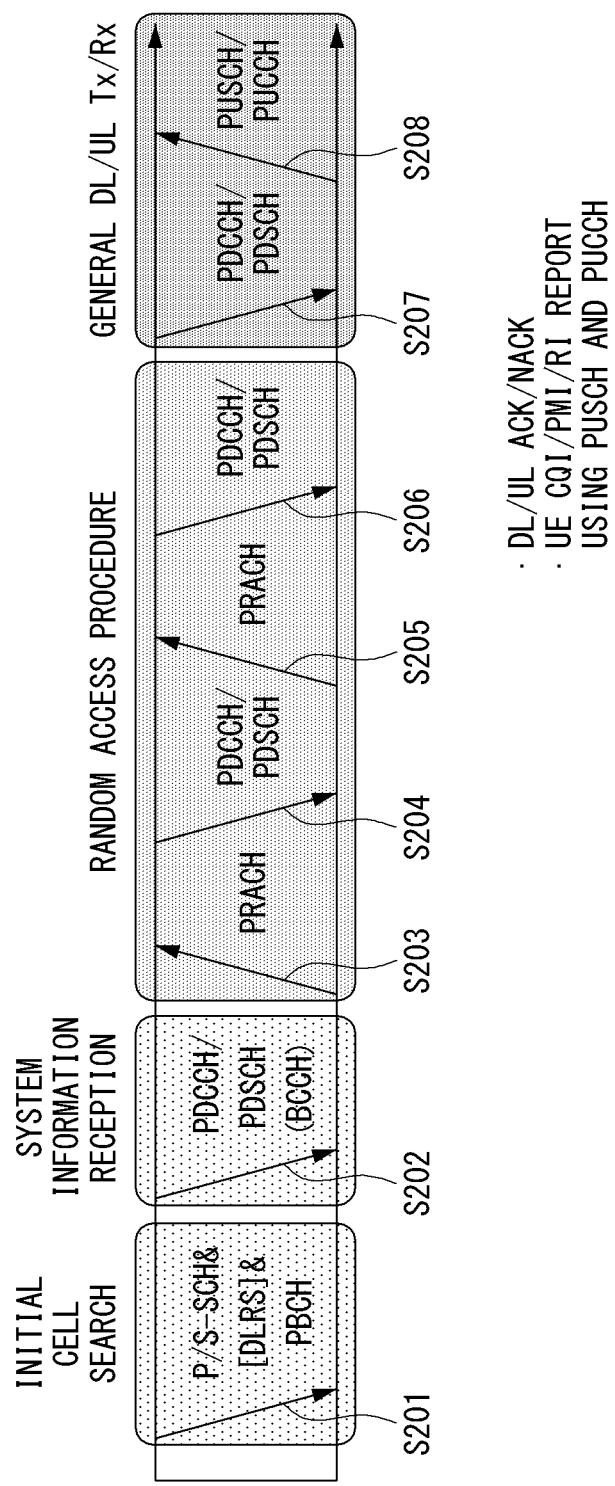
[FIG. 4]

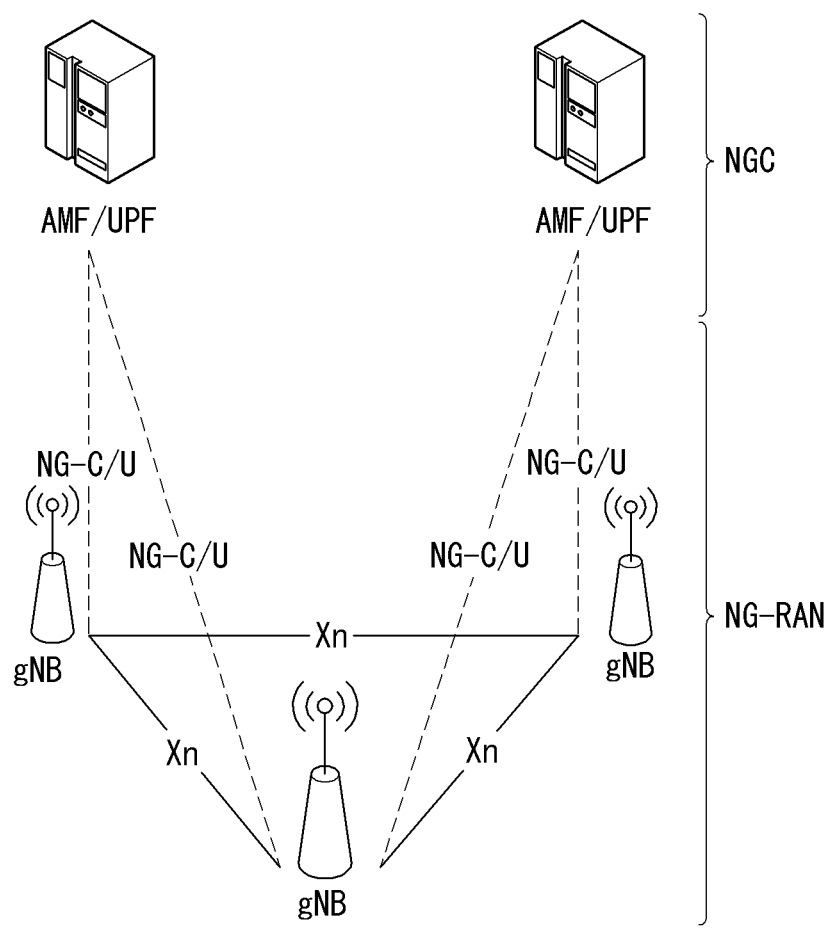
[FIG. 5]

[FIG. 6]
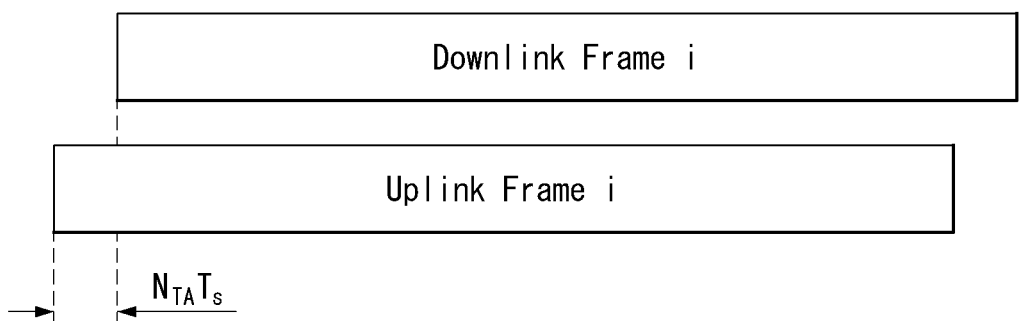

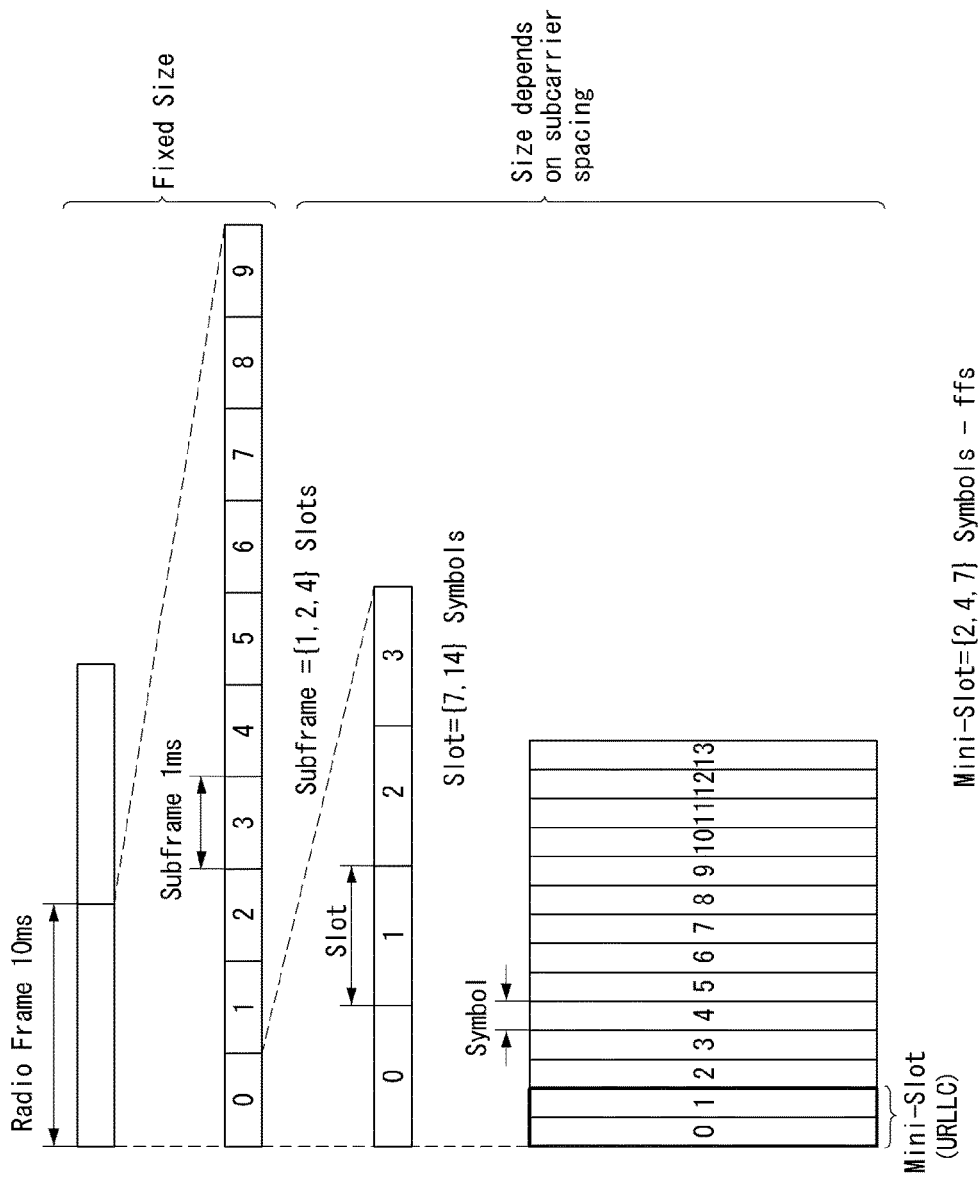

[FIG. 8]
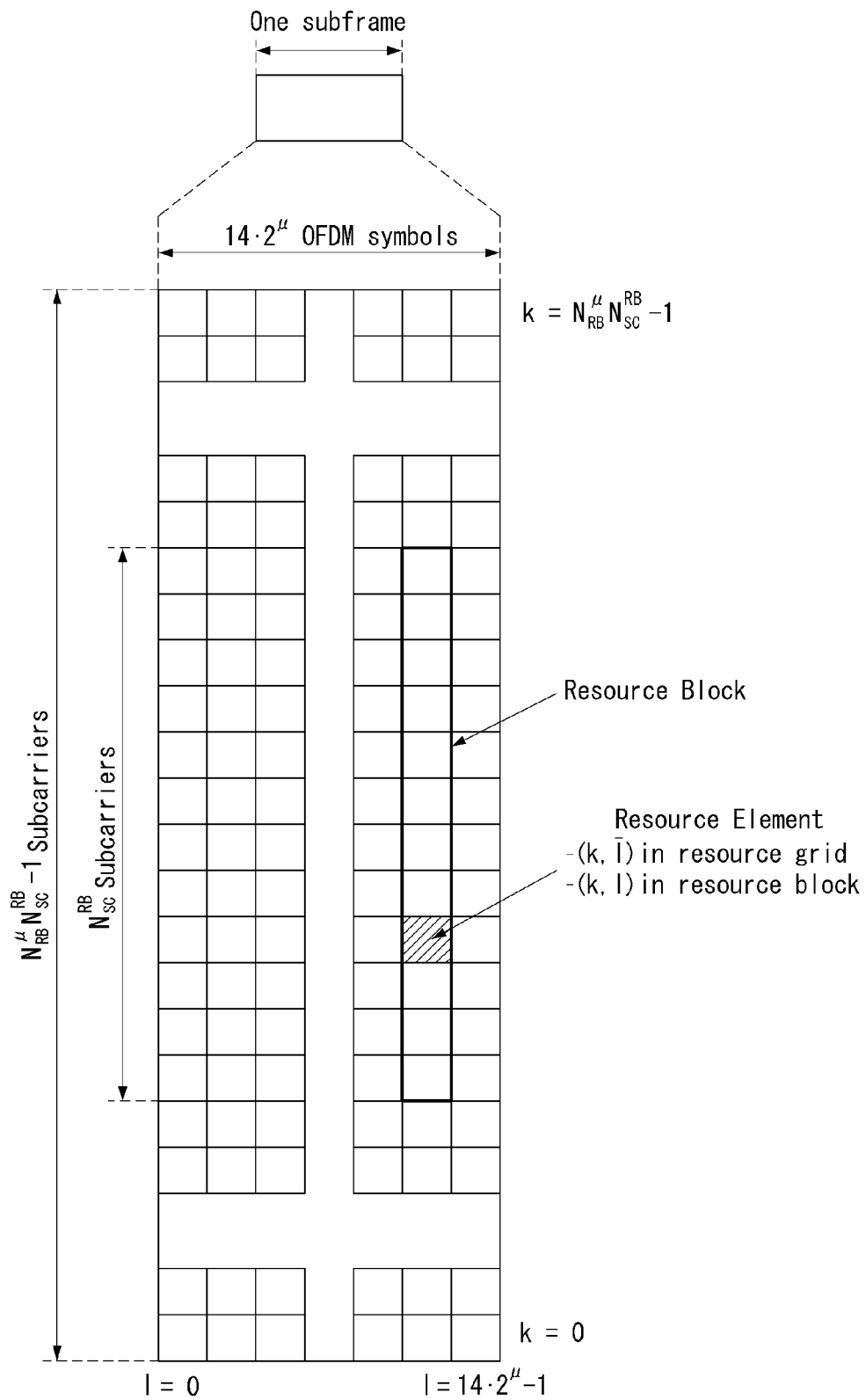

[FIG. 9]
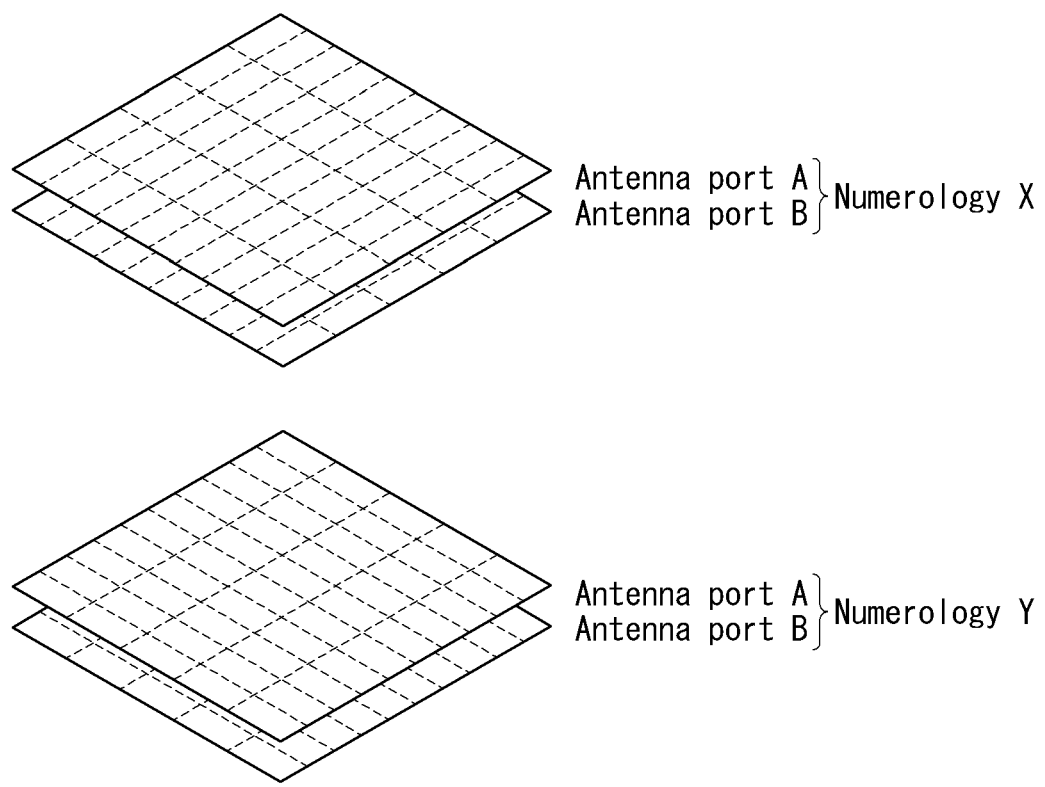

[FIG. 10]
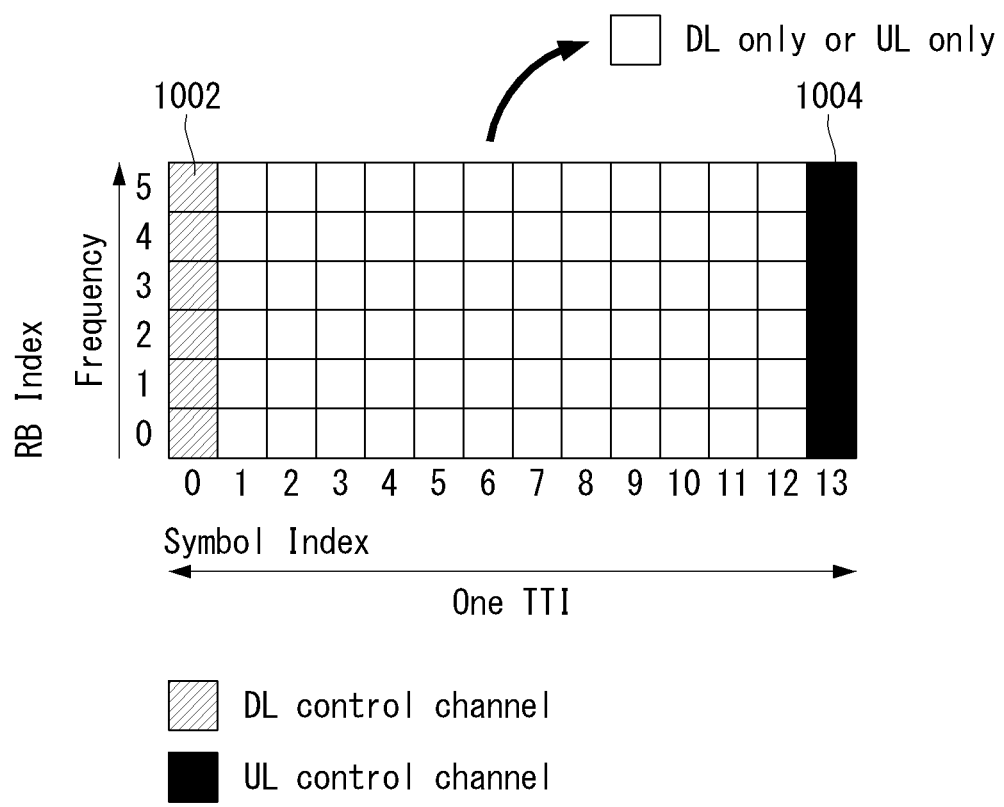

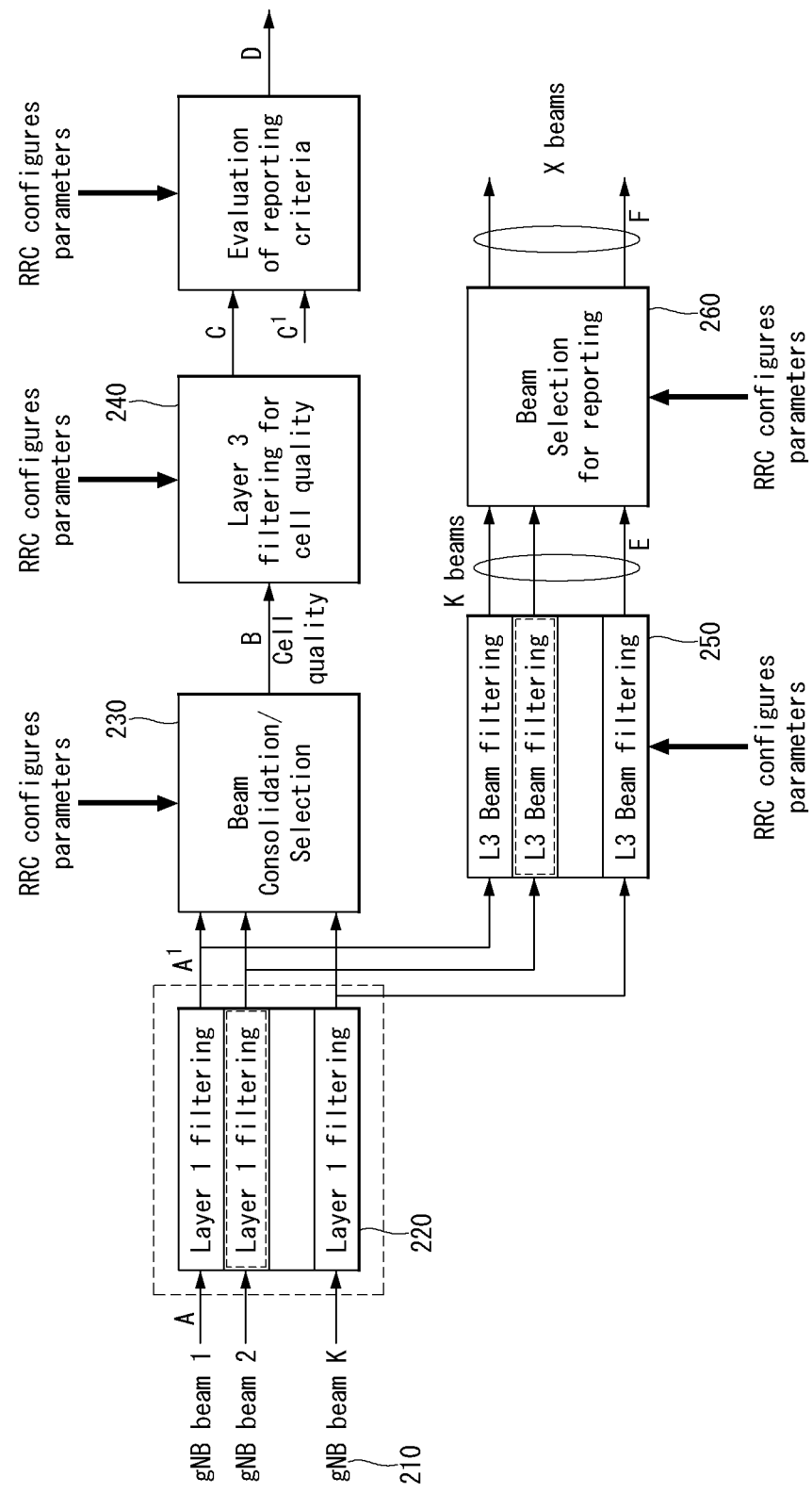
[FIG. 11]

[FIG. 12]
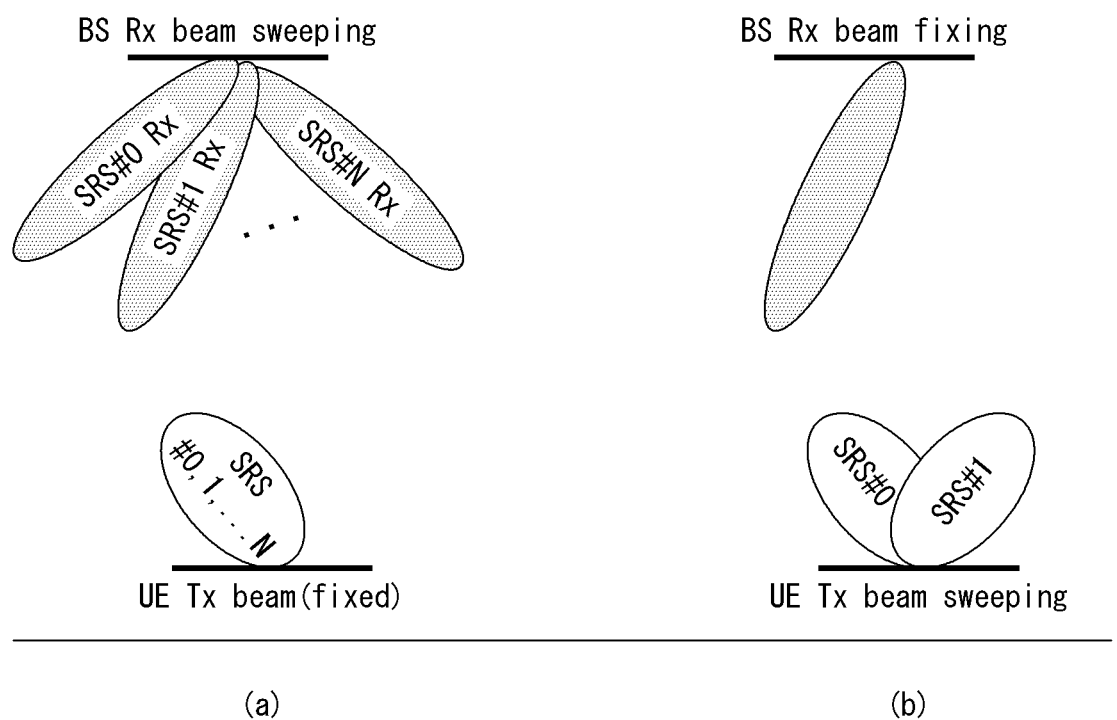

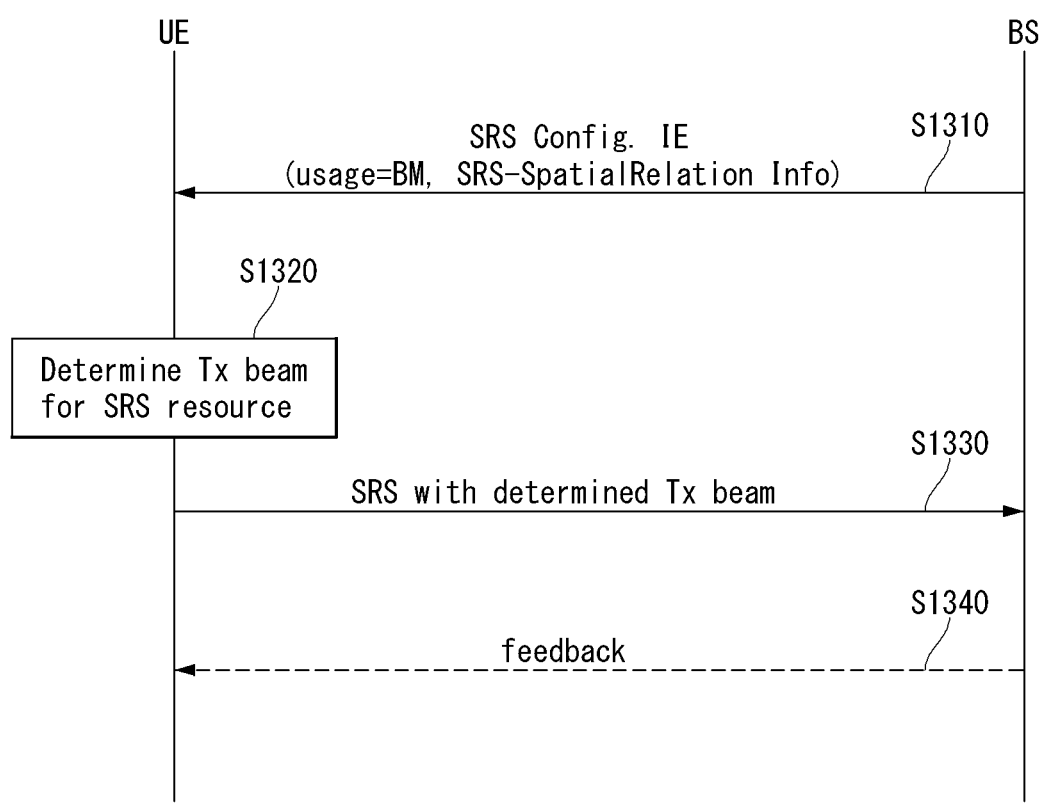
[FIG. 13]

[FIG. 14]
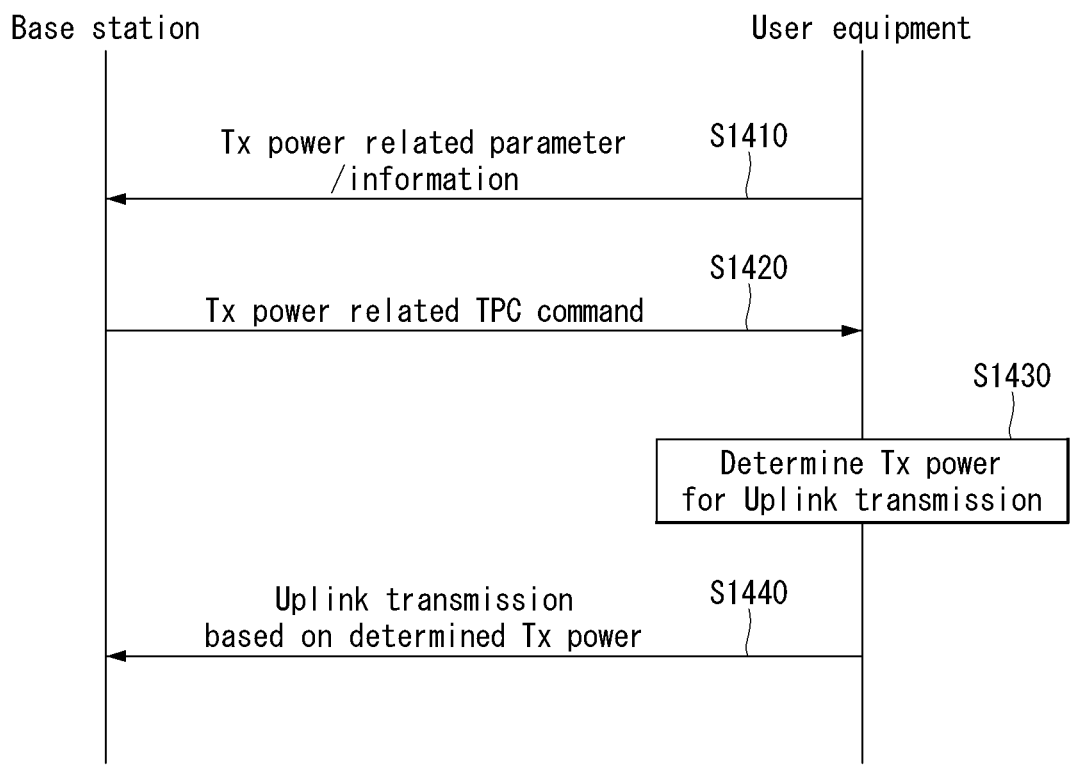
[FIG. 15]
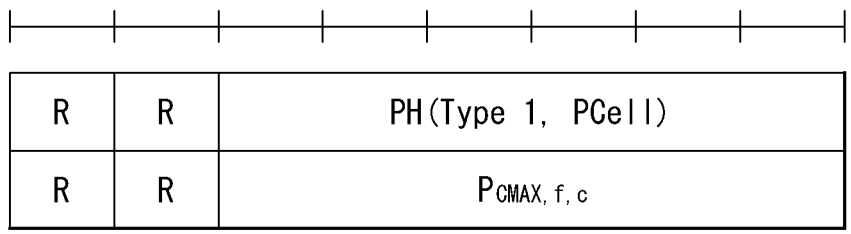

[FIG. 16]

| C7 | C6 | C5 | C4 | C3 | C2 | C1 | R |
|----|----|----|----|----|----|----|---|
| P | V | \multicolumn{5}{|c|}{PH(Type 2, SpCell of the other MAC entity)} | | | | | |
| R | R | \multicolumn{5}{|c|}{$P_{CMAX,f,c}$ 1} | | | | | |
| P | V | \multicolumn{5}{|c|}{PH(Type 1, PCell)} | | | | | |
| R | R | \multicolumn{5}{|c|}{$P_{CMAX,f,c}$ 2} | | | | | |
| P | V | \multicolumn{5}{|c|}{PH(Type X, Serving Cell 1)} | | | | | |
| R | R | \multicolumn{5}{|c|}{$P_{CMAX,f,c}$ 3} | | | | | |

...

| P | V | PH(Type X, Serving Cell n) |
| R | R | $P_{CMAX,f,c}$ m |

[FIG. 17]

| C7 | C6 | C5 | C4 | C3 | C2 | C1 | R |
|---|---|---|---|---|---|---|---|
| C15 | C14 | C13 | C12 | C11 | C10 | C9 | C8 |
| C23 | C22 | C21 | C20 | C19 | C18 | C17 | C16 |
| C31 | C30 | C29 | C28 | C27 | C26 | C25 | C24 |
| P | V | PH(Type 2, SpCell of the other MAC entity) | | | | | |
| R | R | $P_{CMAX,f,c}$ 1 | | | | | |
| P | V | PH(Type 1, PCell) | | | | | |
| R | R | $P_{CMAX,f,c}$ 2 | | | | | |
| P | V | PH(Type X, Serving Cell 1) | | | | | |
| R | R | $P_{CMAX,f,c}$ 3 | | | | | |

...

| P | V | PH(Type X, Serving Cell n) | | | | | |
|---|---|---|---|---|---|---|---|
| R | R | $P_{CMAX,f,c}$ m | | | | | |

[FIG. 18]
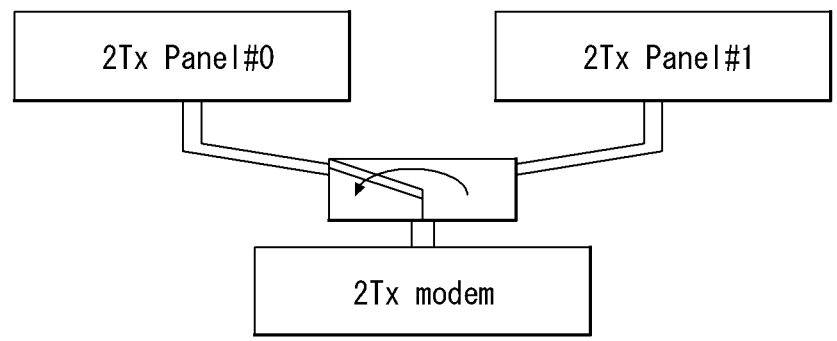
[FIG. 19]
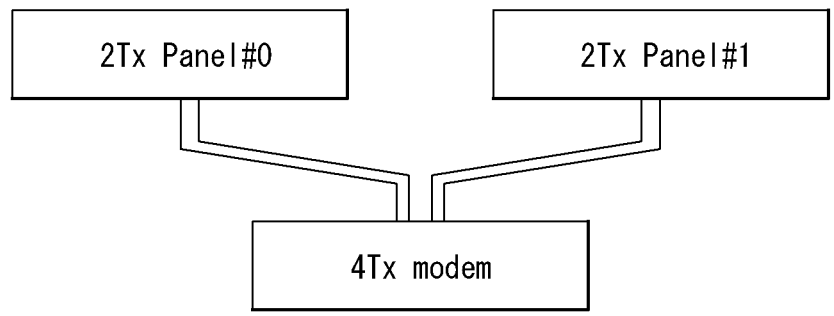

[FIG. 20]
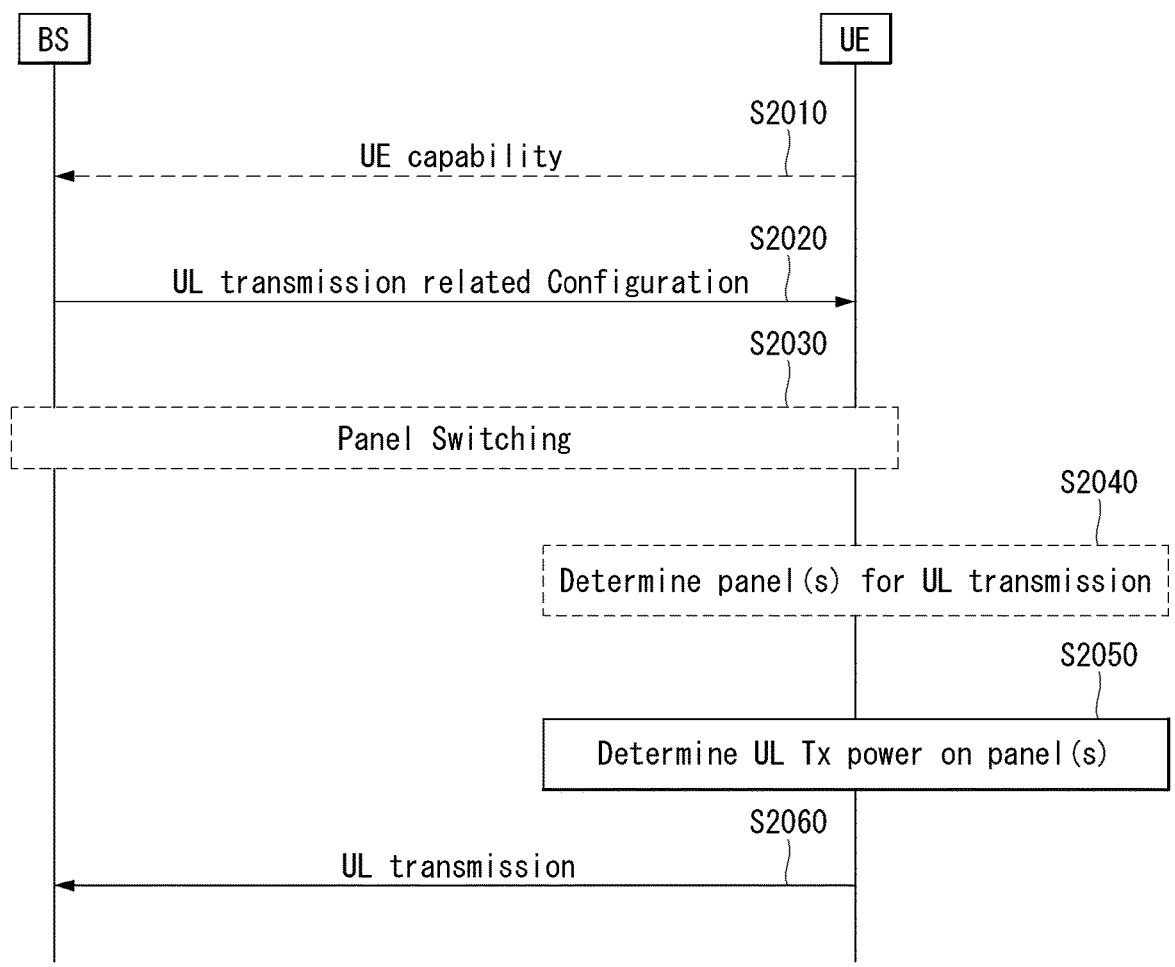

[FIG. 21]
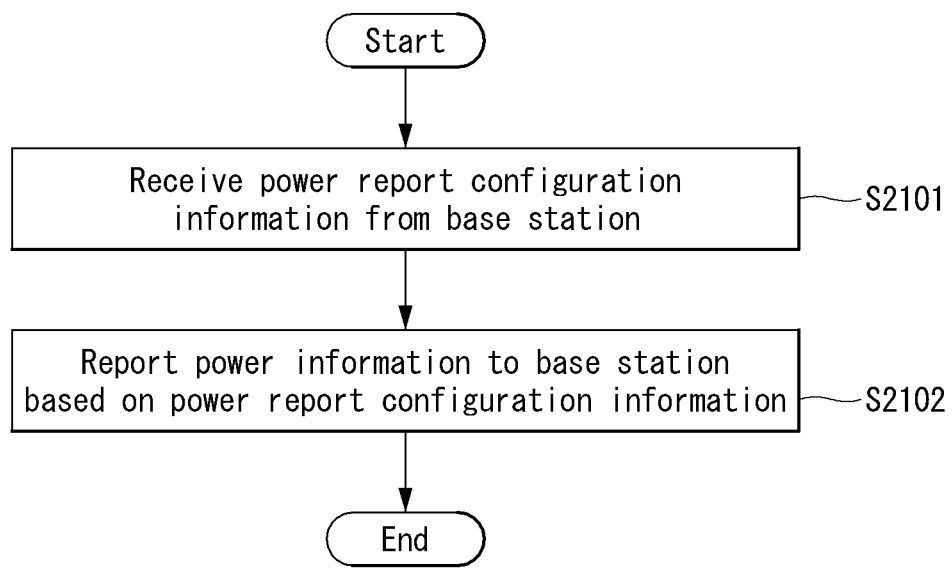
[FIG. 22]
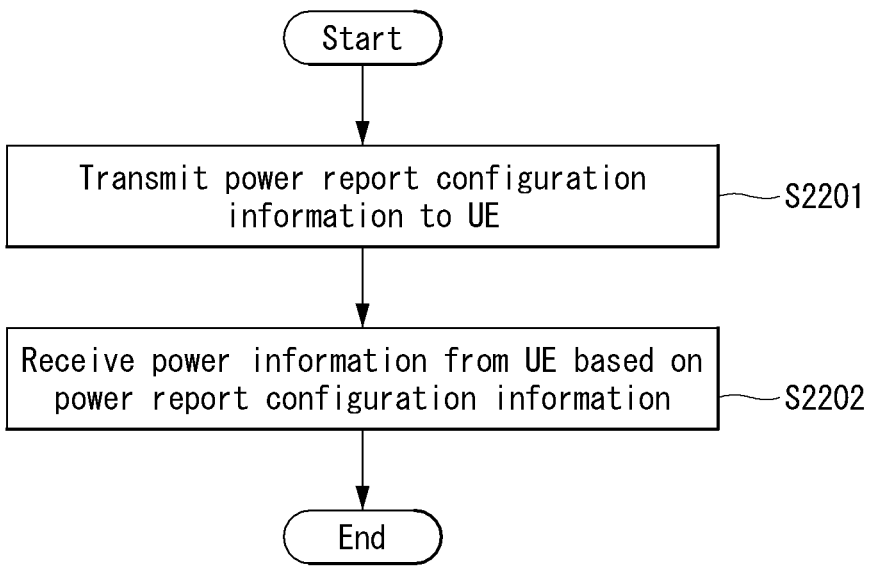

[FIG. 23]
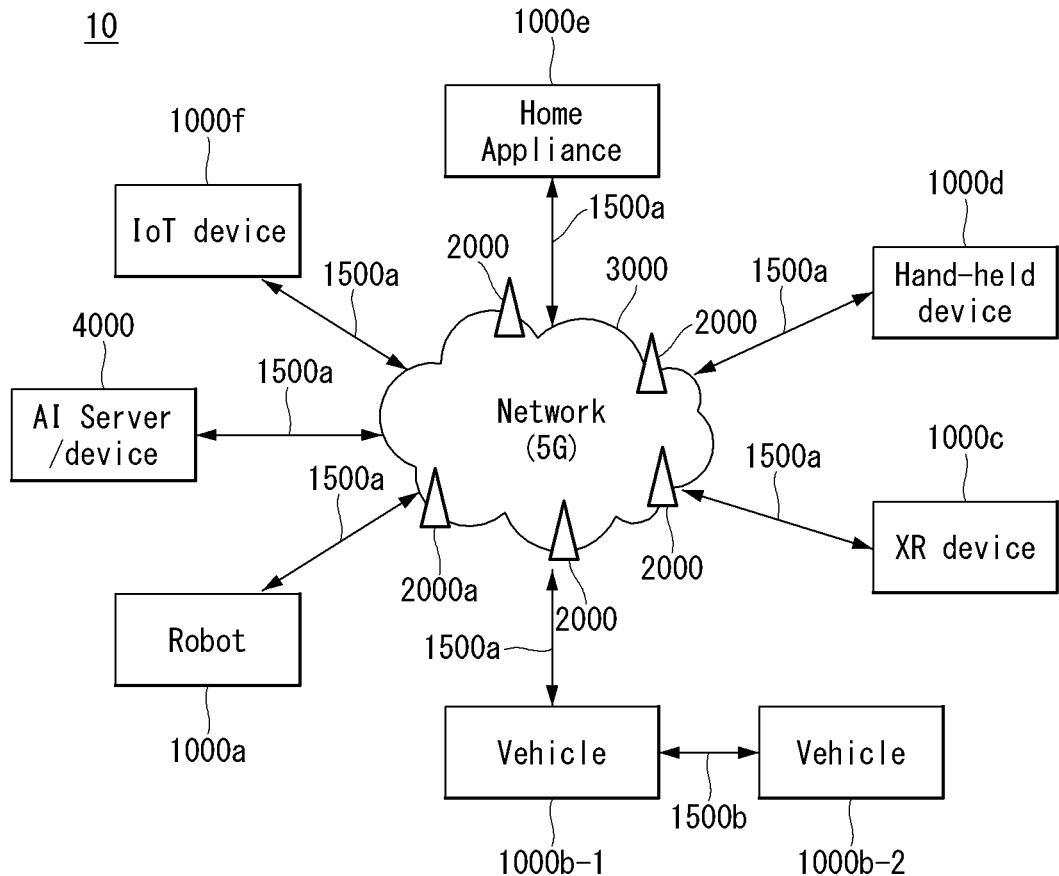
[FIG. 24]
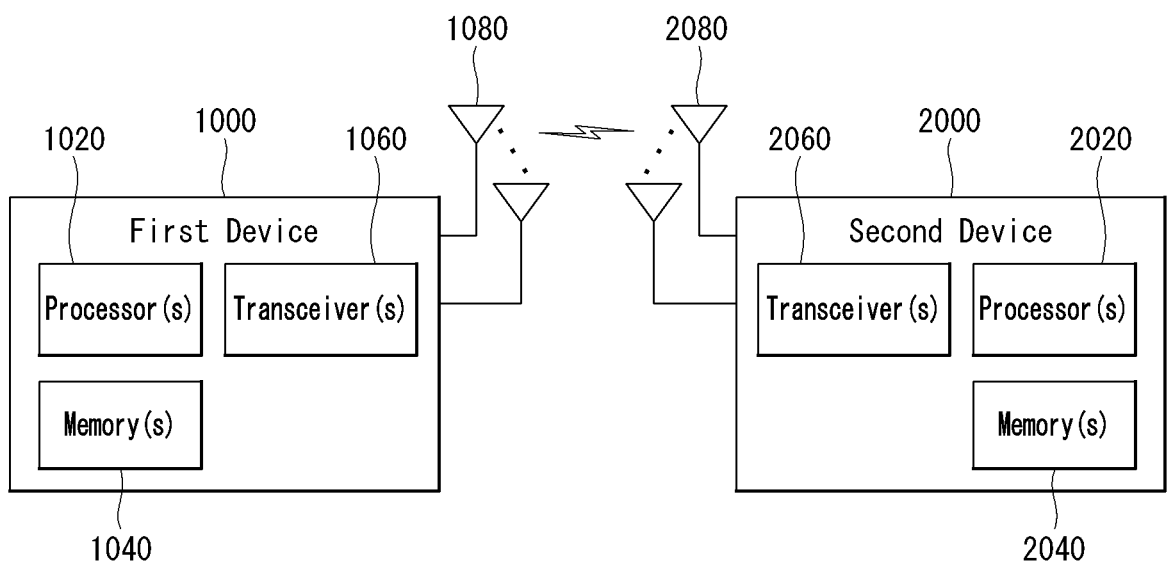

[FIG. 25]
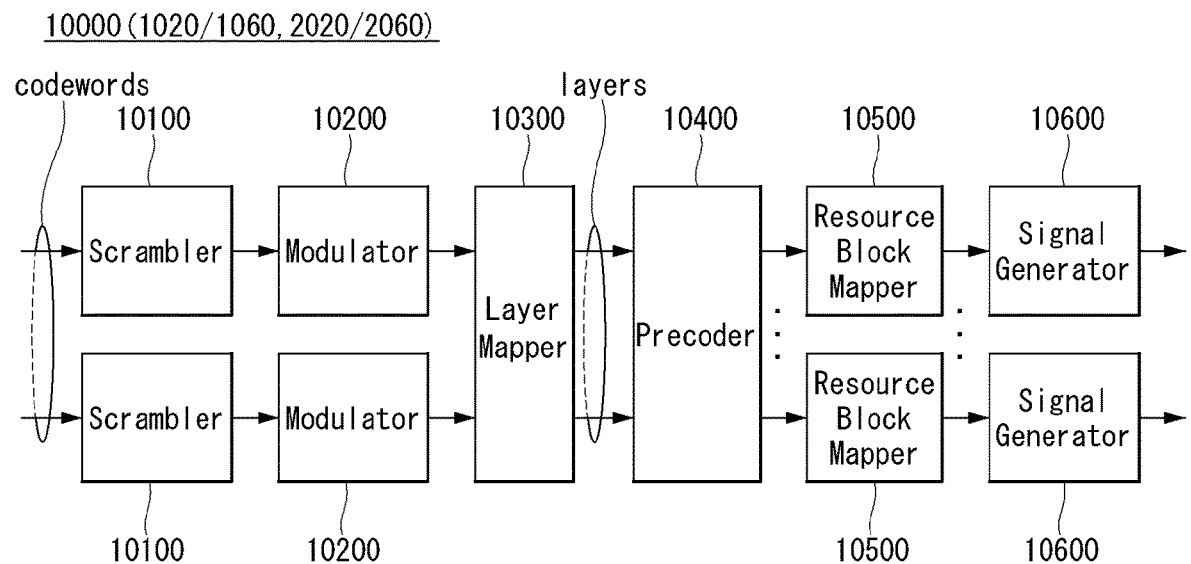
[FIG. 26]
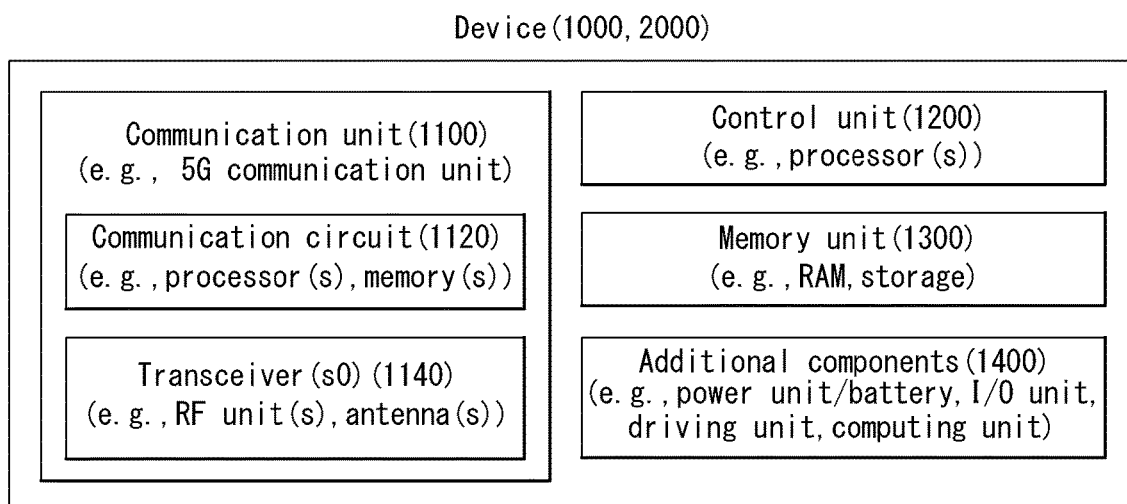

[FIG. 27]
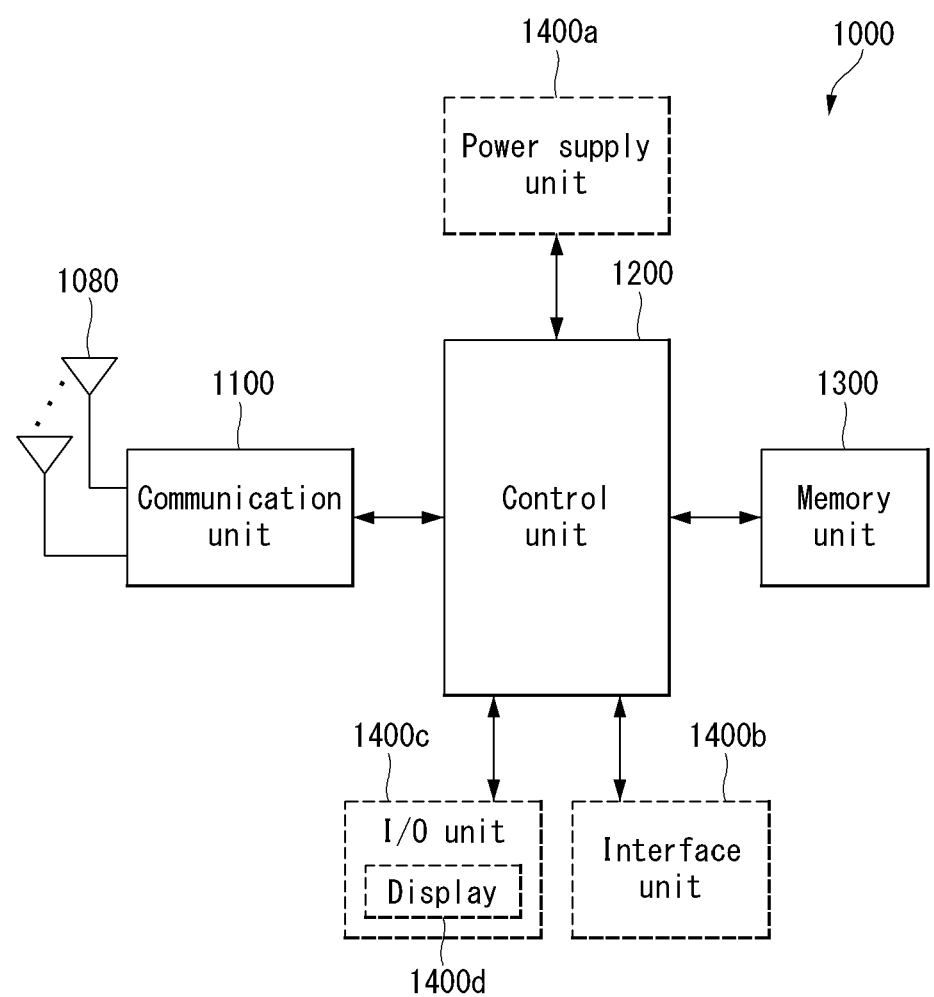

METHOD FOR REPORTING POWER INFORMATION IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2020/005498, filed on Apr. 27, 2020, which claims the benefit of U.S. Provisional Application No. 62/838,324, filed on Apr. 25, 2019, the contents of which are all hereby incorporated by reference herein in their entirety.

TECHNICAL FIELD

The present disclosure relates to a wireless communication system, and more particularly to a method of reporting power information and a device supporting the same.

BACKGROUND ART

A mobile communication system has been developed to provide a voice service while ensuring the activity of a user. However, the area of the mobile communication system has extended to a data service in addition to a voice. Due to the current explosive increase in traffic, there is a shortage of resources, and thus users demand a higher speed service. Accordingly, there is a need for a more advanced mobile communication system.

Requirements for a next-generation mobile communication system need to be able to support the accommodation of explosive data traffic, a dramatic increase in the data rate per user, the accommodation of a significant increase in the number of connected devices, very low end-to-end latency, and high energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

The present disclosure provides a method of reporting a power headroom value and a maximum transmission power value or a representative maximum transmission power value for each panel and a device thereof.

The present disclosure provides a method of reporting a power headroom value and a maximum transmission power value and a maximum value of a transmission power sum of all of a plurality of panels, and a device thereof.

The present disclosure provides a method of defining a transmission order of a power headroom value for each panel, a maximum transmission power value for each panel, and a maximum value of a transmission power sum of all of a plurality of panels, and a device thereof.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

Technical Solution

The present disclosure provides a method of reporting, by a user equipment (UE), power information in a wireless communication system. The method comprises receiving power report configuration information from a base station, and reporting the power information to the base station based on the power report configuration information, the UE includes a plurality of panels, and the power information includes power headroom information for the plurality of panels and maximum transmission power information for the plurality of panels.

The power headroom information may include a power headroom value of each of the plurality of panels or a representative power headroom value of the plurality of panels.

The maximum transmission power information may include a maximum transmission power value of each of the plurality of panels or a representative maximum transmission power value of the plurality of panels.

The maximum transmission power information may include a differential value of each of the plurality of panels based on a maximum transmission power value of a specific panel.

The power information may further include a maximum value of a transmission power sum of the plurality of panels.

The power information may be reported via a different medium access control (MAC)-control element (CE) per cell or per carrier, and each of (i) the power headroom information, (ii) the maximum transmission power information, and (iii) the maximum value of the transmission power sum may be arranged in an ascending order of a panel identifier within the MAC-CE.

The present disclosure provides a user equipment (UE) reporting power information in a wireless communication system. The UE comprises one or more transceivers, one or more processors operatively connected to the one or more transceivers, and one or more memories operatively connected to the one or more processors and configured to store instructions performing operations. The operations comprise receiving power report configuration information from a base station, and reporting the power information to the base station based on the power report configuration information. The UE comprises a plurality of panels, and the power information includes power headroom information for the plurality of panels and maximum transmission power information for the plurality of panels.

The power headroom information may include a power headroom value of each of the plurality of panels or a representative power headroom value of the plurality of panels.

The maximum transmission power information may include a maximum transmission power value of each of the plurality of panels or a representative maximum transmission power value of the plurality of panels.

The maximum transmission power information may include a differential value of each of the plurality of panels based on a maximum transmission power value of a specific panel.

The power information may further include a maximum value of a transmission power sum of the plurality of panels.

The power information may be reported via a different medium access control (MAC)-control element (CE) per cell or per carrier, and each of (i) the power headroom information, (ii) the maximum transmission power information, and (iii) the maximum value of the transmission power sum may be arranged in an ascending order of a panel identifier within the MAC-CE.

The present disclosure provides a device comprising one or more memories and one or more processors operatively connected to the one or more memories. The one or more processors are configured to allow the device to receive power report configuration information from a base station and report power information to the base station based on the power report configuration information. A user equipment (UE) includes a plurality of panels, and the power information includes power headroom information for the plurality of panels and maximum transmission power information for the plurality of panels.

The present disclosure provides a non-transitory computer readable medium (CRM) storing one or more commands. The one or more commands executable by one or more processors allow a user equipment (UE) to receive power report configuration information from a base station and report power information to the base station based on the power report configuration information. The UE includes a plurality of panels, and the power information includes power headroom information for the plurality of panels and maximum transmission power information for the plurality of panels.

Advantageous Effects

According to the present disclosure, there is an effect capable of efficiently controlling power of a UE by reporting a maximum transmission power value for each panel and/or a maximum value of a transmission power sum of a plurality of panels together with a power headroom value.

According to the present disclosure, there is an effect capable of reducing a payload size by defining a transmission order of a power headroom value for each panel, a maximum transmission power value for each panel, and a maximum value of a transmission power sum of a plurality of panels.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

FIG. 1 illustrates an AI device to which a method described in the present disclosure is applicable.

FIG. 2 illustrates an AI server to which a method described in the present disclosure is applicable.

FIG. 3 illustrates an AI system to which a method described in the present disclosure is applicable.

FIG. 4 illustrates an example of physical channels used in a 3GPP system and general stlsgh transmission FIG. 5 illustrates an example of an overall system structure of NR to which a method described in the present disclosure is applicable.

FIG. 6 illustrates a relationship between an uplink frame and a downlink frame in a wireless communication system to which a method described in the present disclosure is applicable.

FIG. 7 illustrates an example of a frame structure in an NR system.

FIG. 8 illustrates an example of a resource grid supported in a wireless communication system to which a method described in the present disclosure is applicable.

FIG. 9 illustrates examples of a resource grid per antenna port and numerology to which a method described in the present disclosure is applicable.

FIG. 10 illustrates an example of a self-contained structure to which a method described in the present disclosure is applicable.

FIG. 11 is a concept view illustrating an example of a beam-related measurement model.

FIG. 12 illustrates an example of an UL BM procedure using SRS.

FIG. 13 is a flow chart illustrating an example of an UL BM procedure using SRS.

FIG. 14 illustrates an example of a procedure of controlling an uplink transmission power.

FIG. 15 illustrates a single entry PHR MAC CE.

FIG. 16 illustrates multiple entry PHR MAC CE in which highest ServCellIndex is less than 8.

FIG. 17 illustrates multiple entry PHR MAC CE in which highest ServCellIndex is 8 or 8 or more.

FIG. 18 illustrates an example of RF switch based multi-panel UE implementation.

FIG. 19 illustrates an example of RF connection based multi-panel UE implementation.

FIG. 20 illustrates an example of a multi-panel based UL transmission/reception signaling procedure to which proposal methods according to the present disclosure are applicable.

FIG. 21 is a flow chart illustrating an operation method of a UE described in the present disclosure.

FIG. 22 is a flow chart illustrating an operation method of a base station described in the present disclosure.

FIG. 23 illustrates a communication system 10 applied to the present disclosure.

FIG. 24 illustrates a wireless device applicable to the present disclosure.

FIG. 25 illustrates a signal processing circuit for a Tx signal.

FIG. 26 illustrates another example of a wireless device applied to the present disclosure.

FIG. 27 illustrates a portable device applied to the present disclosure.

MODE FOR INVENTION

Reference will now be made in detail to embodiments of the disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

In the present disclosure, a base station (BS) means a terminal node of a network directly performing communication with a terminal. In the present disclosure, specific operations described to be performed by the base station may be performed by an upper node of the base station, if necessary or desired. That is, it is obvious that in the network consisting of multiple network nodes including the base station, various operations performed for communication with the terminal can be performed by the base station or network nodes other than the base station. The 'base station (BS)' may be replaced with terms such as a fixed station, Node B, evolved-NodeB (eNB), a base transceiver system (BTS), an access point (AP), gNB (general NB), and the like. Further, a 'terminal' may be fixed or movable and may be replaced with terms such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, and the like.

In the following, downlink (DL) means communication from the base station to the terminal, and uplink (UL) means communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help the understanding of the present disclosure, and may be changed to other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-TDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11(Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

Embodiments of the present disclosure may be supported by standard documents disclosed in at least one of IEEE 802, 3GPP, and 3GPP2 which are the wireless access systems. That is, steps or parts in the embodiments of the present disclosure which are not described to clearly show the technical spirit of the present disclosure may be supported by the standard documents. Further, all terms described in this document may be described by the standard document.

3GPP LTE/LTE-A/New RAT (NR) is primarily described for clear description, but technical features of the present disclosure are not limited thereto.

Hereinafter, examples of 5G use scenarios to which a method proposed in the disclosure may be applied are described.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billion. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

Automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

Robot

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

Self-Driving (Autonomous-Driving)

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 illustrates an AI device 100 to which a method described in the present disclosure is applicable.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™ radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

FIG. 2 illustrates an AI server 200 to which a method described in the present disclosure is applicable.

Referring to FIG. 2, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231*a*) which is being trained or has been trained through the learning processor 240.

The learning processor 240 may train the artificial neural network 231*a* using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 3 illustrates an AI system 1 to which a method described in the present disclosure is applicable.

Referring to FIG. 3, the AI system 1 is connected to at least one of the AI server 200, a robot 100*a*, a self-driving vehicle 100*b*, an XR device 100*c*, a smartphone 100*d* or home appliances 100*e* over a cloud network 10. In this case, the robot 100*a*, the self-driving vehicle 100*b*, the XR device 100*c*, the smartphone 100*d* or the home appliances 100*e* to which the AI technology has been applied may be called AI devices 100*a* to 100*e*.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100*a* to 100*e* (200) configuring the AI system 1 may be interconnected over the cloud network 10. Particularly, the devices 100*a* to 100*e* and 200 may communicate with each other through a base station, but may directly communicate with each other without the intervention of a base station.

The AI server 200 may include a server for performing AI processing and a server for performing calculation on big data.

The AI server 200 is connected to at least one of the robot 100*a*, the self-driving vehicle 100*b*, the XR device 100*c*, the smartphone 100*d* or the home appliances 100*e*, that is, AI devices configuring the AI system 1, over the cloud network 10, and may help at least some of the AI processing of the connected AI devices 100*a* to 100*e*.

In this case, the AI server 200 may train an artificial neural network based on a machine learning algorithm in place of the AI devices 100*a* to 100*e*, may directly store a learning model or may transmit the learning model to the AI devices 100*a* to 100*e*.

In this case, the AI server 200 may receive input data from the AI devices 100*a* to 100*e*, may deduce a result value of the received input data using the learning model, may generate a response or control command based on the deduced result value, and may transmit the response or control command to the AI devices 100*a* to 100*e*.

Alternatively, the AI devices 100*a* to 100*e* may directly deduce a result value of input data using a learning model, and may generate a response or control command based on the deduced result value.

Hereinafter, various embodiments of the AI devices 100*a* to 100*e* to which the above-described technology is applied are described. In this case, the AI devices 100*a* to 100*e* shown in FIG. 3 may be considered to be detailed embodiments of the AI device 100 shown in FIG. 1.

AI+Robot

An AI technology is applied to the robot 100*a*, and the robot 100*a* may be implemented as a guidance robot, a transport robot, a cleaning robot, a wearable robot, an entertainment robot, a pet robot, an unmanned flight robot, etc.

The robot 100*a* may include a robot control module for controlling an operation. The robot control module may mean a software module or a chip in which a software module has been implemented using hardware.

The robot 100*a* may obtain state information of the robot 100*a*, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among LIDAR, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowport and a desk. Furthermore, the object identification information may include a name, a type, a distance, a location, etc.

Furthermore, the robot 100a may perform an operation or run by controlling the driving unit based on a user's control/interaction. In this case, the robot 100a may obtain intention information of an interaction according to a user's behavior or voice speaking, may determine a response based on the obtained intention information, and may perform an operation.

AI+Self-Driving

An AI technology is applied to the self-driving vehicle 100b, and the self-driving vehicle 100b may be implemented as a movable type robot, a vehicle, an unmanned flight body, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as an element of the self-driving vehicle 100b, but may be configured as separate hardware outside the self-driving vehicle 100b and connected to the self-driving vehicle 100b.

The self-driving vehicle 100b may obtain state information of the self-driving vehicle 100b, may detect (recognize) a surrounding environment and object, may generate map data, may determine a moving path and running plan, or may determine an operation using sensor information obtained from various types of sensors.

In this case, in order to determine the moving path and running plan, like the robot 100a, the self-driving vehicle 100b may use sensor information obtained from at least one sensor among LIDAR, a radar and a camera.

Particularly, the self-driving vehicle 100b may recognize an environment or object in an area whose view is blocked or an area of a given distance or more by receiving sensor information for the environment or object from external devices, or may directly receive recognized information for the environment or object from external devices.

The self-driving vehicle 100b may perform the above operations using a learning model configured with at least one artificial neural network. For example, the self-driving vehicle 100b may recognize a surrounding environment and object using a learning model, and may determine the flow of running using recognized surrounding environment information or object information. In this case, the learning model may have been directly trained in the self-driving vehicle 100b or may have been trained in an external device, such as the AI server 200.

In this case, the self-driving vehicle 100b may directly generate results using the learning model and perform an operation, but may perform an operation by transmitting sensor information to an external device, such as the AI server 200, and receiving results generated in response thereto.

The self-driving vehicle 100b may determine a moving path and running plan using at least one of map data, object information detected from sensor information or object information obtained from an external device. The self-driving vehicle 100b may run based on the determined moving path and running plan by controlling the driving unit.

The map data may include object identification information for various objects disposed in the space (e.g., road) in which the self-driving vehicle 100b runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100b may perform an operation or may run by controlling the driving unit based on a user's control/interaction. In this case, the self-driving vehicle 100b may obtain intention information of an interaction according to a user' behavior or voice speaking, may determine a response based on the obtained intention information, and may perform an operation.

AI+XR

An AI technology is applied to the XR device 100c, and the XR device 100c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100c may generate location data and attributes data for three-dimensional points by analyzing three-dimensional point cloud data or image data obtained through various sensors or from an external device, may obtain information for a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100c may perform the above operations using a learning model configured with at least one artificial neural network. For example, the XR device 100c may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

AI+Robot+Self-Driving

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously run along a given flow without control of a user or that autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through a LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

AI+Robot+XR

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI+Self-Driving+XR

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

Physical Channel and General Signal Transmission

FIG. 4 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S202).

Meanwhile, when there is no radio resource first accessing the eNB or for signal transmission, the UE may perform a Random Access Procedure (RACH) to the eNB (S203 to S206). To this end, the UE may transmit a specific sequence to a preamble through a Physical Random Access Channel (PRACH) (S203 and S205) and receive a response message (Random Access Response (RAR) message) for the preamble through the PDCCH and a corresponding PDSCH (S204 and S206). In the case of a contention based RACH, a Contention Resolution Procedure may be additionally performed.

The UE that performs the above procedure may then perform PDCCH/PDSCH reception (S207) and Physical Uplink Shared Channel (PUSCH)/Physical Uplink Control Channel (PUCCH) transmission (S208) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

As smartphones and Internet of Things (IoT) terminals are rapidly spread, the amount of information exchanged through a communication network is increasing. As a result, next-generation wireless access technologies can provide faster service to more users than traditional communication systems (or traditional radio access technologies) (e.g., enhanced mobile broadband communication) Needs to be considered.

To this end, the design of a communication system that considers Machine Type Communication (MTC), which provides services by connecting a number of devices and objects, is being discussed. It is also being discussed as a multiuser of communication systems (e.g., Ultra-Reliable and Low Latency Communication, URLLC) that take into account the reliability and/or latency-sensitive services (service) and/or a user equipment.

Hereinafter, in the present disclosure, for convenience of description, the next generation radio access technology is referred to as NR (New RAT), and the radio communication system to which the NR is applied is referred to as an NR system.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behaviour.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 5 illustrates an example of an overall structure of an NR system to which a method proposed in the disclosure may be applied.

Referring to FIG. 5, an NG-RAN is configured with an NG-RA user plane (new AS sublayer/PDCP/RLC/MAC/PHY) and gNBs which provide a control plane (RRC) protocol end for a user equipment (UE).

The gNBs are interconnected through an Xn interface.

The gNBs are also connected to an NGC through an NG interface.

More specifically the gNBs are connected to an access and mobility management function (AMF) through an N2 interface and to a user plane function (UPF) through an N3 interface.

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 1

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 2.

TABLE 2

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/100) \cdot T_s=10$ ms. In this case, there may be a set of UL frames and a set of DL frames.

FIG. 6 illustrates the relation between an uplink frame and a downlink frame in a wireless communication system to which a method proposed in the disclosure may be applied.

As illustrated in FIG. 6, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots,\mu}-1\}$ within a subframe and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 7 illustrates an example of a frame structure in an NR system. FIG. 7 is merely for convenience of explanation and does not limit the scope of the disclosure.

In Table 3, in the case of μ=2, i.e., as an example in which a subcarrier spacing (SCS) is 60 kHz, one subframe (or frame) may include four slots with reference to Table 4, and one subframe={1, 2, 4} slots shown in FIG. 6, for example, the number of slot(s) that may be included in one subframe may be defined as in Table 4.

Further, a mini-slot may consist of 2, 4, or 7 symbols, or may consist of more symbols or less symbols.

In relation to physical resources in the NR system, an antenna port, a resource grid, a resource element, a resource block, a carrier part, etc. may be considered.

Hereinafter, the above physical resources that can be considered in the NR system are described in more detail.

First, in relation to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. In this case, the large-scale properties may include at least one of delay spread, Doppler spread, frequency shift, average received power, and received timing.

FIG. 8 illustrates an example of a resource grid supported in a wireless communication system to which a method proposed in the disclosure may be applied.

Referring to FIG. 8, a resource grid consists of $N_{RB}^\mu N_{sc}^{RB}$ subcarriers on a frequency domain, each subframe consisting of 14·2μ OFDM symbols, but the disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max,\mu}$. $N_{RB}^{max,\mu}$ denotes a maximum transmission bandwidth and may change not only between numerologies but also between uplink and downlink.

In this case, as illustrated in FIG. 9, one resource grid may be configured per numerology μ and antenna port p.

FIG. 9 illustrates examples of a resource grid per antenna port and numerology to which a method proposed in the disclosure may be applied.

Each element of the resource grid for the numerology μ and the antenna port p is called a resource element and is uniquely identified by an index pair (k,l̄), where k=0, ..., $N_{RB}^{\mu}N_{sc}^{RB}-1$ is an index on a frequency domain, and l̄=0, ..., $2^{\mu}N_{symb}^{(\mu)}-1$ refers to a location of a symbol in a subframe. The index pair (k,l̄) is used to refer to a resource element in a slot, where l=0, ..., $N_{symb}^{\mu}-1$.

The resource element (k,l̄) for the numerology μ and the antenna port p corresponds to a complex value $a_{k,l̄}^{(p,\mu)}$. When there is no risk for confusion or when a specific antenna port or numerology is not specified, the indexes p and μ may be dropped, and as a result, the complex value may be $a_{k,l̄}^{(p)}$ or $a_{k,l̄}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for 1-R1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $a_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \qquad \text{[Equation 1]}$$

In this case, k may be defined relative to the point A so that k=0 corresponds to a subcarrier centered around the point A. Physical resource blocks are defined within a bandwidth part (BWP) and are numbered from 0 to $N_{BWPi}^{size}-1$, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \qquad \text{[Equation 2]}$$

In this case, $N_{BWP,i}^{start}$ may be the common resource block where the BWP starts relative to the common resource block 0.

Self-Contained Structure

A time division duplexing (TDD) structure considered in the NR system is a structure in which both uplink (UL) and downlink (DL) are processed in one slot (or subframe). The structure is to minimize a latency of data transmission in a TDD system and may be referred to as a self-contained structure or a self-contained slot.

FIG. 10 illustrates an example of a self-contained structure to which a method proposed in the disclosure may be applied. FIG. 10 is merely for convenience of explanation and does not limit the scope of the disclosure.

Referring to FIG. 10, as in legacy LTE, it is assumed that one transmission unit (e.g., slot, subframe) consists of 14 orthogonal frequency division multiplexing (OFDM) symbols.

In FIG. 10, a region 1002 means a downlink control region, and a region 1004 means an uplink control region. Further, regions (i.e., regions without separate indication) other than the region 1002 and the region 1004 may be used for transmission of downlink data or uplink data.

That is, uplink control information and downlink control information may be transmitted in one self-contained slot. On the other hand, in the case of data, uplink data or downlink data is transmitted in one self-contained slot.

When the structure illustrated in FIG. 10 is used, in one self-contained slot, downlink transmission and uplink transmission may sequentially proceed, and downlink data transmission and uplink ACK/NACK reception may be performed.

As a result, if an error occurs in the data transmission, time required until retransmission of data can be reduced. Hence, the latency related to data transfer can be minimized.

In the self-contained slot structure illustrated in FIG. 10, a base station (e.g., eNodeB, eNB, gNB) and/or a user equipment (UE) (e.g., terminal) require a time gap for a process for converting a transmission mode into a reception mode or a process for converting a reception mode into a transmission mode. In relation to the time gap, if uplink transmission is performed after downlink transmission in the self-contained slot, some OFDM symbol(s) may be configured as a guard period (GP).

Beam Management (BM) Procedure

A beam management (BM) procedure defined in new radio (NR) is described.

The BM procedure corresponds to layer 1 (L1)/L2 (layer 2) procedures for obtaining and maintaining a set of base station (e.g., gNB or TRP) and/or a terminal (e.g., UE) beams which may be used for downlink (DL) and uplink (UL) transmission/reception, and may include the following procedure and terms.

Beam measurement: an operation of measuring characteristics of a beamforming signal received by a base station or a UE.

Beam determination: an operation of selecting, by a base station or a UE, its own transmission (Tx) beam/reception (Rx) beam.

Beam sweeping: an operation of covering a space region by using a transmission beam and/or a reception beam for a given time interval in a predetermined manner Beam report: an operation of reporting, by a UE, information of a beamformed signal based on beam measurement.

FIG. 11 is a concept view illustrating an example of a beam-related measurement model.

For beam measurement, an SS block (or SS/PBCH block (SSB)) or a channel state information reference signal (CSI-RS) is used in the downlink. A sounding reference signal (SRS) is used in the uplink.

In RRC_CONNECTED, a UE measures multiple beams (or at least one beam) of a cell. The UE may average measurement results (RSRP, RSRQ, SINR, etc.) in order to derive cell quality.

Accordingly, the UE may be configured to consider a sub-set of a detected beam(s).

Beam measurement-related filtering occurs in different two levels (in a physical layer that derives beam quality and an RRC level in which cell quality is derived from multiple beams).

Cell quality from beam measurement is derived in the same manner with respect to a serving cell(s) and a non-serving cell)(s).

If a UE is configured by a gNB to report measurement results for a specific beam(s), a measurement report includes measurement results for X best beams. The beam measurement results may be reported as L1-reference signal received power (RSRP).

In FIG. 11, K beams (gNB beam 1, gNB beam 2, ..., gNB beam k) 210 are configured for L3 mobility by a gNB, and correspond to the measurement of a synchronization signal (SS) block (SSB) or CSI-RS resource detected by a UE in the L1.

In FIG. 11, layer 1 filtering 220 means internal layer 1 filtering of an input measured at a point A.

Furthermore, in beam consolidation/selection 230, beam-specific measurements are integrated (or merged) in order to derive cell quality.

Layer 3 filtering 240 for cell quality means filtering performed on measurement provided at a point B.

A UE evaluates a reporting criterion whenever new measurement results are reported at least at points C and C1.

D corresponds to measurement report information (message) transmitted at a radio interface.

In L3 beam filtering 250, filtering is performed on measurement (beam-specific measurement) provided at a point A1.

In beam selection 260 for a beam report, X measurement values are selected in measurement provided at a point E.

F indicates beam measurement information included in a measurement report (transmission) in a radio interface.

Furthermore, the BM procedure may be divided into (1) a DL BM procedure using a synchronization signal (SS)/physical broadcast channel (PBCH) Block or CSI-RS and (2) an UL BM procedure using a sounding reference signal (SRS).

Furthermore, each of the BM procedures may include Tx beam sweeping for determining a Tx beam and Rx beam sweeping for determining an Rx beam.

UL BM Procedure

In UL BM, beam reciprocity (or beam correspondence) between a Tx beam and an Rx beam may be established or may not be established depending on a UE implementation.

If reciprocity between a Tx beam and an Rx beam is established in both a base station and a UE, a UL beam pair may be matched through a DL beam pair.

However, if reciprocity between a Tx beam and an Rx beam is not established in either a base station or a UE, an UL beam pair determination process is necessary separately from a DL beam pair determination.

Furthermore, although both the base station and the UE maintain beam correspondence, the base station may use an UL BM procedure for a DL Tx beam determination even without requesting reporting on a preferred beam by the UE.

Beamformed SRS Based UL BM Procedure

UL BM may be performed thro beamformed UL SRS transmission, and an "SRS-SetUse" parameter is configured as "BeamManagement."

Likewise, the UL BM procedure may be divided into Tx beam sweeping of a UE and Rx beam sweeping of a base station.

The UE may be configured with one or more Sounding Reference Symbol (SRS) resource sets, configured by (higher layer parameter) SRS-ResourceSet (through higher layer signaling, RRC signaling, etc.).

With respect to each SRS resource set, the UE may be configured with $K \geq 1$ SRS resources (higher later parameter SRS-resource).

In this case, K is a natural number, and a maximum value of K is indicated by SRS_capability.

Whether to apply UL BM to the SRS resource set is configured by (higher layer parameter) SRS-SetUse.

If the SRS-SetUse is configured as "BeamManagement (BM)", only one SRS resource may be transmitted in each of a plurality of SRS resource sets at a given time instant.

FIG. 12 illustrates an example of an UL BM procedure using an SRS.

Specifically, FIG. 12a illustrates an Rx beam determination procedure of a base station, and FIG. 12b illustrates a Tx beam determination procedure of a UE.

FIG. 13 is a flow chart illustrating an example of an UL BM procedure using an SRS.

First, the UE receives, from the base station, RRC signaling (e.g., SRS-Config IE) including a (higher layer parameter) usage parameter configured as a "beam management" (S1310).

Table 5 illustrates an example of an SRS-Config information element (IE), and the SRS-Config IE is used for an SRS transmission configuration.

The SRS-Config IE includes a list of SRS-Resources and a list of SRS-ResourceSets.

Each SRS resource set means a set of SRS-resources.

A network triggers the transmission of an SRS resource set by using configured aperiodicSRS-ResourceTrigger (L1 DCI).

TABLE 5

```
-- ASN1START
-- TAG-MAC-CELL-GROUP-CONFIG-START
SRS-Config ::=                    SEQUENCE {
    srs-ResourceSetToReleaseList      SEQUENCE (SIZE(1..maxNrofSRS-ResourceSets)) OF SRS-ResourceSetId
    srs-ResourceSetToAddModList       SEQUENCE (SIZE(1..maxNrofSRS-ResourceSets)) OF SRS-ResourceSet
    srs-ResourceToReleaseList         SEQUENCE (SIZE(1..maxNrofSRS-Resources)) OF SRS-ResourceId
    srs-ResourceToAddModList          SEQUENCE (SIZE(1..maxNrofSRS-Resources)) OF SRS-Resource
    tpc-Accumulation                      ENUMERATED {disabled}
    ...
}
SRS-ResourceSet ::=               SEQUENCE {
    srs-ResourceSetId                 SRS-ResourceSetId,
    srs-ResourceIdList                SEQUENCE (SIZE(1..maxNrofSRS-ResourcesPerSet)) OF SRS-ResourceId
    resourceType                      CHOICE {
        aperiodic                         SEQUENCE {
            aperiodicSRS-ResourceTrigger      INTEGER (1..maxNrofSRS-TriggerStates-1),
            csi-RS                                NZP-CSI-RS-ResourceId
            slotOffset                        INTEGER (1..32)
            ...
        },
```

TABLE 5-continued

```
    semi-persistent                   SEQUENCE {
        associatedCSI-RS                  NZP-CSI-RS-ResourceId
        ...
    },
    periodic                          SEQUENCE {
        associatedCSI-RS                  NZP-CSI-RS-ResourceId
        ...
    }
},
usage                             ENUMERATED {beamManagement, codebook, nonCodebook,
antennaSwitching},
alpha                             Alpha
p0                                INTEGER (-202..24)
pathlossReferenceRS               CHOICE {
    ssb-Index                         SSB-Index,
    csi-RS-Index                      NZP-CSI-RS-ResourceId
SRS-SpatialRelationInfo ::=   SEQUENCE {
    servingCellId                     ServCellIndex
    OPTIONAL,    -- Need S
    referenceSignal                   CHOICE {
        ssb-Index                         SSB-Index,
        csi-RS-Index                      NZP-CSI-RS-ResourceId,
        srs                               SEQUENCE {
            resourceId                        SRS-ResourceId,
            uplinkBWP                         BWP-Id
        }
    }
}
SRS-ResourceId ::=                INTEGER (0..maxNrofSRS-Resources-1)
```

In Table 5, usage represents a higher layer parameter indicating whether an SRS resource set is used for beam management and used for codebook-based or non-codebook-based transmission.

The usage parameter corresponds to an L1 parameter 'SRS-SetUse'.

"spatialRelationInfo" is a parameter representing a configuration of a spatial relation between a reference RS and a target SRS.

In this case, the reference RS may be an SSB, a CSI-RS or an SRS corresponding to an L1 parameter "SRS-SpatialRelationInfo."

The usage is configured for each SRS resource set.

Furthermore, the UE determines a Tx beam for an SRS resource to be transmitted based on SRS-SpatialRelation Info included in the SRS-Config IE (S1320).

In this case, SRS-SpatialRelation Info is configured for each SRS resource, and indicates whether to apply the same beam as a beam used in the SSB, CSI-RS or SRS for each SRS resource.

Furthermore, SRS-SpatialRelationInfo may be configured or not configured in each SRS resource.

If SRS-SpatialRelationInfo is configured in the SRS resource, the same beam as the beam used in the SSB, CSI-RS or SRS is applied and transmitted.

However, if SRS-SpatialRelationInfo is not configured in the SRS resource, the UE randomly determines a Tx beam and transmits an SRS through the determined Tx beam (S1330).

More specifically, for a P-SRS in which 'SRS-ResourceConfigType' is configured as 'periodic', (1) if SRS-SpatialRelationInfo is configured as "SSB/PBCH", the UE transmits a corresponding SRS resource by applying a spatial domain transmission filter identical with a spatial domain Rx filter used for the reception of an SSB/PBCH (or generated from the corresponding filter).

Or, (2) if SRS-SpatialRelationInfo is configured as "CSI-RS", the UE transmits an SRS resource having the same spatial domain transmission filter used for the reception of a periodic CSI-RS or SP CSI-RS.

Or, (3) if SRS-SpatialRelationInfo is configured as "SRS", the UE transmits a corresponding SRS resource by applying the same spatial domain transmission filter used for the transmission of a periodic SRS.

Although "SRS-ResourceConfigType" is configured as "SP-SRS" or "AP-SRS", the same principle may be applied.

Additionally, the UE may receive or not receive, from the base station, feedback for the SRS as in the following three cases (S1340).

First, if Spatial_Relation_Info is configured for all SRS resources within the SRS resource set, the UE transmits the SRS through a beam indicated by the base station.

For example, if Spatial_Relation_Info indicates the same SSB, CRI or SRI, the UE repetitively transmits the SRS through the same beam.

In this case, a use for selecting, by the base station, an Rx beam corresponds to FIG. 12a.

Second, Spatial_Relation_Info may not be configured for all SRS resources within the SRS resource set.

In this case, the UE may transmit the SRS while freely changing an SRS beam.

That is, this case is a use for selecting, by the UE, a Tx beam and corresponds to FIG. 12b.

Finally, Spatial_Relation_Info may be configured for only some SRS resources within the SRS resource set.

In this case, the UE may transmit the SRS through a beam indicated for a configured SRS resource, and may transmit the SRS by randomly applying a Tx beam with respect to an SRS resource whose Spatial_Relation_Info is not configured.

PUCCH Beam Indication

When a base station indicates, to a UE, a beam to be used in PUCCH transmission, the base station may indicate/configure spatial relation info in the same manner as the SRS. The spatial relation info may be SSB, CSI-RS, or SRS in the same manner as the SRS and provides reference RS information from a perspective of a beam to be used for the PUCCH transmission as a target. In case of PUCCH, a beam may be (differently) configured/indicated on a per-PUCCH resource basis, and two schemes are supported. The first scheme is a method for always applying the corresponding spatial relation RS upon the corresponding PUCCH transmission if one spatial relation info is configured with an RRC message (i.e., RRC only). The second scheme is a method for indicating a specific one to be applied to a target PUCCH resource among a plurality of spatial relation RS information configured as RRC with a MAC-CE message after configuring two or more spatial relation info with an RRC message (i.e., RRC+MAC-CE).

PUSCH Beam Indication

When the base station indicates, to the UE, a beam to be used for PUSCH transmission, with DCI format 0_1, the base station may indicate an SRS resource serving as a reference. In NR PUSCH transmission, two schemes are supported: a codebook (CB) based transmission scheme and a non-codebook based transmission scheme. Similar to LTE UL MIMO, the CB based transmission scheme indicates, to DCI, precoder information to be applied to a plurality of UE antenna ports via TPMI and TRI. However, unlike LTE, beamformed SRS resource transmission may be supported, and up to two SRS resources may be configured for CB based transmission. Since each SRS resource may be configured with a different spatial relation info, it may be transmitted while being beamformed in a different direction. The base station receiving this may designate one of the two beams to be used when applying the PUSCH as a 1-bit SRS resource ID (SRI) field of DCI. For example, if a 4 Tx UE is configured with two 4-port SRS resources and each SRS resource is configured with a different spatial relation RS, each SRS resource is beamformed according to each spatial relation RS and is transmitted to 4 ports. The base station selects and indicates one of the two SRS resources as SRI, and at the same time, indicates, as UL DCI, TPMI and TRI together, as MIMO precoding information to be applied to SRS ports, which have been used for the corresponding SRS resource transmission. In the non-CB based transmission, the UE may be configured with up to four 1-port SRS resources. The UE receiving this indication beamforms each SRS resource according to the corresponding spatial relation info and transmits it to the base station, and the base station receiving it indicates one or multiple SRI(s) to be applied for PUSCH transmission. Unlike the CB based scheme, in the non-CB scheme, since each SRS resource consists of only 1 port, TPMI is not indicated. Eventually, since the number of SRS resources indicated (i.e., the number of SRIs) is identical to the transmission rank, the TRI is not indicated. As a result, the same beamforming (precoding) as a specific PUSCH DMRS port (or layer) is applied to each indicated 1 port SRS resource. In non-CB UL transmission, a specific NZP CSI-RS resource may be associated with each SRS resource by RRC (associated CSI-RS IE in 38.331) and, when so configured, the associated NZP CSI-RS is also triggered when the aperiodic SRS for non-CB is triggered with DCI. In this case, the UE receives the triggered NZP CSI-RS, calculates a beam coefficient (or precoder) to be applied to each SRS resource (using channel reciprocity), and then (sequentially) transmits the SRS resources.

When the base station schedules the PUSCH with DCI format 0_0, a direct beam indication method via DCI is not supported because the SRI field in the CB based or non-CB based transmission does not exist in DCI format 0_0. In this case, the UE transmits the corresponding PUSCH using the same beam as a beam to be applied to transmission of the PUCCH resource having the lowest ID among the PUCCH resources configured in the active BWP of the corresponding cell (i.e., spatial relation info is the same).

Uplink Power Control

In the wireless communication system, transmission power of the terminal (e.g., user equipment (UE) and/or a mobile device may be required to increase or decrease according to a situation. As such, controlling the transmission power of the UE and/or the mobile device may be referred to as uplink power control. As an example, a transmission power control scheme may be applied to satisfy a requirement (e.g., Signal-to-Noise Ratio (SNR), Bit Error Ratio (BER), Block Error Ratio (BLER), etc.) in a base station (e.g., gNB, eNB, etc.).

The power control described above may be performed by an open-loop power control scheme and a closed-loop power control scheme.

Specifically, the open-loop power control scheme means a scheme of controlling the transmission power without a feedback from a transmitting device (e.g., the eNB, etc.) to a receiving device (e.g., UE, etc.) and/or a feedback from the receiving device to the transmitting device. As an example, the UE may receive a pilot channel/signal from the eNB and estimate a strength of reception power by using the received pilot channel/signal. Thereafter, the UE may control the transmission power by using the estimated strength of the reception power.

In contrast, the closed-loop power control scheme means a scheme of controlling the transmission power based on the feedback from the transmitting device to the receiving device and/or the feedback from the receiving device to the transmitting device. As an example, the eNB receives the pilot channel/signal from the UE and determines an optimum power level of the UE based on a power level, SNR, BEER, BLER, etc., measured by the received pilot channel/signal. The eNB may transfer information (i.e., feedback) on the determined optimum power level to the UE through a control channel and the corresponding UE may control the transmission power by using the feedback provided by the eNB.

Hereinafter, a power control scheme for cases where the UE and/or the mobile device performs uplink transmission to the eNB in the wireless communication system will be described in detail.

Specifically, hereinafter, power control schemes for transmission of 1) uplink data channel (e.g., Physical Uplink Shared Channel (PUSCH), 2) uplink control channel (e.g., Physical Uplink Control Channel (PUCCH), 3) Sounding Reference Signal (SRS), and 4) random access channel (e.g., Physical Random Access Channel (PRACH) will be described. In this case, a transmission occasion (i.e., transmission time unit) (i) for PUSCH, PUCCH, SRS, and/or PRACH may be defined by slot index $n\_s$ in a frame in of a system frame number (SFN), a first symbol S in the slot, the number L of consecutive symbols, etc.

1) Power Control of Uplink Data Channel

Hereinafter, for convenience of description, the power control scheme will be described based on the case where the UE performs PUSCH transmission. The corresponding scheme may be extensively applied to another uplink data channel supported in the wireless communication system, of course.

In PUSCH transmission in an active uplink UL bandwidth part (UL BWP) of carrier f of serving cell c, the UE may calculate a linear power value of the transmission power determined by Equation P1 below. Thereafter, the corresponding UE may control the transmission power by considering the calculated linear power value, the number of antenna ports, and/or the number of SRS ports.

Specifically, when the UE performs PUSCH transmission in active UL BWP(b) of carrier f of serving cell c using a parameter set configuration based on index j and a PUSCH power control adjustment state based on index l, the UE may determine PUSCH transmission power $P_{PUSCH,b,f,c}(i,j,q_d,l)$ (dBm) in PUSCH transmission occasion i based on Equation 3 below.

$$P_{PUSCH,b,f,c}(i, j, q_d, l) = \min \begin{cases} P_{CMAX,f,c}(i), \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{cases} [dBm] \quad \text{[Equation 3]}$$

In Equation 3, index j represents an index for an open loop power control parameter (e.g., Po, alpha (a), etc.) and a maximum of 32 parameter sets per cell may be configured. Index q_d represents an index of a DL RS resource for pathloss (PL) measurement (e.g., $PL_{b,f,c}(q_d)$) and a maximum of four measurement values per cell may be configured. Index l represents an index for a closed-loop power control process and a maximum of two processes per cell may be configured.

Specifically, Po (e.g., $P_{O\_PUSCH b,f,c}(j)$) as a parameter broadcasted to a part of system information may represent target reception power at a receiver. The corresponding Po value may be configured by considering a throughput of the UE, a capacity of the cell, noise, and/or interference. Further, an alpha (e.g., $\alpha_{b,f,c}(j)$) may represent a ratio of performing compensation for pathloss. The alpha may be configured to a value of 0 to 1 and full pathloss compensation or fractional pathloss compensation may be performed according to the configured value. In this case, the alpha value may be configured interference between the UEs and/or a data speed. Further, $P_{CMAX,f,c}(i)$ may represent configured UE transmit power. As an example, the configured maximum UE transmit power may be construed as 'configured maximum UE output power' defined in 3GPP TS 38.101-1 and/or TS38.101-2. Further, $M_{RB,b,f,c}^{PUSCH}(i)$ may represent a bandwidth of PUSCH resource allocation expressed as the number of resource blocks (RBs) for the PUSCH transmission occasion based on subcarrier spacing μ. Further, $f_{b,f,c}(i,l)$ related to the PUSCH power control adjustment state may be configured or indicated based on a TPC command field of DCI (e.g., DCI format 0_0, DCI format 0_1, DCI format 2_2, DCI format 2_3, etc.).

In this case, a specific Radio Resource Control (RRC) parameter (e.g., SRI-PUSCHPowerControl-Mapping, etc.) may represent a linkage between the SRS Resource Indicator (SRI) field of downlink control information (DCI) and the indexes j, q_d, and l. In other words, the indexes j, l, and q_d may be associated with a beam, a panel, and/or a spatial domain transmission filter based on specific information. Therefore, beam, panel. And/or spatial domain transmission filter unit PUSCH transmission power control may be performed.

Parameters and/or information for the PUSCH power control may be individually (i.e., independently) configured for each BWP. In this case, the parameters and/or information may be configured or indicated through higher layer signaling (e.g., RRC signaling, Medium Access Control-Control Element (MAC-CE), etc.) and/or DCI. As an example, the parameter and/or information for the PUSCH power control may be transferred through RRC signaling PUSCH-ConfigCommon, PUSCH-PowerControl, etc., and PUSCH-ConfigCommon and PUSCH-PowerControl may be configured as shown in Table 6 below.

TABLE 6

| | |
|---|---|
| PUSCH-ConfigCommon ::= | SEQUENCE { |
| groupHoppingEnabledTransformPrecoding | ENUMERATED {enabled} |
| pusch-TimeDomainAllocationList | PUSCH-TimeDomainResourceAllocationList |
| msg3-DeltaPreamble | INTEGER (-1..6) |
| p0-NominalWithGrant | INTEGER (-202..24) |
| ... | |
| } | |
| PUSCH-PowerControl ::= | SEQUENCE { |
| tpc-Accumulation | ENUMERATED { disabled } |
| msg3-Alpha | Alpha |
| p0-NominalWithoutGrant | INTEGER (-202..24) |
| p0-AlphaSets | SEQUENCE (SIZE (1..maxNrofP0-PUSCH-AlphaSets)) OF P0-PUSCH-AlphaSet |
| pathlossReferenceRSToAddModList | SEQUENCE (SIZE (1..maxNrofPUSCH-PathlossReferenceRSs)) OF PUSCH-PathlossReferenceRS |
| pathlossReferenceRSToReleaseList | SEQUENCE (SIZE (1..maxNrofPUSCH-PathlossReferenceRSs)) OF PUSCH-PathlossReferenceRS-Id |
| twoPUSCH-PC-AdjustmentStates | ENUMERATED {twoStates} |
| deltaMCS | ENUMERATED {enabled} |
| sri-PUSCH-MappingToAddModList | SEQUENCE (SIZE (1..maxNrofSRI-PUSCH-Mappings)) OF SRI-PUSCH-PowerControl |
| sri-PUSCH-MappingToReleaseList | SEQUENCE (SIZE (1..maxNrofSRI-PUSCH-Mappings)) OF SRI-PUSCH-PowerControlId |
| } | |

The UE may determine or calculate a PUSCH transmission power through the above-described scheme and transmit PUSCH using the determined or calculated PUSCH transmission power.

2) Power Control of Uplink Control Channel

A power control scheme based on a case in which a UE performs PUCCH transmission is described below for convenience of explanation. It is a matter of course that the scheme can be extended and applied to other uplink control channels supported in a wireless communication system.

More specifically, if the UE performs PUCCH transmission in an activated UL BWP b of a carrier f of a primary cell (or secondary cell) c using a PUCCH power control adjustment state based on index l, the UE may determine a PUCCH transmission power $P_{PUCCH,b,f,c}(i,q_u,q_d,l)$ (dBm) at a PUCCH transmission occasion i based on Equation 4 below.

$$P_{PUCCH,b,f,c}(i, q_u, q_d, l) = \min\begin{Bmatrix} P_{CMAX,f,c}(i), \\ P_{O\_PUCCH,b,f,c}(q_u) + 10\log_{10}(2^\mu \cdot \\ M_{RB,b,f,c}^{PUCCH}(i)) + PL_{b,f,c}(q_d) + \\ \Delta_{F\_PUCCH}(F) + \Delta_{TF,b,f,c}(i) + g_{b,f,c}(i, l) \end{Bmatrix} [dBm] \quad \text{[Equation 4]}$$

In Equation 4, q_u denotes an index for an open loop power control parameter (e.g., Po, etc.), and up to 8 parameter values for each cell may be set. Index q_d denotes an index of a DL RS resource for path loss (PL) measurement (e.g., $PL_{b,f,c}(q_d)$), and up to 4 measurement values for each cell may be set. Index l denotes an index for a closed loop power control process, and up to 2 processes for each cell may be configured.

More specifically, Po (e.g., $P_{O\_PUCCH,b,f,c}(q_u)$) is a parameter broadcasted as a part of system information, and may denote a target reception power at a reception side. The Po value may be set considering a throughput of UE, a capacity of cell, a noise and/or interference, etc. Further, $P_{CMAX,f,c}(i)$ may denote a configured UE transmission power. For example, the configured UE transmission power may be interpreted as the 'configured maximum UE output power' defined in 3GPP TS 38.101-1 and/or TS38.101-2. $M_{RB,b,f,c}^{PUCCH}(i)$ may denote a bandwidth of PUCCH resource allocation expressed as the number of resource blocks (RBs) for a PUCCH transmission occasion based on a subcarrier spacing (μ). In addition, a delta function (e.g., $\Delta_{F\_PUCCH}(F)$, $\Delta_{TF,b,f,c}(i)$) may be set considering a PUCCH format (e.g., PUCCH formats 0, 1, 2, 3, 4, etc.). $g_{b,f,c}(i,l)$ related to the PUCCH power control adjustment state may be configured or indicated based on a TPC command field of DCI (e.g., DCI format 1_0, DCI format 1_1, DCI format 2_2, etc.) received or detected by the UE.

In this case, a specific RRC parameter (e.g., PUCCH-SpatialRelationInfo, etc.) and/or a specific MAC-CE command (e.g., PUCCH spatial relation Activation/Deactivation, etc.) may be used to activate or deactivate a linkage between the PUCCH resource and the indexes q_u, q_d, and l. For example, a PUCCH spatial relation Activation/Deactivation command in MAC-CE may activate or deactivate a linkage between the PUCCH resource and the indexes q_u, q_d, and l based on the RRC parameter PUCCH-SpatialRelationInfo. In other words, the indexes q_u, q_d, l, etc. may be associated with a beam, a panel, and/or a spatial domain transmission filter based on specific information. Through this, the PUCCH transmission power control on a per beam, panel, and/or spatial domain transmission filter basis may be performed.

The above-described parameters and/or information for PUCCH power control may be individually (i.e., independently) configured for each BWP. In this case, the parameters and/or information may be configured or indicated via higher layer signaling (e.g., RRC signaling, MAC-CE, etc.) and/or DCI. For example, the parameters and/or information for PUCCH power control may be transmitted via RRC signaling PUCCH-ConfigCommon, PUCCH-PowerControl, etc., and PUCCH-ConfigCommon and PUCCH-PowerControl may be configured as in Table 7 below.

TABLE 7

| | |
|---|---|
| PUCCH-ConfigCommon ::= | SEQUENCE { |
| pucch-ResourceCommon | INTEGER (0..15) |
| pucch-GroupHopping | ENUMERATED { neither, enable, disable }, |
| hoppingId | INTEGER (0..1023) |
| p0-nominal | INTEGER (−202..24) |
| ... | |
| } | |
| PUCCH-PowerControl ::= | SEQUENCE { |
| deltaF-PUCCH-f0 | INTEGER (−16..15) |
| deltaF-PUCCH-f1 | INTEGER (−16..15) |
| deltaF-PUCCH-f2 | INTEGER (−16..15) |
| deltaF-PUCCH-f3 | INTEGER (−16..15) |
| deltaF-PUCCH-f4 | INTEGER (−16..15) |
| p0-Set | SEQUENCE (SIZE (1..maxNrofPUCCH-P0-PerSet)) OF P0-PUCCH |
| pathlossReferenceRSs | SEQUENCE (SIZE (1..maxNrofPUCCH-PathlossReferenceRSs)) OF PUCCH-PathlossReferenceRS |
| twoPUCCH-PC-AdjustmentStates | ENUMERATED {twoStates} |
| ... | |
| } | |
| P0-PUCCH | SEQUENCE { |
| p0-PUCCH-Id | P0-PUCCH-Id, |
| p0-PUCCH-Value | INTEGER (−16..15) |
| } | |
| P0-PUCCH-Id ::= | INTEGER (1..8) |
| PUCCH-PathlossReferenceRS ::= | SEQUENCE { |
| pucch-PathlossReferenceRS-Id | PUCCH-PathlossReferenceRS-Id, |
| referenceSignal | CHOICE { |
| ssb-Index | SSB-Index, |
| csi-RS-Index | NZP-CSI-RS-ResourceId |
| } | |
| } | |

The UE may determine or calculate the PUCCH transmission power through the above-described scheme and transmit PUCCH using the determined or calculated PUCCH transmission power.

3) Power Control of Sounding Reference Signal

With regard to transmission of a sounding reference signal (SRS) in an activated UL BWP of a carrier f of a serving cell c, the UE may calculate a linear power value of a transmission power determined by Equation 5 below. Then, the UE may equally divide the calculated linear power value for antenna port(s) configured for SRS to control the transmission power.

More specifically, if the UE performs SRS transmission in the activated UL BWP b of the carrier f of the serving cell c using a SRS power control adjustment state based on the index l, the UE may determine SRS transmission power $P_{SRS,b,f,c}(i,q_s,l)$ (dBm) at the SRS transmission occasion i based on Equation 5 below.

$$P_{SRS,b,f,c}(i, q_s, l) = \min\begin{Bmatrix} P_{CMAX,f,c}(i), \\ P_{O\_SRS,b,f,c}(q_s) + 10\log_{10}(2^\mu \cdot M_{SRS,b,f,c}(i)) + \\ \alpha_{SRS,b,f,c}(q_s) \cdot PL_{b,f,c}(q_d) + h_{b,f,c}(i, l) \end{Bmatrix} [dBm] \quad \text{[Equation 5]}$$

In Equation 5, q_s denotes an index for an open loop power control parameter (e.g., Po, alpha (a), DL RS resource for path loss (PL) measurements (e.g., $PL_{b,f,c}(q_d)$, etc.), and may be configured for each SRS resource set. Index l denotes an index for a closed loop power control process, and the index may be configured independently from PUSCH or may be configured in association with PUSCH. If the SRS power control is not associated with PUSCH, the maximum number of the closed loop power control processes for SRS may be 1.

More specifically, Po (e.g., $P_{O\_SRS,b,f,c}(q_s)$) is a parameter broadcasted as a part of system information and may denote a target reception power at a reception side. The Po value may be set considering a throughput of UE, a capacity of cell, a noise and/or interference, etc. Further, alpha (e.g., $\alpha_{SRS,b,f,c}(q_s)$) may denote a ratio of performing compensation for pathloss. The alpha may be set to a value between 0 and 1, and full pathloss compensation or fractional pathloss compensation may be performed depending on the set value. In this case, the alpha value may be set considering interference and/or data rates between the UEs. Further, $P_{CMAX,f,c}(i)$ may denote a configured UE transmission power. For example, the configured UE transmission power may be interpreted as the 'configured maximum UE output power' defined in 3GPP TS 38.101-1 and/or TS38.101-2. $M_{SRS,b,f,c}(i)$ may denote a bandwidth of SRS resource allocation expressed as the number of resource blocks (RBs) for an SRS transmission occasion based on a subcarrier spacing ($\mu$). $h_{b,f,c}(i,l)$ related to the SRS power control adjustment state may be configured or indicated based on a TPC command field of DCI (e.g., DCI format 2_3, etc.) received or detected by the UE and/or RRC parameter (e.g srs-PowerControlAdjustmentStates, etc.).

The resource for SRS transmission may be applied as a reference for determining, by the base station and/or UE, a beam, a panel, and/or a spatial domain transmission filter, etc. Considering this, the SRS transmission power control may be performed on a per beam, panel, and/or spatial domain transmission filter.

The above-described parameters and/or information for SRS power control may be individually (i.e., independently) configured for each BWP. In this case, the parameters and/or information may be configured or indicated via higher layer signaling (e.g., RRC signaling, MAC-CE, etc.) and/or DCI. For example, the parameters and/or information for SRS power control may be transmitted via RRC signaling SRS-Config, SRS-TPC-CommandConfig, etc., and SRS-Config and SRS-TPC-CommandConfig may be configured as in Table 8 below.

TABLE 8

| | |
|---|---|
| SRS-Config ::= | SEQUENCE { |
|   srs-ResourceSetToReleaseList | SEQUENCE (SIZE(1..maxNrofSRS-ResourceSets)) OF SRS-ResourceSetId |
|   srs-ResourceSetToAddModList | SEQUENCE (SIZE(1..maxNrofSRS-ResourceSets)) OF SRS-ResourceSet |
|   srs-ResourceToReleaseList | SEQUENCE (SIZE(1..maxNrofSRS-Resources)) OF SRS-ResourceId |
|   srs-ResourceToAddModList | SEQUENCE (SIZE(1..maxNrofSRS-Resources)) OF SRS-Resource |
|   tpc-Accumulation | ENUMERATED {disabled} |
|   ... | |
| } | |
| SRS-ResourceSet ::= | SEQUENCE { |
|   srs-ResourceSetId | SRS-ResourceSetId, |
|   srs-ResourceIdList | SEQUENCE (SIZE(1..maxNrofSRS-ResourcesPerSet)) OF SRS-ResourceId |
|   resourceType | CHOICE { |
|     aperiodic | SEQUENCE { |
|       aperiodicSRS-ResourceTrigger | INTEGER (1..maxNrofSRS-TriggerStates-1), |
|       csi-RS | NZP-CSI-RS-ResourceId |
|       slotOffset | INTEGER (1..32) |
|       ..., | |
|       [[ | |
|       aperiodicSRS-ResourceTriggerList-v1530 | SEQUENCE (SIZE (1..maxNrofSRS-TriggerStates-2)) |
| | OF INTEGER (1..maxNrofSRS-TriggerStates-1) |
|       ]] | |
|     }, | |
|     semi-persistent | SEQUENCE { |
|       associatedCSI-RS | NZP-CSI-RS-ResourceId |
|       ... | |
|     }, | |
|     periodic | SEQUENCE { |
|       associatedCSI-RS | NZP-CSI-RS-ResourceId |
|       ... | |
|     } | |
|   }, | |

TABLE 8-continued

| | |
|---|---|
| usage | ENUMERATED {beamManagement, codebook, nonCodebook, antennaSwitching}, |
| alpha | Alpha |
| p0 | INTEGER (−202..24) |
| pathlossReferenceRS | CHOICE { |
|   ssb-Index |   SSB-Index, |
|   csi-RS-Index |   NZP-CSI-RS-ResourceId |
| } | |
| srs-PowerControlAdjustmentStates | ENUMERATED { sameAsFci2, separateClosedLoop} |
| ... | |
| } | |
| SRS-TPC-CommandConfig ::= | SEQUENCE { |
|   startingBitOfFormat2-3 |   INTEGER (1..31) |
|   fieldTypeFormat2-3 |   INTEGER (0..1) |
|   ..., | |
|   [[ | |
|   startingBitOfFormat2-3SUL-v1530 |   INTEGER (1..31) |
|   ]] | |
| } | |

The UE may determine or calculate the SRS transmission power through the above-described scheme and transmit SRS using the determined or calculated SRS transmission power.

4) Power Control of Random Access Channel

If the UE performs PRACH transmission in the activated UL BWP b of the carrier f of the serving cell c, the UE may dently) configured for each BWP. In this case, the parameters and/or information may be configured or indicated via higher layer signaling (e.g., RRC signaling, MAC-CE, etc.). For example, the parameters and/or information for PRACH power control may be transmitted via RRC signaling RACH-ConfigGeneric, etc., and RACH-ConfigGeneric may be configured as in Table 9 below.

TABLE 9

| | |
|---|---|
| RACH-ConfigGeneric ::= | SEQUENCE { |
|   prach-ConfigurationIndex |   INTEGER (0..255), |
|   msg1-FDM |   ENUMERATED {one, two, four, eight}, |
|   msg1-FrequencyStart |   INTEGER (0..maxNrofPhysicalResourceBlocks−1), |
|   zeroCorrelationZoneConfig |   INTEGER(0..15), |
|   preambleReceivedTargetPower |   INTEGER (−202..−60), |
|   preambleTransMax |   ENUMERATED {n3, n4, n5, n6, n7, n8, n10, n20, n50, n100, n200}, |
|   powerRampingStep |   ENUMERATED {dB0, dB2, dB4, dB6}, |
|   ra-ResponseWindow |   ENUMERATED {sl1, sl2, sl4, sl8, sl10, sl20, sl40, sl80}, |
|   ... | |
| } | | determine PRACH transmission power $P_{PRACH,b,f,c}(i)$ (dBm) at PRACH transmission occasion i based on Equation 6 below.

$$P_{PRACH,b,f,c}(i) = \min\{P_{CMAX,f,c}(i), P_{PRACH,target,f,c} + PL_{b,f,c}\}[dBm] \quad \text{[Equation 6]}$$

In Equation 6, $P_{CMAX,f,c}(i)$ may denote a configured UE transmission power. For example, the configured UE transmission power may be interpreted as the 'configured maximum UE output power' defined in 3GPP TS 38.101-1 and/or TS38.101-2. Further, $P_{PRACH,target,f,c}$ denotes a PRACH target reception power provided via higher layer signaling (e.g., RRC signaling, MAC-CE, etc.) for the activated UL BWP. $PL_{b,f,c}$ denotes a pathloss for the activated UL BWP and may be determined based on DL RS associated with PRACH transmission in the activated DL BWP of the serving cell c. For example, the UE may determine a pathloss associated with PRACH transmission based on synchronization signal (SS)/physical broadcast channel (PBCH) blocks associated with PRACH transmission.

The above-described parameters and/or information for PRACH power control may be individually (i.e., indepen- The UE may determine or calculate the PRACH transmission power through the above-described scheme and transmit PRACH using the determined or calculated PRACH transmission power.

5) Priority for Transmission Power Control

A method for controlling a transmission power of a UE is described below, considering a single cell operation in a situation of carrier aggregation or a single cell operation in a situation of multiple UL carriers (e.g., two UL carriers) is considered.

If the total UE transmission power for uplink transmissions (e.g., PUSCH, PUCCH, SRS, and/or PRACH transmissions in the 1) to 4) described above) at each transmission occasion i exceeds a linear value (e.g., $\hat{P}_{CMAX}(i)$) of the configured UE transmission power, the UE may be configured to allocate power for the uplink transmissions according to a priority order. For example, the configured UE transmission power may mean the 'configured maximum UE output power' (e.g., $P_{CMAX}(i)$) defined in 3GPP TS 38.101-1 and/or TS 38.101-2.

The priority for transmission power control may be configured or defined in the following order.

PRACH transmission in primary cell (PCell)
  PUCCH for HARQ-ACK (Hybrid Automatic Repeat and reQuest-Acknowledgement) information and/or scheduling request (SR), or PUSCH for HARQ-ACK information PUCCH or PUSCH for channel state information (CSI)
PUSCH for HARQ-ACK information or not for CSI
SRS transmission (but, aperiodic SRS has a higher priority than semi-persistent SRS and/or periodic SRS) or
PRACH transmission in a serving cell not the Pcell Through the power allocation based on the priority order described above, the UE may control so that the total transmission power at each of symbols of the transmission occasion i is less than or equal to the linear value of the configured UE transmission power. For example, to this end, the UE may be configured to scale and/or drop the power for uplink transmission with a lower priority. In this case, detailed matters for scaling and/or dropping may be configured or defined to follow a UE implementation.

As a specific example, for transmissions having the same priority in carrier aggregation, the UE may consider transmission in PCell as a higher priority than transmission in SCell. And/or, for transmissions having the same priority in multiple UL carriers (e.g., two UL carriers), the UE may consider a carrier, to which PUCCH transmission is configured, as a higher priority. Further, if the PUCCH transmission is not configured in any carrier, the UE may consider transmission in a non-supplementary UL carrier as a higher priority.

6) Transmission Power Control Procedure

FIG. 14 illustrates an example of a procedure of controlling an uplink transmission power.

First, a user equipment (UE) may receive, from a base station, parameter and/or information related to transmission power (Tx power), in S1410. In this case, the UE may receive the parameter and/or information via higher layer signaling (e.g., RRC signaling, MAC-CE, etc.). For example, with regard to PUSCH transmission, PUCCH transmission, SRS transmission, and/or PRACH transmission, the UE may receive the parameters and/or information (e.g., Table 6, Table 7, Table 8, Table 9, etc.) related to the transmission power control described in the above 1) to 4).

Next, the UE may receive, from the base station, a TPC command related to the transmission power, in S1420. In this case, the UE may receive the TPC command via lower layer signaling (e.g., DCI), etc. For example, with regard to PUSCH transmission, PUCCH transmission, and/or SRS transmission, the UE may receive information for the TPC command to be used to determine a power control adjustment state through a TPC command field of a predefined DCI format, as described in the above 1) to 3). However, for the PRACH transmission, the corresponding step may be omitted.

Next, the UE may determine (or calculate) a transmission power for uplink transmission based on the parameter, information, and/or TPC command received from the base station, in S1430. For example, the UE may determine PUSCH transmission power, PUCCH transmission power, SRS transmission power, and/or PRACH transmission power based on the method (e.g., Equation 3, Equation 4, Equation 5, Equation 6, etc.) described in the above 1) to 4). And/or, if two or more uplink channels and/or signals are required to be overlapped and transmitted as in a situation such as carrier aggregation, the UE may determine the transmission power for uplink transmission considering the priority, etc. in the above 5).

Next, the UE may perform transmission of one or more uplink channels and/or signals (e.g., PUSCH, PUCCH, SRS, PRACH, etc.) for the base station based on the determined (or calculated) transmission power, in S1440.

Power Headroom Report

A power headroom report is performed to provide, by a UE, the following information to a base station.

Type 1 power headroom: a difference between a nominal maximum transmission power (e.g., $P_{CMAX,f,c}(i)$ or configured UE transmission power or configured UE maximum output power) per activated serving cell and an estimated transmission power for UL-SCH/PUSCH per activated serving cell Type 2 power headroom: a difference between an estimated transmission power of PUCCH and UL-SCH/PUSCH transmitted on SpCell of other MAC entity (i.e., E-UTRA MAC entity in EN-DC) and a nominal maximum transmission power (e.g., $P_{CMAX,f,c}(i)$ or configured UE transmission power or configured UE maximum output power) in the SpCell Type 3 power headroom: a difference between a nominal maximum transmission power (e.g., $P_{CMAX,f,c}(i)$ or configured UE transmission power or configured UE maximum output power) per activated serving cell and an estimated transmission power of SRS per activated serving cell If two UL carriers are configured in a serving cell, and the Type 1 power headroom report and the Type 3 power headroom report are determined in the serving cell, if both the Type 1 power headroom report and the Type 3 power headroom report have been determined based on actual transmission or have been determined based on reference transmission, the UE may perform the Type 1 power headroom report, or if either the Type 1 power headroom report or the Type 3 power headroom report is determined based on the reference transmission, the UE may perform the power headroom report (e.g., Type 1 or Type 3) determined based on the actual transmission.

In the present disclosure, virtual PH may mean the Type 1 power headroom, the Type 2 power headroom and/or the Type 3 power headroom determined based on reference transmission.

1) Type 1 PH Report

If a UE performs the Type 1 power headroom of a serving cell activated based on actual PUSCH transmission (at PUSCH transmission occasion i in activated UL BWP b of carrier f of the serving cell c), the Type 1 power headroom (i.e., $PH_{type1,b,f,c}(i,j,q_d,l)$) may be determined as in the following Equation 7.

$$PH_{type1,b,f,c}(i, j, q_d, l) = P_{CMAX,f,c}(i) - \qquad \text{[Equation 7]}$$
$$\{P_{O\_PUSCH,b,f,c}(j) + 10\log_{10}(2^\mu \cdot M_{RB,b,f,c}^{PUSCH}(i)) +$$
$$\alpha_{b,f,c}(j) \cdot PL_{b,f,c}(q_d) + \Delta_{TF,b,f,c}(i) + f_{b,f,c}(i, l)\}[\text{dB}]$$

In Equation 7, $P_{CMAX,f,c}(i)$, $P_{O\_PUSCH,b,f,c}(j)$, $M_{RB,b,f,c}^{PUSCH}(i)$, $\alpha_{b,f,c}(j)$, $PL_{b,f,c}(q_d)$, $\Delta_{TF,b,f,c}(i)$ and $f_{b,f,c}(i, l)$ have been described in the power control of UL data channel described above.

If the UE performs the Type 1 power headroom of an activated serving cell based on reference PUSCH transmission (at PUSCH transmission occasion i in activated UL BWP b of carrier f of the serving cell c), the Type 1 power headroom (i.e., $PH_{type1,b,f,c}(i,j,q_d,l)$) may be determined as in the following Equation 8.

$$PH_{type1,b,f,c}(i, j, q_d, l) = \tilde{P}_{CMAX,f,c}(i) - $$

$$\{P_{O\_PUSCH,b,f,c}(j) + \alpha_{b,f,c}(j) \cdot PL_{b,f,c}(q_d) + f_{b,f,c}(i, l)\}[dB]$$

[Equation 8]

In Equation 8, $\tilde{P}_{CMAX,f,c}(i)$ is calculated assuming that MPR=0 dB, A-MPR=0 dB, P-MPR=0 dB, and ΔTC=0 dB.

$\alpha_{SRS,f,c}(q_s)$, $PL_{b,f,c}(q_d)$ and $h_{b,f,c}(i)$ have been described in the power control of sounding reference signal described above.

3) Power Headroom Reporting Related Procedure

In order to perform power headroom reporting, PHR-Config that a base station configures to a UE may be configured as in the following Table 10.

TABLE 10

| - PHR-Config |
| --- |
| The IE PHR-Config is used to configure parameters for power headroom reporting. |
| PHR-Config information element |
| -- ASN1START |
| -- TAG-PHR-CONFIG-START |
| PHR-Config ::=                        SEQUENCE { |
|    phr-PeriodicTimer                 ENUMERATED {sf10, sf20, sf50, sf100, sf200,sf500, sf1000, infinity}, |
|    phr-ProhibitTimer                 ENUMERATED {sf0, sf10, sf20, sf50, sf100, sf200, sf500, sf1000}, |
|    phr-Tx-PowerFactorChange          ENUMERATED {dB1 dB3, dB6, infinity}, |
|    multiplePHR                       BOOLEAN, |
|    dummy                             BOOLEAN, |
|    phr-Type2OtherCell                BOOLEAN, |
|    phr-ModteOtherCG                  ENUMERATED {real, virtual}, |
|    ... |
| } |
| -- TAG-PHR-CONFIG-STOP |
| -- ASN1STOP |

A-MPR, P-MPR and ΔTC are defined in the predefined standard (38.101-1, 38.101-2, 38.101-3), and the remaining parameters have been described in the power control of UL data channel.

2) Type 3 PH Report

If the UE performs the Type 3 power headroom of a serving cell activated based on actual SRS transmission (at SRS transmission occasion i in activated UL BWP b of carrier f of the serving cell c), the Type 1 power headroom (i.e., $PH_{type3b,f,c}(i,q_s)$) may be determined as in the following Equation 9.

$$PH_{type3,b,f,c}(i, q_s) = P_{CMAX,f,c}(i) - $$

$$\{P_{O\_SRS,b,f,c}(q_s) + 10\log_{10}(2^\mu \cdot M_{SRS,b,f,c}(i)) + $$

$$\alpha_{SRS,b,f,c}(q_s) \cdot PL_{b,f,c}(q_d) + h_{b,f,c}(i)\}[dB]$$

[Equation 9]

In Equation 9, $P_{CMAX,f,c}(i)$, $P_{O\_SRS,b,f,c}(q_s)$, $M_{SRS,b,f,c}(i)$, $\alpha_{SRS,b,f,c}(q_s)$, $PL_{b,f,c}(q_d)$ and $h_{b,f,c}(i)$ have been described in the power control of sounding reference signal described above.

If the UE performs the Type 3 power headroom of a serving cell activated based on reference SRS transmission (at SRS transmission occasion i in activated UL BWP b of carrier f of the serving cell c), the Type 3 power headroom (i.e., $PH_{type3b,f,c}(i,q_s)$) may be determined as in the following Equation 10.

$$PH_{type3,b,f,c}(i, q_s) = \tilde{P}_{CMAX,f,c}(i) - \{P_{O\_SRS,b,f,c}(q_s) + $$

$$\alpha_{SRS,b,f,c}(q_s) \cdot PL_{b,f,c}(q_d) + h_{b,f,c}(i)\}[dB]$$

[Equation 10]

In Equation 10, $q_s$ is an SRS resource set corresponding to SRS-ResourceSetId=0 for UL BWP b, and $P_{O\_SRS,b,f,c}(q_s)$, In Table 10, dummy is not used, and the UE may ignore the received value.

multiplePHR indicates whether power headroom shall be reported using the Single Entry PHR MAC control element or using Multiple Entry PHR MAC control element defined in the predefined standard (e.g., TS 38.321). True means to use Multiple Entry PHR MAC control element, and False means to use the Single Entry PHR MAC control element. The base station (or network) may configure this field to true for MR-DC and UL CA for NR, and to false in all other cases.

phr-ModeOtherCG indicates the mode used for the PHR of the activated cells that are part of the other Cell Group (i.e., MCG or SCG), when DC is configured. If the UE is configured with only one cell group, it ignores the field.

phr-PeriodicTimer represents value in number of subframes for PHR reporting. Value sf10 corresponds to 10 subframes, value sf20 corresponds to 20 subframes, and so on.

phr-ProhibitTimer represents value in number of subframes for PHR reporting. Value sf0 corresponds to 0 subframe, value sf10 corresponds to 10 subframes, value sf20 corresponds to 20 subframes, and so on.

phr-Tx-PowerFactorChange is value in dB for PHR reporting. Value dB1 corresponds to 1 dB, dB3 corresponds to 3 dB, and so on. The same value applies for each serving cell.

If phr-Type2OtherCell is set to true, the UE shall report a PHR type 2 for the SpCell of the other MAC entity. The base station (or network) sets this field to false if the UE is not configured with an E-UTRA MAC entity.

A power headroom report (PHR) may be triggered if any of the following events occur.

phr-ProhibitTimer expires or has expired and the path loss has changed more than phr-Tx-PowerFactorChange dB for at least one activated serving cell of MAC entity which is used as a pathloss reference since the last transmission of a PHR in this MAC entity;

phr-PeriodicTimer expires;

upon configuration or reconfiguration of the power headroom reporting functionality by upper layers;

activation of an SCell of any MAC entity with configured uplink;

addition of the PSCell (i.e., PSCell is newly added or changed);

phr-ProhibitTimer expires or has expired, when the MAC entity has UL resources for new transmission, and the following is true for any of the activated serving cells of any MAC entity with configured uplink: there are UL resources allocated for transmission or there is a PUCCH transmission on this cell, and the required power backoff due to power management for this cell has changed more than phr-Tx-PowerFactorChange dB since the last transmission of a PHR when the MAC entity had UL resources allocated for transmission or PUCCH transmission on this cell.

If UL transmission resources for new transmission are allocated to MAC entity of the UE, the UE includes power headroom corresponding to Type 1 PHR, Type 2 PHR and/or Type 3 PHR and/or PCMAX in MAC-CE as represented in Table 10 and may transmit it to the base station. Detailed conditions and steps related to this may be the followings.

If the MAC entity has UL resources allocated for a new transmission, the MAC entity shall the following operation.

If it is the first UL resource allocated for a new transmission since the last MAC reset, the MAC entity starts phr-PeriodicTimer.

If the power headroom reporting procedure determines that at least one PHR has been triggered and not cancelled; and if the allocated UL resources can accommodate the MAC CE for PHR which the MAC entity is configured to transmit, plus its subheader, as a result of LCP:

if multiplePHR with value true is configured, for each activated serving cell with configured uplink associated with any MAC entity, the MAC entity obtains the value of the Type 1 or Type 3 power headroom for the corresponding uplink carrier. If this MAC entity has UL resources allocated for transmission on this serving cell, or if the other MAC entity, if configured, has UL resources allocated for transmission on this serving cell and phr-ModeOtherCG is set to real by upper layers, the MAC entity obtains the value for the corresponding PCMAX,f,c field from the physical layer.

If phr-Type2OtherCell with value true is configured, and if the other MAC entity is E-UTRA MAC entity, the MAC entity obtains the value of the Type 2 power headroom for the SpCell of the other MAC entity (i.e., E-UTRA MAC entity), and if phr-ModeOtherCG is set to real by upper layers, the MAC entity obtains the value for the corresponding PCMAX,f,c field for the SpCell of the other MAC entity (i.e., E-UTRA MAC entity) from the physical layer.

The MAC entity instructs the Multiplexing and Assembly procedure to generate and transmit the Multiple Entry PHR MAC CE defined based on the values reported by the physical layer.

If else (i.e., Single Entry PHR format is used), the MAC entity obtains the value of the Type 1 power headroom from the physical layer for the corresponding uplink carrier of the PCell, obtains the value for the corresponding PCMAX,f,c field from the physical layer, and instructs the Multiplexing and Assembly procedure to generate and transmit the Single Entry PHR MAC CE based on the values reported by the physical layer.

The MAC entity starts or restarts phr-PeriodicTimer.
The MAC entity starts or restarts phr-ProhibitTimer.
The MAC entity cancels all triggered PHR(s).

As described above, the UE may send, to the MAC layer, value(s) (e.g., power headroom(s) and/or PCMAX(s)) for the Type 1/2/3 power headroom report at the physical layer of the UE using information preconfigured from the base station, and the MAC layer, as in Table 10 and the above description, may send and/or report, to the base station, value(s) (e.g., power headroom(s) and/or PCMAX(s)) received (i.e., sent) from the physical layer via MAC-CE (e.g., Single Entry PHR MAC CE or Multiple Entry PHR MAC CE). For example, the MAC CE for the corresponding power headroom report may be transmitted and/or reported to the base station through the step S1440 of FIG. 14 described above, or transmitted and/or reported to the base station via subsequently transmitted uplink transmission.

The Single Entry PHR MAC CE and the Multiple Entry PHR MAC CE described above may be configured as follows.

If PHR related value(s) (e.g., all PHR related value(s) including modification of the corresponding values in addition to PH, virtual PH, and/or PCMAX) mentioned below in the present disclosure are transmitted/sent/reported (via MAC CE), the corresponding values may be interpreted to be leveled to N bit (i.e., N=6) as follows and to be transmitted/sent/reported. That is, a PHR related MAC-CE procedure described in the present disclosure may be interpreted to be performed with reference to the content described below.

Single Entry PHR MAC CE

The Single Entry PHR MAC CE is identified by a MAC subheader with LCID. The Single Entry PHR MAC CE has a fixed size and consists of two octets defined as follows (see FIG. 15).

R: Reserved bit, set to 0;

Power Headroom (PH): This field indicates the power headroom level. The length of the field is 6 bits. The reported PH and the corresponding power headroom levels are the same as Table 11 below. The corresponding measured values in dB may be defined in the predefined standard (e.g., TS 38.133).

PCMAX,f,c: This field indicates the PCMAX,f,c used for calculation of the preceding PH field. The PCMAX,f,c and the corresponding nominal UE transmit power levels are the same as Table 12. The corresponding measured values in dBm may be defined in the predefined standard (e.g., TS 38.133). Table 11 represents the power headroom level for PHR, and Table 12 represents the nominal UE transmit power level for PHR.

TABLE 11

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_61 |
| 61 | POWER_HEADROOM_61 |
| 62 | POWER_HEADROOM_62 |
| 63 | POWER_HEADROOM_63 |

TABLE 12

| $P_{CMAX,f,c}$ | Nominal UE transmit power level |
|---|---|
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |

Multiple Entry PHR MAC CE

The Multiple Entry PHR MAC CE is identified by a MAC subheader with LCID. The Multiple Entry PHR MAC CE has a variable size, and includes the bitmap, a Type 2 PH field and an octet containing the associated PCMAX,f,c field (if reported) for SpCell of the other MAC entity, and a Type 1 PH field and an octet containing the associated PCMAX,f,c field (if reported) for the PCell.

It further includes, in ascending order based on the ServCellIndex, one or multiple of Type X PH fields and octets containing the associated PCMAX,f,c fields (if reported) for serving cells other than PCell indicated in the bitmap. X is either 1 or 3.

The presence of Type 2 PH field for SpCell of the other MAC entity is configured by phr-Type2OtherCell with value true.

A single octet bitmap is used for indicating the presence of PH per serving cell when the highest ServCellIndex of serving cell with configured uplink is less than 8. Otherwise, four octets are used.

The MAC entity determines whether PH value for an activated serving cell is based on real transmission or a reference format by considering the configured grant(s) and downlink control information which has been received until and including the PDCCH occasion for the first UL grant. A new transmission is received since a PHR has been triggered if the PHR MAC CE is reported on an uplink grant received on the PDCCH or until the first uplink symbol of PUSCH transmission minus PUSCH preparation time.

For a band combination in which the UE does not support dynamic power sharing, the UE may omit the octets containing Power Headroom field and PCMAX,f,c field for serving cells in the other MAC entity except for the PCell in the other MAC entity. The reported values of Power Headroom and PCMAX,f,c for the PCell are up to UE implementation.

The PHR MAC CE may be configured as illustrated in FIG. 16 or 17.

Ci: This field indicates the presence of a PH field for the serving cell with ServCellIndex i. The Ci field set to 1 indicates that a PH field for the serving cell with ServCellIndex i is reported. The Ci field set to 0 indicates that a PH field for the serving cell with ServCellIndex i is not reported.

R: Reserved bit, set to 0;

V: This field indicates if the PH value is based on a real transmission or a reference format. For Type 1 PH, the V field set to 0 indicates real transmission on PUSCH, and the V field set to 1 indicates that a PUSCH reference format is used. For Type 2 PH, the V field set to 0 indicates real transmission on PUCCH, and the V field set to 1 indicates that a PUCCH reference format is used. For Type 3 PH, the V field set to 0 indicates real transmission on SRS, and the V field set to 1 indicates that an SRS reference format is used. Furthermore, for Type 1, Type 2, and Type 3 PH, the V field set to 0 indicates the presence of the octet containing the associated PCMAX,f,c field, and the V field set to 1 indicates that the octet containing the associated PCMAX,f,c field is omitted.

Power Headroom (PH): This field indicates the power headroom level. The length of the field is 6 bits. The reported PH and the corresponding power headroom levels are shown in Table 11.

P: This field indicates whether the MAC entity applies power backoff due to power management. The MAC entity shall set the P field to 1 if the corresponding PCMAX,f,c field would have had a different value if no power backoff due to power management had been applied.

PCMAX,f,c: If present, this field indicates the PCMAX,f,c for the NR serving cell and the PCMAX,c or $\tilde{P}$CMAX,c. For the E-UTRA serving cell used for calculation of the preceding PH field, the reported PCMAX,f,c and the corresponding nominal UE transmit power levels are shown in Table 12.

FIG. 16 illustrates Multiple Entry PHR MAC CE in which highest ServCellIndex of serving cell with configured uplink is less than 8. FIG. 17 illustrates Multiple Entry PHR MAC CE in which highest ServCellIndex of serving cell with configured uplink is 8 or 8 or more.

Hereinafter, downlink (DL) means communication from a base station to a terminal, and uplink (UL) means communication from the terminal to the base station. In the downlink, a transmitter may be part of the base station, and a receiver may be part of the terminal. In the uplink, the transmitter may be part of the terminal, and the receiver may be part of the base station. The base station may be expressed as a first communication device, and the terminal may be expressed as a second communication device.

A base station (BS) may be replaced with terms including a fixed station, a Node B, an evolved-NodeB (eNB), a next generation NodeB (gNB), a base transceiver system (BTS), an access point (AP), a network (5G network), an artificial intelligence (AI) system/module, a road side unit (RSU), a robot, an unmanned aerial vehicle (UAV), an augmented reality (AR) device, a virtual reality (VR) device, and the like.

Further, the terminal may be fixed or mobile and may be replaced with terms including a user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, and a device-to-device (D2D) device, a vehicle, a road side unit (RSU), a robot, an artificial intelligence (AI) module, an unmanned aerial vehicle (UAV), an augmented reality (AR) device, a virtual reality (VR) device, and the like.

In the UE implementation in a high frequency band, UE modeling provided with a plurality of panels each including one or multiple antennas is considered (e.g., bi-directional two panels). Various formats of this multi-panel UE implementation may be considered. FIG. 18 illustrates an example of RF switch based multi-panel UE implementation. The multi-panel UE may be implemented based on RF switch as illustrated in FIG. 18. In this case, only one panel is activated at one moment, and signal transmission may be disabled for a predetermined period of time in order to change an activation panel (i.e., panel switching).

FIG. 19 illustrates an example of RF connection based multi-panel UE implementation.

As a multi-panel implementation of another scheme, as illustrated in FIG. 19, RF chains may be connected so that each panel can be activated at any time. In this case, time required for panel switching may be 0 or very small, and it may be possible to perform simultaneous signal transmission by simultaneously activating a plurality of panels according to modem and power amplifier construction (simultaneous transmission across multi-panel (STxMP)).

For a UE including a plurality of panels, a radio channel state may be different for each panel. Further, RF and/or antenna configuration may be different for each panel, and thus a method of estimating channels for each panel is required.

In particular, a process for transmitting one or multiple SRS resources for each panel is required to measure uplink quality or manage uplink beams or to measure downlink quality of each panel or manage downlink beams by utilizing channel reciprocity. Here, multiple SRS resources may SRS resources that are transmitted in different beams within one panel, or SRS resources that are repeatedly transmitted with the same beam.

Hereinafter, for convenience of description, a set of SRS resources transmitted at the same panel is referred to as an SRS resource group. Alternatively, hereinafter, for convenience of description, a set of SRS resources transmitted on a specific usage parameter (e.g., beam management, antenna switching, codebook-based PUSCH, non-codebook based PUSCH) and on a specific time domain behavior (e.g., aperiodic, semi-persistent, or periodic) at the same panel is referred to as an SRS resource group.

The SRS resource group may utilize as it is the configuration of SRS resource set supported in Rel-15 NR system, and may bundle one or multiple SRS resources and separately configure them. Alternatively, the SRS resource group may bundle one or multiple SRS resources with the same time domain behavior and the same usage and separately configure them.

For reference, in Rel-15, a plurality of SRS resource sets can be configured only in the case that usage is beam management for the same usage and the same time domain behavior. It is defined that simultaneous transmission is impossible between the SRS resources configured in the same SRS resource set, but simultaneous transmission is possible between SRS resources belonging to different SRS resource sets. If the panel implementation and the multi-panel simultaneous transmission are considered as illustrated in FIG. 2, the corresponding concept (SRS resource set) may be matched to the SRS resource group as it is. However, if the implementation (panel switching) illustrated in FIG. 18 is considered, the SRS resource group may be separately defined. For example, a specific ID may be given to each SRS resource. It may be configured such that resources with the same ID belong to the same SRS resource group, and resources with different IDs belong to different SRS resource groups.

The 'panel' called in the present disclosure can be variously interpreted as 'a group of UE antenna elements', 'a group of UE antenna ports', 'a group of UE logical antennas', and so on. Various methods may be taken into account as to which physical/logical antennas or antenna ports are bundled and mapped to one panel, considering location/distance/correlation between antennas, RF configuration, and/or antenna (and/or antenna port) virtualization manner, and so on. This mapping process may vary depending on the UE implementation.

And/or, the 'panel' called in the present disclosure may be modified and interpreted and/or applied as 'a plurality of panels (or at least one panel)' or 'a panel group'. Alternatively, the 'panel' called in the present disclosure may be modified and interpreted and/or applied as 'a plurality of panels (or at least one panel)' or 'a panel group' having similarity/common value from a specific characteristic perspective (e.g., timing advance (TA), power control parameter, etc.).

And/or, the 'panel' called in the present disclosure may be modified and interpreted and/or applied as 'a plurality of antenna ports (or at least one antenna port)' or 'a plurality of uplink resources (or at least one uplink resource)' or 'an antenna port group' or 'an uplink resource group (or set)'. Alternatively, the 'panel' called in the present disclosure may be modified and interpreted and/or applied as 'a plurality of antenna ports (or at least one antenna port)' or 'a plurality of uplink resources (or at least one uplink resource)' or 'an antenna port group' or 'an uplink resource group (or set)' having similarity/common value from a specific characteristic perspective (e.g., TA, power control parameter, etc.).

And/or, the 'panel' called in the present disclosure may be modified and interpreted and/or applied as 'a plurality of beams (or at least one beam)' or 'at least one beam group (or set)'. Alternatively, the 'panel' called in the present disclosure may be modified and interpreted and/or applied as 'a plurality of beams (or at least one beam)' or 'at least one beam group (or set)' having similarity/common value from a specific characteristic perspective (e.g., TA, power control parameter, etc.).

And/or, the 'panel' called in the present disclosure may be defined as unit used for the UE to construct a transmission beam and/or a reception beam. For example, a 'transmission panel' may be defined as unit in which a plurality of candidate transmission beams can be generated from one panel, but only one beam among them can be used in transmission at a specific time. That is, only one transmission beam (spatial relation information RS) per Tx panel may be used in order to transmit a specific uplink signal and/or uplink channel.

And/or, the 'panel' in the present disclosure may be called 'a plurality of antenna ports (or at least one antenna port)' or 'an antenna port group' or 'an uplink resource group (or set)' in which uplink synchronization is common/similar, and may be modified and interpreted and/or applied as a generalized expression of 'uplink synchronization unit (USU)'. In addition, the 'panel' in the present disclosure may be modified and interpreted and/or applied as a generalized expression of 'uplink transmission entity (UTE)'.

And/or, the 'uplink resource (or resource group)' may be modified and interpreted and/or applied as a PUSCH resource (or resource group (or set)), a PUCCH resource (or resource group (or set)), an SRS resource (or resource group (or set)), and/or a PRACH resource (or resource group (or set)).

And/or, the modification interpretation and/or the modification application may be, vice versa, modification interpretation and/or modification application.

And/or, the 'antenna (or antenna port)' in the present disclosure may represent a physical or logical antenna (or antenna port). The following two methods may be considered to support the above process.

(SRS configuration method 1) If a base station configures a plurality of SRS resource groups to a UE via a higher layer message, the UE may map different SRS resource groups to different panel(s).

For example, if SRS resource group #0 and SRS resource group #1 are configured via RRC, two-panel UE maps each panel to each SRS resource group and transmits SRS from the corresponding panel according to an SRS triggering command of the base station. Here, two SRS resource groups may mean that two SRS resource groups (or SRS resource group sets, SRS resource sets) are separately configured for a plurality of SRS resources having the same usage (e.g., antenna switching, beam management, etc.) and the same time domain behavior (e.g., aperiodic, semi-persistent, or periodic). And/or, the UE may report how many SRS resource groups are required for the same usage and the same time-domain behavior, as a capability. And/or, the UE may report how many UL Tx panels are mounted on the UE, as a capability.

If the base station configures one or a plurality of SRS resource groups to the corresponding UE based on the report information of the UE described above, the UE may freely map each SRS resource group according to the UE implementation, regarding that each SRS resource group is actually mapped to which UE panel (or UE panel group). And/or, the base station may indicate a panel (or group), to which the corresponding SRS resource is to be mapped, by giving an explicit or implicit ID corresponding to each panel (group) to each group. And/or, the mapping between the SRS resource group and the UE panel (or panel group) may be implicitly designated based on "different characteristic" that are configured differently for each group.

And/or, as an example of the 'different characteristic', UL power control may be considered. For example, all and/or some of UL power control parameters (e.g., DLRS for pathloss (PL)), closed-loop power control parameter (CLPC), Pc_max, etc.) may be configured/designated differently for each SRS resource group, or an UL power control process (ID) may be separately configured for each SRS resource group.

And/or, the UE may map a panel (or panel group) based on information configured for each SRS resource group. For example, if a maximum transmission value (Pc_max) is different for each panel (or panel group), and the corresponding information has been transmitted to the base station, the base station may configure Pc_max value to be applied to each SRS resource group based on this, and the UE may map a panel (and/or panel group) depending on the maximum transmission value configured to each SRS resource group.

And/or, as another example of the 'different characteristic', UL timing advance (TA) may be considered. That is, a TA value to be applied upon the transmission on a per SRS resource group basis may be configured and/or designated differently. For example, the UE may perform a specific PRACH preamble, PRACH occasion, and/or RACH procedure using each panel (or panel group), and then obtain the TA value to be applied to each panel (or panel group). If it is separately set which TA value (or value corresponding to which RACH process) to be applied for each SRS resource group, the corresponding SRS resource group may be transmitted using the panel (or panel group) having transmitted the corresponding PRACH.

And/or, as another example of the 'different characteristic', the number of antenna ports per panel (or panel group) may be considered. For example, if the UE reports the number of antenna ports required for each panel (or panel group) or each SRS resource group as 2 and 4 differently, the SRS resource grouping may be implicitly performed depending on the total number of antenna ports configured for SRS resources belonging to each SRS resource group.

(SRS configuration method 2) The base station may configure one (or a plurality of) SRS resource group to the UE via a higher layer message, and then may designate, to the UE, the panel (or panel group) to transmit the corresponding SRS resource group via a lower layer message.

For example, if SRS resource group #0 is configured via RRC and panel #0 is indicated via MAC-CE and/or DCI, two-panel UE may transmit SRS from a first panel, and if panel #1 is indicated via MAC-CE and/or DCI, the two-panel UE may transmit SRS from a second panel.

As another example, if SRS resource group #0 and SRS resource group #1 are configured via RRC and {panel #0, panel #1} is indicated via MAC-CE and/or DCI, the UE may transmit SRS using resources corresponding to SRS resource group #0 and SRS resource group #1 from the first two panels, and if {panel #1, panel #2} is indicated via MAC-CE and/or DCI, the UE may transmit SRS using resources corresponding to SRS resource group #0 and SRS resource group #1 from the second panel and the third panel.

And/or, the SRS configuration method 1 and the SRS configuration method 2 may be similarly expanded and applied to other UL signals and/or UL channels, such as PUCCH, PRACH, and/or PUSCH, as well as SRS. In this case, the SRS configuration method 1 may be expanded and/or replaced with UL (e.g., PUCCH, PRACH, PUSCH, etc.) configuration method 1, and the SRS configuration method 2 may be expanded and/or replaced with UL (e.g., PUCCH, PRACH, PUSCH, etc.) configuration method 2. In other words, an UL resource group to be applied in the same panel may be configured via a higher layer message (e.g., RRC signaling, MAC-CE, etc.).

The SRS configuration method 2 is a method in which a plurality of panels can share the same SRS resource group. Since the SRS configuration method 2 has a higher layer configuration signaling overhead less than the SRS configuration method 1, it is a method more suitable for UEs which perform UL transmission using only one panel at one moment, but may be inappropriate for UEs in which STxMP is supported.

On the contrary, the SRS configuration method 1 may have a greater SRS configuration signaling burden, but has an advantage of supporting various UE implementations, particularly, UEs supporting STxMP.

In the UE panel implementation, a power amplifier (PA) may also be implemented in various forms. For example, a two-panel UE, which can transmit up to 23 dBm, may be implemented such that the UE can transmit up to 20 dBm for each panel (considering STxMP), or the UE can transmit up to 23 dBm for each panel (considering panel selection only). And/or, the UE may be implemented in various method including transmitting up to 20 dBm for some panels and transmitting up to 23 dBm for some panels, and so on.

Even if the UE is provided with the good PA, the UE is designed such that maximum transmission power is limited to a specific value according to the regulation considering an influence on a human body in a wireless communication system. This is referred to as Pc_max parameter (or maximum transmission power information). The Pc_max parameter may be separately defined and/or configured for each cell, BWP, and/or carrier considering the carrier aggregation (CA) case. In a multi-antenna environment, transmission of dividing power for each antenna is considered, but the Pc_max is managed from a perspective of all the antennas. The following two methods may be considered even for a multi-panel UE.

(Pc max configuration method 1) Pc_max is separately defined and/or configured for each panel (Pc max configuration method 2) Pc_max is defined and/or configured for all the panels Considering STxMP, the Pc_max configuration method 2 can be seen to maintain a power control principle from a perspective of current multi-antenna transmission. Considering only a method of transmission using one panel at once, the Pc_max configuration method 1 may be more proper considering a difference of PA configuration for each panel. Even if the Pc_max configuration method 1 is applied, a power limit from a perspective of the entire transmission is also required as described above.

Accordingly, hereinafter, the present disclosure proposes methods of controlling a maximum transmission power for each panel and a maximum transmission power per all the panels.

More specifically, the present disclosure proposes a method of applying an independent power control formula for each panel (hereinafter, first embodiment), a method of controlling power when explicitly or implicitly changing a transmission panel for a specific uplink signal and/or uplink channel (hereinafter, second embodiment), a method of, when a panel transmitting a specific uplink signal and/or uplink channel is reactivated, using PC parameters that has been configured in a latest activation state for the panel (hereinafter, third embodiment), a method of transmitting a power headroom for each panel of a UE (hereinafter, fourth embodiment), a method of transmitting a power headroom for each panel of a UE and a Pc_max value for each panel (hereinafter, fifth embodiment), a method of transmitting a value for each panel of a UE and a representative Pc_max value for a plurality of panels (hereinafter, sixth embodiment), a method of additionally transmitting a Pc_max_common value for all of panels (hereinafter, seventh embodiment), and a method of transmitting PH(s) and/or Pc_max(s) for each panel in the order promised by a base station and a UE (hereinafter, eighth embodiment).

Embodiments described below in the present disclosure are merely distinguished for convenience of description. It is a matter of course that partial method and/or partial configuration, etc. of any embodiment can be replaced with methods and/or configurations, etc. of other embodiments, or they can be combined and applied to each other.

Hereinafter, in the present disclosure, a maximum value of a transmission power sum to be applied to all of UE panels is referred to as Pc_max_common. Alternatively, hereinafter, in the present disclosure, a maximum value of a transmission power sum to be applied to all of UE panels (or a maximum value of a transmission power sum of a plurality of panels) in a specific carrier, cell, and/or BWP is referred to as Pc_max_common.

First Embodiment

First, a method of applying an independent power control formula for each panel is described.

Methods described below are merely distinguished for convenience of description. It is a matter of course that configuration of any method can be replaced with configurations of other methods, or they can be combined and applied to each other.

This method applies an independent power control formular for each panel (or UL resource (group)), and may apply min (Pc_max_common*w_n, formular_n) for each panel (i.e., UL resource (group)), where n corresponds to panel or UL resource group index.
- (Example 1) w_n=1, n=0, . . . , N−1
- (Example 2) w_n=1/N, n=0, . . . , N−1
- (Example 3) w_n, n=0, . . . , N−1 may be configured by the base station (e.g., RRC signaling, MAC-CE, DCI, etc.)
- (Example 4) w_n, n=0, . . . , N−1 may be reported by a UE (e.g., UE capability)

Further, (some of) the examples may be limitedly applied only to cases except the case in which UL resources belonging to different UL resource groups are transmitted on the same symbol (or symbol set). If UL resources are transmitted on the same symbol (set), each panel transmission power may be scaled down according to a specific rule (including the case that a specific panel transmission power is 0).

The example 3 and the example 4 may be applied together. That is, if the UE reports w_n value, a base station may set the w_n value based on the value. Alternatively, if the UE reports w_n value, the base station may set the w_n value with reference to the value.

In this case, the formular_n may be different for each UL channel and/or UL signal, and the existing formulars described in the UL power control clause may be applied as it is or may be partially modified and applied. For example, formular_n for PUSCH PC may mean the following Equation 11 for panel n.

$$P_{O\_PUSCH,b,f,c}(j) + 10\log_{10}(2^\mu \cdot M_{RB,b,f,c}^{PUSCH}(i)) + \quad \text{[Equation 11]}$$
$$\alpha_{b,f,c}(j) \cdot PL_{b,f,c}(q_d) + \Delta_{TF,b,f,c}(i) + f_{b,f,c}(i, l)$$

Alternatively, if Pc_max value for the corresponding panel is separately defined, prescribed and/or configured as Pc_max_panel, formular_n may mean the following Equation 12.

$$\min(Pc\_max\_panel, \quad \text{[Equation 12]}$$
$$P_{O\_PUSCH,b,f,c}(j) + 10\log_{10}(2^\mu \cdot M_{RB,b,f,c}^{PUSCH}(j)) +$$
$$\alpha_{b,f,c}(j) \cdot PL_{b,f,c}(q_d) + \Delta_{TF,b,f,c}(j) + f_{b,f,c}(j, l))$$

The advantage of the example 1 is that maximum power can be used even if only a specific panel is used. However, since whether to apply this method depends on the PA structure for each panel as described above, whether to apply this method may be determined by the UE capability. In addition, according to the example 1, when a specific UL signal is transmitted to a specific panel, the specific UL signal can be transmitted with full power. However, since it is difficult to apply the Example 1 to a UL signal (e.g., PUSCH) to which STxMP is applied, coverage mismatch may occur according to a type of UL signal.

Since the example 2 assumes that maximum power per panel is equally reduced, most of UL implementation can support it (regardless of the UE capability), and thus there is an advantage that the example 2 can be commonly used (i.e., prescribed as a default operation). However, upon the transmission based on panel-selection and/or switching, since full power transmission may be impossible, there may be a disadvantage in that UL coverage is reduced.

The example 3 and the example 4 supplement and/or compensate the advantages and disadvantages described above. In the example 3 and the example 4, if the UE provides information for maximum power per panel to the base station, the base station may apply the value as it is (example 4), or the base station may configure w_n according to needs (e.g., UL interference/coverage) of the base station (example 3). In the example 3, the base station may set specific w_n to 0 (or a value close to 0 or a specific prescribed value (e.g., void, NULL)) not to perform transmission in the corresponding panel. Other examples have mainly assumed that N panels are activated, but since the number N of activated panels and the panel combination may be instantaneously changed, the range of n value and N value may be changed depending on this. For example, the range of n value and N value may be set/changed by the base station via RRC and/or MAC-CE.

And/or, if a total sum (P_tot) from formular_0 to formular_(N-1) is greater than Pc_max_common, a UE may perform one of the following operations.

(Method 1-1) The UE performs power scaling with P_n=formular_n*$\alpha$_n for n=0, ..., N-1, and then applies P_n instead of formular_n for each n-th panel (or UL resource (group)). Here, $\alpha$_n is a scaling value (positive number) for the n-th panel (or UL resource (group)) and may be determined depending one a predefined priority or a priority configured by the base station, or may use a fixed value of $\alpha$_n=Pc_max_common/P_tot for all n. Herein, $\alpha$_n, n=0, ..., N-1 values may be designed to satisfy the constraint that a total sum from P_0 to P_(N-1) is less than or equal to Pc_max_common.

(Method 1-2) The UE may power down as much as P_$n^x$=max(P_min, formular_$n^x$-P_down_x) (where x=0, ..., X-1) for X panel(s) (or UL resource (group)(s)) $n^0$, ..., $n^{(X-1)}$ depending on a predefined priority or a priority configured by the base station, and then apply P_$n^x$ instead of formular_$n^x$. Herein, P_min means panel minimum transmission power (e.g., P_min=0), and a total sum from P_down_0 to P_down_(X-1) is equal to or less than P_tot-Pc_max_common. In addition, x may mean an index of panel (or UL resource (group)) to power down.

(Example 1) X=1, P_down_0=P_tot-Pc_max_common (Example 2) P_down_x=formular_$n^x$ (Example 3) P_down_x=(P_tot-Pc_max_common)*$\beta$_x, where x=0, ..., X-1, and $\beta$_x is a weight value (positive number) for $n^x$-th panel (or UL resource (group)), and may be determined depending on a predefined priority or a priority configured by the base station or may use a fixed value of $\beta$_x=1/X for all x. The total sum of $\beta$_x may be 1.

The methods 1-1 and 1-2 include various methods proposed so that the total sum of transmission power of each panel does not exceed Pc_max_common.

The method 1-1 is a method such that the total sum of transmission power of each panel does not exceed Pc_max_common by normalizing formular_n by total power amount, and the method 1-2 is a method such that the total sum of transmission power of each panel does not exceed Pc_max_common by reducing transmission power of a specific panel(s).

In the method 1-1, the number X of panels to perform power adjustment may use a specific prescribed value (depending on the total number N of panels) or use a value set by the base station. Alternatively, the X value may be a value determined by the total number N of panels, Pc_max_common, Pc_max for each panel, P_tot, and/or (instantaneous) transmission power of each panel. For example, in order to minimize the number of panels performing the power down, X may be prescribed and/or configured to find the smallest value, that makes P_tot(X)-Pc_max_common become a negative number, and to apply the value to X. Herein, P_tot (X) means P_tot value of the case of performing the power down for a total of X panels.

The example 1 of the method 1-2 is a method of deducting an exceeding power amount (P_tot-Pc_max_common) for one specific panel when the total sum of panel transmission power exceeds Pc_max_common, and the example 2 of the method 1-2 is a method of allowing to transmit only minimum power (P_min) for all X panels (or not to transmit or turn off the panels) when the total sum of panel transmission power exceeds Pc_max_common. The example 3 of the method 1-2 is a method of deducting as much as weight ($\beta$_x) which is determined for an exceeding power amount for specific X panels when the total sum of panel transmission power exceeds Pc_max_common by further generalizing the example 1.

In the example 1, since the power excess is deducted only for one specific panel (having the lowest priority), there is an advantage that power of the remaining panels (having a higher priority) does not need to be reduced. However, there are disadvantages in that the UL coverage of a specific panel is excessively reduced when the power excess is significantly large, and the total power exceeds Pc_max_common when the power excess exceeds formular_$n^0$ even if the corresponding panel is powered off. The example 3 has an advantage in that the disadvantages described above can be compensated by further expanding the example 1, but has a disadvantage in that a method of obtaining $\beta$_x and X values becomes complex when the power excess is significantly large.

The example 2 is a method of turning off specific X panels at once according to the power excess, and may not generate the coverage issue since the determination of X value is simple and transmission is not performed in the panels. However, there is a disadvantage in that the transmission power may be excessively lowered when the power excess is small.

In the methods 1-1 and 1-2, the P_tot calculation way may be changed to the form of a weighted sum for each formula (e.g., P_tot=formular1*1.2+formular2*0.8). Each weight may be set directly or indirectly by the base station via RRC (indicate an index within a predefined table of weight value included in the predefined table).

The methods 1-1 and 1-2 have proposed to apply to when P_tot is greater than Pc_max_common, but may be applied to reduce the power of the UE or reduce UL interference of the base station regardless of whether P_tot exceeds Pc_max_common.

In the above proposed methods, the UL resource group may be interpreted and applied as a set of SRS resources, a set of PUCCH resources, a set of PRACH resources/sequences/occasions, and so on. Alternatively, in the above proposed methods, the UL resource group may be interpreted and applied as a set of SRS resources, a set of PUCCH resources, a set of PRACH resources/sequences/ occasions that are transmitted on the same panel or mapped to the same panel ID, and so on. If a specific UL signal (e.g., PUSCH) is alternately (repeatedly) transmitted to a plurality of panels, a transmission occasion or order of the signal may be implicitly mapped and applied to each panel.

For example, for URLLC use case, if the same PUSCH is repeatedly transmitted over several slots, in the first embodiment, the panel index n may be interpreted and applied as n-th PUSCH, n-th PUSCH occasion, and/or n-th PUSCH slot. Alternatively, if there is a plurality of ports and/or layers constituting the same UL channel, each panel may be divided into port groups or layer groups and the PUSCH may be alternately transmitted. In such a case, the proposed power control method may be applied in a unit of port group or layer group constituting the same UL physical channel.

The proposed methods have assumed that UL resources, occasions, sequences and/or layer groups to transmit for each panel are separated. However, considering only the panel switching based operation, as in the SRS configuration method 2 described above, a method of implicitly or explicitly changing only the panel ID to be applied to the same UL resource (via MAC-CE, etc.) is also available. That is, while a plurality of panels shares configuration for UL RS and/or UL channel configured via higher layer signaling, a method for changing a transmission panel via lower layer signaling (e.g., MAC-CE and/or DCI) according to a transmission time may be considered. In this case, the transmission panel may be instantaneously changed for the same UL RS and/or UL channel In such a case, considering a difference of DL RS for pathloss estimation generated due to a difference of PA configuration for each panel, an optimal TRP for each UE panel, a TRP beam, and/or a difference of TRP panel, it is preferable to change the power control formula that is linked with a panel ID and is to be applied to the same UL RS and/or UL channel.

For this case, the following method (hereinafter, second embodiment) is proposed. Here, the panel ID includes the case in which a transmission panel is implicitly indicated by utilizing a predefined ID, such as SRS resource set ID, or using reference RS information included in spatial relation information, as well as the case in which a panel-specific ID is explicitly present.

Second Embodiment

Next, a method of controlling power when a transmission panel is implicitly or explicitly changed for a specific UL signal and/or UL channel is described.

Methods described below are merely distinguished for convenience of description. It is a matter of course that configuration of any method can be replaced with configurations of other methods, or they can be combined and applied to each other.

If a transmission panel is implicitly or explicitly changed for a specific UL signal and/or UL channel, one of the following methods can be applied.

(Method 2-1) A UE may be configured to maintain a value as before the panel change for each PC parameter of P_c parameter set (P0, alpha, DL RS for path-loss, Closed-loop PC (e.g., selection between 1_0 and 1_1)), change to a default value defined by a separate configuration or rule, change to a value indicated/configured by a base station (together with a panel change message), or reset a value.

For example, if the base station indicates DL RS and/or CLPC via a panel change message (e.g., via MAC-CE), the UE may be configured to maintain the previous PC parameter value for the remaining PC parameters (not included in the indication), apply a default PC parameter (e.g. SSB and/or CSI-RS selected for PRACH transmission (or initial access) may be set as DL RS for PL estimation) defined by a separate configuration or rule, or reset CLPC (+DLRS for PL) only (e.g., if CL PC is 1_0, CLPC loop 1_0 is maintained but reset to 0).

(Method 2-2) The base station may pre-configure P_c parameter set to the UE for each Tx panel (group) via RRC, and the UE may be configured to apply the P_c parameter set corresponding to the Tx panel (group) changed by the panel change message.

The method 2-1 is a method of maintaining a part of the P_c parameter set for the UL RS and/or UL channel upon the panel change and changing or resetting a part of the P_c parameter set. The method 2-2 is a method of separately configuring the P_c parameter set for each panel via RRC in preparation for the panel change. The method 2-2 may be seen as a method of extending applying an approach, which has been applied according to a spatial relation for PUCCH in Rel-15, to a plurality of panels.

Additionally, if the panel change is frequent, or UE mobility is low, a method of reusing some or all of power control (PC) parameters which have been used in the panel in a previously activated state may be more efficient than a method of starting again the power control from the beginning or applying as it is the power control parameters which have been applied to other panels.

As described (in the method 2-1 and the method 2-1 of the second embodiment) above, the method of storing the PC parameter (or part of the PC parameter set) that has been applied to the existing activated state and applying the PC parameter that has been stored upon re-activation of the corresponding panel may be applied limitedly to the case that the corresponding panel is reactivated within a specific time threshold. If the panel is reactivated after the specific time threshold, it may not be preferable to continuously apply as it is the PC parameter which has been previously stored and/or applied. The 'specific time threshold' value may use a specific prescribed (or promised) value (depending on a subcarrier spacing, a UE power class, etc.) or use a value set by the base station (considering UE mobility, etc.).

Considering this, the following method (hereinafter, third embodiment) is proposed.

Third Embodiment

Next, a method of, when a panel transmitting a specific UL signal and/or UL channel is reactivated, using PC parameters that has been configured in a latest activation state for the panel is described Methods described below are merely distinguished for convenience of description. It is a matter of course that configuration of any method can be replaced with configurations of other methods, or they can be combined and applied to each other.

If a panel transmitting a specific UL signal and/or UL channel is reactivated, some or all of power control (PC) parameters are resumed from PC parameters which have been lastly indicated, maintained, and/or configured in a latest activation state for the panel. Alternatively, if a panel for transmitting a specific UL signal and/or UL channel for a specific UE type or by BS configuration is reactivated within a specific time, some or all of PC parameters are resumed from PC parameters which have been lastly indicated, maintained, and/or configured in a latest activation state for the panel.

In the application of the method, additionally, some PC parameters may maintain the PC parameter that has been used for the panel before the change (according to the BS configuration/indication) (e.g., P0, alpha, DL RS for PL).

(Example 1) If only one parameter set is maintained as in the method 2-1 of the second embodiment, the UE uses a PC parameter stored (for the corresponding panel) at a last activated time for a panel reactivated (within a specific time). And/or, if the panel is reactivated after a specific time threshold, the UE expects that a new PC parameter set is indicated. Alternatively, the UE applies a preconfigured or predefined default PC parameter set.

(Example 2) If the PC parameter sets are configured for each panel as in the method 2-2 of the second embodiment, the UE applies a PC parameter set corresponding to an activated panel, and resumes (CLPC value) (if the panel is reactivated within a specific time). And/or, if the panel is reactivated after a specific time threshold, the UE may reset only the CLPC value and apply a preset value to the remaining PC parameters.

For the UL power control, a procedure for the UE to report a power budget of a current state to the base station is defined as a power headroom report (PHR) process in the predefined standard (e.g., 3GPP TS38.321 and 3GPP TS38.331) (e.g., see power headroom report clause). As proposed above, if the power control is performed for each panel, it is more preferable that the PHR is also performed for each panel.

Accordingly, in the present disclosure, the UE supporting the above-described multi-panel may be configured to report the PHR as in the following methods (hereinafter, fourth to eighth embodiments).

Hereinafter, with regard to the PHR for each panel proposed in the present disclosure, a value related to PHR reported by the UE may include PH, virtual PH, PCMAX (or Pc_max, $P_{CMAX}$), and/or PCMAX_common (or $P_{CMAX\_common}$) and value(s) related to all the PHRs including modifications of the corresponding values. For example, PH, PCMAX, and/or PCMAX_common, etc. for each panel may be calculated, computed, and/or determined. And/or, the calculated, computed, and/or determined PH, PCMAX, and/or PCMAX_common may be used in relation to Type 1 PH reporting, Type 2 PH reporting, and/or Type 3 PH reporting described above.

Fourth Embodiment

Next, a method of transmitting a power headroom (or power headroom information) for each panel of a UE is described.

Methods described below are merely distinguished for convenience of description. It is a matter of course that configuration of any method can be replaced with configurations of other methods, or they can be combined and applied to each other.

The power headroom may be separately reported for each UE panel. In this instance, in order to reduce an amount of feedback information, the UE may report a differential value for power headroom values for the remaining panels based on a power headroom for a specific panel.

And/or, after the UE separately calculates the power headroom for each UE panel, the UE transmits a representative PHR value to a base station. The representative PHR value is determined as a function value of the PHR values for each panel. For example, the representative PHR value may be determined by a minimum value of the PHR values, an average value of the PHR values, or a maximum value of the PHR values by a function.

In the fourth embodiment, the 'panels' which are targets of PHR calculation and report may be limited to panels of an activated state. Alternatively, the 'panels' which are targets of PHR calculation and report may be limited to panels of an activated state and/or panels which were in an activated state before at least a specific time.

When the fourth embodiment is applied, a plurality of PHRs (as many as the number of panels (or panel groups)) may be supported for the same carrier. For reference, in NR system, whether there are the multiple PHRs of the UE may be configured through PHR-Config configured via RRC. The multiple PHRs are currently supported only in a dual connectivity environment or an UL carrier aggregation environment, but if this technology is applied, the multiple PHRs may be supported even in a single component carrier environment. In the PHR calculation for each panel, Pc_max_ panel value for each panel may be applied. To this end, a process for the UE to report the Pc_max_panel value for each panel to the base station (as UE capability) and/or a process for the base station to configure the Pc_max_panel value for each panel to the UE may be preceded.

As simply mentioned in the related description of the fourth embodiment, upon the PHR in the LTE and NR systems, the UE may report together both PH value and Pc_max value (for each serving cell). Considering an influence of a signal transmitted by the UE on a human body, for example, a maximum permissible exposure (MPE), the UE may reduce a maximum output, i.e., Pc_max. Because the base station cannot know the Pc_max value thus reduced, the UE shall report together the corresponding Pc_max upon the PHR. Hence, when the PH value is small, the base station may determine whether the UE is in an absolute lack state of power or the UE performs (temporarily) power back-off for the reason of MPE, etc. and has no power margin.

In the PH calculation, it is basic to calculate the PH based on an actual transmission (PUSCH) signal. However, there has been no UL transmission (on the corresponding carrier and/or cell) for a while, a method of calculating and reporting the PH based on a reference assumption for the UL transmission is defined in the predefined standard (e.g., 3GPP TS38.213), and the PH value thus calculated is referred to as 'virtual PH' (e.g., see the power headroom report clause described above). If the UE performs communication via a plurality of carriers and/or cells in carrier aggregation or dual connectivity, a method of calculating (virtual) PH value (and/or Pc_max value) for each carrier (or serving cell) and reporting it via one MAC-CE is supported (e.g., see Single Entry PHR MAC CE, Multiple Entry PHR MAC CE).

The fourth embodiment proposed a method of calculating a plurality of (virtual) PH values (as many as the number of panels (or panel groups)) for one cell and/or carrier and then reporting all the corresponding values, or a method calculating and reporting a representative (virtual) PH value. For the reason described above, upon the PHR, the Pc_max value as well as the (virtual) PH value shall be considered together. However, a maximum output value (i.e., Pc_max without power back-off) capable of being transmitted on each panel may vary depending on configuration of a power amplifier (PA) of each panel, and/or if specific panel(s) are close to the human body, a maximum output value for only the specific panel can be reduced (instantaneously or temporarily) considering the MPE. Thus, upon the PHR, it is more preferable to transmit the Pc_max value (together with the PH value) for each panel to the base station. Considering this, the following fifth embodiment is proposed.

Fifth Embodiment

Next, a method of transmitting a power headroom value for each panel of a UE and a Pc_max value for each panel is described.

Methods described below are merely distinguished for convenience of description. It is a matter of course that configuration of any method can be replaced with configurations of other methods, or they can be combined and applied to each other.

Hereinafter, a PH value may be replaced by a virtual PH value, and/or a representative PH value may be replaced by a representative virtual PH value.

When a multi-panel UE performs a PHR, the UE may transmit a Pc_max value for each panel together with a PH value for each panel or a representative PH value for a plurality of panels.

When the UE reports a Pc_max value for the plurality of panels (for the same carrier and/or cell), the UE may additionally apply a method of reducing a reporting payload size by reporting the remaining Pc_max values, as a differential value, based on a Pc_max value for a specific panel, or reporting a differential value for a value obtained by dividing the number of panels (activated or to participate in transmission) from the prescribed Pc_max value, Pc_max_common value, or Pc_max_common (for the corresponding UE power class (and the configured number of carriers and/or cells)).

For example, the specific panel may be a panel associated with an ID having a smallest value among IDs that the base station configures to the UE. Examples of the IDs may include a panel ID, an SRS resource group ID, an SRS resource set ID, an antenna port group ID, a beam group ID, a power control related process/parameter (set) ID, an USU ID, or a UTE ID.

When maximum power for each panel is the same and/or similar and an MPE issue occurs, if a method of (commonly) reducing the Pc_max value for all the panels is applied, it may be unnecessary to send Pc_max for each panel according to the base station configuration (or UE capability). Considering this, the following sixth embodiment is proposed.

Sixth Embodiment

Next, a method of transmitting a value for each panel of a UE and a representative Pc_max value for a plurality of panels is described.

Methods described below are merely distinguished for convenience of description. It is a matter of course that configuration of any method can be replaced with configurations of other methods, or they can be combined and applied to each other.

Hereinafter, a PH value may be replaced by a virtual PH value, and/or a representative PH value may be replaced by a representative virtual PH value.

When a multi-panel UE performs a PHR, the UE may transmit a representative Pc_max value for a plurality of panels together with a PH value for each panel or a representative PH value for the plurality of panels.

The representative Pc_max value may be a Pc_max value commonly applied to all the panels, or may be determined as a specific function value for Pc_max values applied to each panel. For example, the representative Pc_max value may be determined as a minimum value of the Pc_max values, a maximum value of the Pc_max values, or a (weighted) average value of the Pc_max values by a specific function.

And/or, if a maximum value Pc_max_common of a power sum of all the panels is introduced to a power control calculation method as in the first embodiment, the UE can reduce instantaneously or temporarily the Pc_max_common value itself in consideration of the MPE, etc. Therefore, a process for the UE to transmit this value to the base station may be required. Considering this, the following seventh embodiment is proposed.

Seventh Embodiment

Next, a method of additionally transmitting a Pc_max_common value for all of panels is described.

Methods described below are merely distinguished for convenience of description. It is a matter of course that configuration of any method can be replaced with configurations of other methods, or they can be combined and applied to each other.

Hereinafter, a PH value may be replaced by a virtual PH value, and/or a representative PH value may be replaced by a representative virtual PH value.

In the application of the fifth and sixth embodiments, the UE may additionally transmit the Pc_max_common value for all the panels. For example, the UE may transmit the Pc_max_common value together with a PH value for each panel or a representative PH value for a plurality of panels. Alternatively, the UE may transmit a Pc_max value for each panel together with the PH value for each panel or the representative PH value for the plurality of panels. Alternatively, the UE may transmit the Pc_max_common value together with the PH value for each panel (or the representative PH value for the plurality of panels) and the Pc_max value for each panel.

It is obvious that calculation/report information described in the fifth to seventh embodiments can be calculated and/or reported for each carrier and/or cell if a plurality of carriers and/or cells are configured to the UE.

And/or, with respect to a method of reporting a plurality of PH values and/or a plurality of Pc_max values for at least one carrier(s) and/or cell(s) using the calculation and/or report method described in the fifth to seventh embodiments, a method of reporting PH and/or Pc_max value(s) for each panel in the order promised (or defined) by the base station and the UE is proposed (hereinafter, eighth embodiment). For example, the plurality of Pc_max values may include Pc_max and/or Pc_max_common for each panel.

Eighth Embodiment

Next, a method of transmitting PH(s) and/or Pc_max(s) for each panel in the order promised by a base station and a UE is described.

Methods described below are merely distinguished for convenience of description. It is a matter of course that configuration of any method can be replaced with configurations of other methods, or they can be combined and applied to each other.

Hereinafter, a PH value may be replaced by a virtual PH value, and/or a representative PH value may be replaced by a representative virtual PH value.

With regard to the report of PH and/or Pc_max(s), PH(s) and/or Pc_max(s) for each panel may be reported in the order promised by the base station and the UE.

In this instance, the promised order may be determined based on one of IDs that the base station configures to the UE (e.g., PHR of the panel associated for each ID).

Examples of the IDs may include a panel ID, an SRS resource group ID, an SRS resource set ID, an antenna port group ID, a beam group ID, or a power control related process/parameter (set) ID, etc.

For example, the report method in the order of serving cell→PH (for each panel)→Pc_max (for each panel) may be considered. For another example, if Pc_max_common is reported, the report method in the order of serving cell→PH (for each panel)→Pc_max_common→Pc_max (for each panel) may be considered. In addition, the above information (PH, Pc_max_common, and/or Pc_max) may be reported in various methods according to the promised order.

For example, after the PH values are reported or the representative PH value is reported in ascending order of the panel ID for Pcell, the Pc_max_common value may be reported, and then the Pc_max values for each panel may be reported or the representative Pc_max value may be reported. Afterwards, the above information (PH, Pc_max_common, and/or Pc_max) may be sequentially reported in ascending order of a serving cell ID among the Scells.

For another example, the report in the order of serving cell→PH and Pc_max for each panel ID may be configured, defined, and/or prescribed. For another example, if Pc_max_common is reported, the report in the order of serving cell→Pc_max_common→PH and Pc_max for each panel ID may be configured, defined, and/or prescribed. In this instance, PH and Pc_max values corresponding to each panel ID may be successively supported. For example, the report in the order of PH for panel0, Pc_max for panel0, PH for panel1, and Pc_max for panel1 may be configured, defined, and/or prescribed.

If the promised report order is applied as in the above proposal method, there is an advantage in that a payload size is reduced since it is not necessary to additionally report that the corresponding PH and/or Pc_max are a value corresponding to which panel ID(s) and/or cell ID(s).

The 'report in the promised order' may mean 'the order of arranging information to be reported within one MAC-CE', or 'the order of arranging MAC-CEs when a report is performed via a plurality of MAC-CEs'. However, if there are a large number of carriers in the carrier aggregation, an amount of information required for the PH and/or Pc_max report for each panel may be excessively large to be sent via one MAC-CE.

Accordingly, the PH and/or Pc_max (and/or Pc_max_common) report method considering the plurality of panels proposed may send it only to one carrier and/or cell or a group of carriers and/or cells (with a prescribed limit of the maximum number of carriers and/or cells that can be included in one group) via one MAC-CE. In this case, it may be prescribed that PHR for the remaining carrier(s) and/or cell(s) (or a group of carriers and/or cells) that are not included in the above report information is reported via separate MAC-CE (of separate or same PUSCH).

And/or, it may be prescribed that the UE necessarily reports information (i.e., PH, Pc_max, and/or Pc_max_common) for PCell and/or PScell according to a maximum supportable payload size at the corresponding MAC-CE format, and the UE reports up to information ((i.e., PH, Pc_max, and/or Pc_max_common) for specific Scell(s) as information for Scells by a fixed priority rule. In this instance, it may be prescribed that PH, and/or Pc_max (and/or Pc_max_common) values for the remaining Scell(s) are not reported (if there is no separate indication and/or configuration of the base station).

The priority rule may be prescribed considering the ascending or descending order of SCell ID, SCell activation status and/or SCell deactivation status, a time at which the latest UL (and/or DL) transmission in the corresponding Scell (or DL/UL scheduling for Scell) is performed, and so one. In a prioritization (and dropping) operation for the Scells, a priority may be given on a per cell group (e.g., MCG and/or SCG) basis, and a prioritization of cells in the cell group may also be additionally performed.

In the fifth to eighth embodiments, the 'panel(s)' which are targets of PHR calculation and report may be limited to panel(s) of an activated state (and/or panels which were in an activated state before at least a specific time).

When the fifth to eighth embodiments are applied, a plurality of PHRs (as many as the number of panels (or panel groups)) may be supported for the same carrier. For reference, in NR system, whether there are the multiple PHRs of the UE may be configured through PHR-Config configured via RRC. The multiple PHRs are currently supported only in a dual connectivity environment or an UL carrier aggregation environment, but if the present disclosure (e.g., the fifth to eighth embodiments) is applied, the multiple PHRs may be supported even in a single component carrier environment.

In the PHR calculation for each panel, Pc_max_panel value for each panel may be applied. To this end, a process for the UE to report the Pc_max_panel value for each panel to the base station (as UE capability) and/or a process for the base station to configure the Pc_max_panel value for each panel to the UE may be preceded.

As described above, it is obvious that 'for each panel' can be expressed as 'for each specific ID' on the standard document. Examples of the ID may consider an SRS resource group ID, an SRS resource set ID, a panel ID, an antenna port group ID, a beam group ID, a power control related process/parameter (set) ID, an USU ID, a UTE ID, and so on.

FIG. 20 illustrates a multi-panel based UL transmission/reception signaling procedure to which the method(s) (e.g. the first to eighth embodiments) described in the present disclosure are appliable. FIG. 20 is merely a figure for convenience of description and does not limit the scope of the present disclosure.

Referring to FIG. 20, it is assumed that a user equipment (UE) and/or a base station (BS) support(s) a multi-panel based signal and/or channel transmission/reception. In addition, some of steps illustrated in FIG. 20 may be omitted considering UE and/or BS implementation and/or a predefined rule, etc.

The UE may report UE capability information related to the multi-panel based signal and/or channel transmission/reception to the BS, in S2010. For example, the UE capability information may be reported via higher layer signaling, etc. For example, as described above (e.g., in relation to the SRS configuration methods 1 and 2, the first embodiment, etc.), the UE capability information may be the number of UL resource groups (e.g., SRS, PUCCH, PUSCH, PRACH resource, occasion, sequence, layer group, etc.) supported by the UE and/or the number of (UL Tx) panels supported by the UE.

The UE may receive, from the BS, a configuration (i.e., UL transmission related configuration) related to UL transmission, in S2020. The configuration may include information for a configuration for the above-described UL resource group, and/or a configuration related to a panel, and/or a configuration and/or a mapping relation between the UL resource group and the panel. The configurations may be transmitted via higher layer signaling (e.g., RRC signaling, etc.).

As a specific example, as in the above-described SRS configuration methods (methods 1 and 2) and/or the above-described first to eighth embodiments, the configuration may include information for an SRS resource group, information related to a panel, and/or information for a mapping relation between the SRS resource group and the panel. In this instance, the configuration may also include information (e.g., parameter (set)) related to power control for each SRS resource group and/or for each panel (e.g., parameter (set) mentioned in the first to third embodiments, etc.).

As another specific example, if the SRS configuration methods and/or the first to eighth embodiments are extended to other UL signals and/or channels (e.g., PUCCH, PUSCH, PRACH, etc.) as described above, the configuration may include information for a UL resource group, information related to a panel, and/or information for a mapping relation between the UL resource group and the panel.

The mapping relation may be an explicit mapping relation between the UL resource group and the panel or an implicit mapping relation in a medium of SRS resource group. In this case, the configuration may include information (e.g., parameter (set)) related to power control for each UL resource group and/or for each panel.

As described above, a panel switching (or panel re-activation, etc.) operation may be performed between the UE and the BS, in S2030. In this case, the UL resource group and/or the panel to be applied to a UL transmission by the UE may be changed and/or reset, or the parameter (set) to be applied for power control may be changed and/or reset. For example, as in the second embodiment and/or the third embodiment described above, if the panel switching and/or re-activation is performed, the UE may be configured to compare and reinterpret the parameter (set) related to power control with the previously configured one.

The UE may determine a panel(s) to perform a UL transmission based on the received configuration, in S2040. For example, as in the SRS configuration methods and/or the first to eighth embodiments, the UE may determine a panel to perform a UL transmission using a mapping relation between UL resource group unit and the panel.

As a specific example, in the case of aperiodic SRS, the UE may determine a panel to perform SRS transmission through an SRS resource group indicated via triggering DCI among the configured SRS resource group(s). Alternatively, in the case of periodic SRS or semi-persistent SRS, since the configured SRS resource group(s) itself is associated with the panel, the UE may determine a panel to perform SRS transmission based on the mapping relation mentioned in step S2020.

The UE may calculate UL transmission power (UL Tx power) based on the configuration (and/or indication) which is configured from the BS in the previous step, in step S1350. For example, the UE may perform the power control based on the UL power control content descried above.

As a specific example, with regard to the multi-panel based UL transmission (e.g., SRS, PUCCH, PUSCH, PRACH, etc.), the UE may perform the UL Tx power control based on the methods described in the first to third embodiments. With regard to this, the UE may perform a power headroom report (PHR) as described in the fourth to eighth embodiments. The UE may be configured/indicated by the BS to perform the PHR via MAC-CE, etc.

And/or, as described in the power headroom report clause, a PHR related MAC-CE may be included in step S2060 and transmitted, or may be included in a subsequent UL transmission and transmitted. For example, with regard to the PHR for each panel, a value related to the PHR reported by the UE may be PH, virtual PH, PCMAX, and/or PCMAX_common and value(s) related to all the PHRs including modifications of the corresponding values. For example, the UE may calculate, compute, and/or determine PH, PCMAX, and/or PCMAX_common for each panel. The UE may be configured to use the calculated, computed, and/or determined PH, PCMAX, and/or PCMAX_common in relation to the Type 1 PH reporting, the Type 2 PH reporting and/or the Type 3 PH reporting described above.

The UE may perform a (multi-panel based) UL transmission for the BS based on the UL Tx power determined through the procedures described above, in S2060.

In relation to this, the operation of the BS and/or the UE (the first to eighth embodiments and FIG. 20) may be implemented by a device to be described below (e.g., FIGS. 23 to 27). For example, the base station may correspond to a transmission device, and the UE may correspond to a reception device, and vice versa may be considered in some cases.

As a specific example, a processor of the UE may control to transmit and receive a signal and/or channel (e.g., configuration, indication, UE capability, SRS, PUCCH, PUSCH, PRACH, etc.) through an RF unit and control to perform decoding and/or encoding for the signal and/or channel In this process, the UE may use a memory and store decoded and/or encoded data in the memory. A processor of the base station may control to transmit and receive a signal and/or channel (e.g., configuration, indication, UE capability, SRS, PUCCH, PUSCH, PRACH, etc.) through an RF unit and control to perform decoding and/or encoding for the signal and/or channel. In this process, the base station may use a memory and store decoded and/or encoded data in the memory.

FIG. 21 is a flow chart illustrating an operation method of a UE described in the present disclosure.

Referring to FIG. 21, first, a UE (1000/2000 of FIGS. 23 to 27) may receive power report configuration information (e.g., PHR-Config) from a base station, in S2101. For example, the power report configuration information may be an information element (IE) of Table 10 or an IE changed and/or modified from the IE.

For example, an operation for the UE in the step S2101 to receive the power report configuration information may be implemented by a device of FIGS. 23 to 27 to be described below. For example, referring to FIG. 24, one or more processors 1020 may control one or more memories 1040 and/or one or more RF units 1060, etc. in order to receive the power report configuration information, and one or more RF units 1060 may receive the power report configuration information.

Next, the UE (1000/2000 of FIGS. 23 to 27) may report power information to the base station based on the power report configuration information, in S2102. For example, the UE may report the power information every a specific number of subframes based on phr-PeriodicTimer of the power report configuration information (e.g., PHR-Config). And/or, the UE may report the power information if a value of a path loss is greater than phr-Tx-PowerFactorChange of the power report configuration information. For example, the power information may be Multiple Entry PHR medium access control (MAC) control element (CE) of FIG. 16 or FIG. 17 or a MAC CE changed or modified from the corresponding MAC CE.

The UE may include a plurality of panels. For example, the power information may include power headroom information for the plurality of panels and maximum transmission power information for the plurality of panels.

And/or, the power headroom information may include a power headroom value of each of the plurality of panels or a representative power headroom value of the plurality of panels. For example, the representative power headroom value may be determined by a pre-configured function. For example, the pre-configured function may be a function outputting an average value of the power headroom values of the plurality of panels.

And/or, the maximum transmission power information may include a maximum transmission power value of each of the plurality of panels or a representative maximum transmission power value of the plurality of panels. For example, the maximum transmission power value may mean a specific maximum transmission power value determined considering an influence on a human body. Alternatively, the maximum transmission power value may mean a predefined maximum transmission power value for each panel. For example, the representative maximum transmission power value may be determined by a pre-configured function. For example, the pre-configured function may be a function outputting an average value of the maximum transmission power values of the plurality of panels. For example, the maximum transmission power information may include a differential value of each of the plurality of panels based on a maximum transmission power value of a specific panel.

And/or, the power information may further include a maximum value of a transmission power sum of the plurality of panels. And/or, the power information may include the power headroom information and a maximum value of a transmission power sum of the plurality of panels. For example, the maximum value of the transmission power sum may mean a maximum value of a power sum to be applied to all the UE panels.

And/or, the power information may be reported via a different MAC CE per cell or per carrier. For example, power information related to one cell may be arranged within one MAC CE in the order of (i) the power headroom information, (ii) the maximum transmission power information, and (iii) the maximum value of the transmission power sum. And/or, each of (i) the power headroom information, (ii) the maximum transmission power information, and (iii) the maximum value of the transmission power sum may be arranged in the ascending order of a panel identifier within the MAC-CE.

For example, an operation for the UE in the step S2102 to report the power information to the base station based on the power report configuration information may be implemented by the device of FIGS. 23 to 27 to be described below. For example, referring to FIG. 24, one or more processors 1020 may control one or more memories 1040 and/or one or more RF units 1060, etc. in order to receive the power report configuration information, and one or more RF units 1060 may report the power information.

Since the operation of the UE described with reference to FIG. 21 is the same as the operation of the UE described with reference to FIGS. 1 to 20 (e.g., the first to eighth embodiments), a detailed description thereof is omitted.

The signaling and the operation described above may be implemented by a device to be described below (e.g., FIGS. 23 to 27). For example, the signaling and the operation described above may be processed by one or more processors (1010, 2020) of FIGS. 23 to 27. In addition, the signaling and the operation described above may be stored in a memory (e.g., 1040, 2040) in the form of a command/program (e.g., instruction, executable code) for running at least one processor (e.g., 1010, 2020) of FIGS. 23 to 27.

For example, in a device comprising one or more memories and one or more processors operatively connected to the one or more memories, the one or more processors may be configured to allow the device to receive power report configuration information from a base station and report power information to the base station based on the power report configuration information, a UE may include a plurality of panels, and the power information may include power headroom information for the plurality of panels and maximum transmission power information for the plurality of panels.

For another example, in a non-transitory computer readable medium (CRM) storing one or more commands, the one or more commands executable by one or more processors may allow a UE to receive power report configuration information from a base station and report power information to the base station based on the power report configuration information, the UE may include a plurality of panels, and the power information may include power headroom information for the plurality of panels and maximum transmission power information for the plurality of panels.

FIG. 22 is a flow chart illustrating an operation method of a base station described in the present disclosure.

Referring to FIG. 22, first, a base station (1000/2000 of FIGS. 23 to 27) may transmit power report configuration information (e.g., PHR-Config) to a UE, in S2201. For example, the power report configuration information may be an information element (IE) of Table 10 or an IE changed and/or modified from the IE.

For example, an operation for the base station in the step S2201 to transmit the power report configuration information may be implemented by a device of FIGS. 23 to 27 to be described below. For example, referring to FIG. 24, one or more processors 1020 may control one or more memories 1040 and/or one or more RF units 1060, etc. in order to transmit the power report configuration information, and one or more RF units 1060 may transmit the power report configuration information.

Next, the base station (1000/2000 of FIGS. 23 to 27) may receive power information from the UE based on the power report configuration information, in S2202. For example, the UE may report the power information every a specific number of subframes based on phr-PeriodicTimer of the power report configuration information (e.g., PHR-Config). And/or, the UE may report the power information if a value of a path loss is greater than phr-Tx-PowerFactorChange of the power report configuration information. For example, the power information may be Multiple Entry PHR medium access control (MAC) control element (CE) of FIG. 16 or FIG. 17 or a MAC CE changed or modified from the corresponding MAC CE.

The UE may include a plurality of panels. For example, the power information may include power headroom information for the plurality of panels and maximum transmission power information for the plurality of panels.

And/or, the power headroom information may include a power headroom value of each of the plurality of panels or a representative power headroom value of the plurality of panels. For example, the representative power headroom value may be determined by a pre-configured function. For example, the pre-configured function may be a function outputting an average value of the power headroom values of the plurality of panels.

And/or, the maximum transmission power information may include a maximum transmission power value of each of the plurality of panels or a representative maximum transmission power value of the plurality of panels. For example, the maximum transmission power value may mean a specific maximum transmission power value determined considering an influence on a human body. Alternatively, the maximum transmission power value may mean a predefined maximum transmission power value for each panel. For example, the representative maximum transmission power value may be determined by a pre-configured function. For example, the pre-configured function may be a function outputting an average value of the maximum transmission power values of the plurality of panels. For example, the maximum transmission power information may include a differential value of each of the plurality of panels based on a maximum transmission power value of a specific panel.

And/or, the power information may further include a maximum value of a transmission power sum of the plurality of panels. And/or, the power information may include the power headroom information and a maximum value of a transmission power sum of the plurality of panels. For example, the maximum value of the transmission power sum may mean a maximum value of a power sum to be applied to all the UE panels.

And/or, the power information may be reported via a different MAC CE per cell or per carrier. For example, power information related to one cell may be arranged within one MAC CE in the order of (i) the power headroom information, (ii) the maximum transmission power information, and (iii) the maximum value of the transmission power sum. And/or, each of (i) the power headroom information, (ii) the maximum transmission power information, and (iii) the maximum value of the transmission power sum may be arranged in the ascending order of a panel identifier within the MAC-CE.

For example, an operation for the base station in the step S2202 to receive the power information from the UE based on the power report configuration information may be implemented by the device of FIGS. 23 to 27 to be described below. For example, referring to FIG. 24, one or more processors 1020 may control one or more memories 1040 and/or one or more RF units 1060, etc. in order to receive the power report configuration information, and one or more RF units 1060 may receive the power information.

Since the operation of the UE described with reference to FIG. 21 is the same as the operation of the UE described with reference to FIGS. 1 to 20 (e.g., the first to eighth embodiments), a detailed description thereof is omitted.

The signaling and the operation described above may be implemented by a device to be described below (e.g., FIGS. 23 to 27). For example, the signaling and the operation described above may be processed by one or more processors (1010, 2020) of FIGS. 23 to 27. In addition, the signaling and the operation described above may be stored in a memory (e.g., 1040, 2040) in the form of a command/program (e.g., instruction, executable code) for running at least one processor (e.g., 1010, 2020) of FIGS. 23 to 27.

For example, in a device comprising one or more memories and one or more processors operatively connected to the one or more memories, the one or more processors may be configured to allow the device to transmit power report configuration information to a UE and receive power information from the UE based on the power report configuration information, a UE may include a plurality of panels, and the power information may include power headroom information for the plurality of panels and maximum transmission power information for the plurality of panels.

For another example, in a non-transitory computer readable medium (CRM) storing one or more commands, the one or more commands executable by one or more processors may allow a base station to transmit power report configuration information to a UE and receive power information from the UE based on the power report configuration information, the UE may include a plurality of panels, and the power information may include power headroom information for the plurality of panels and maximum transmission power information for the plurality of panels.

Example of Communication System to which the Present Disclosure is Applied

Although not limited thereto, but various descriptions, functions, procedures, proposals, methods, and/or operation flowcharts described in the present disclosure can be applied to various fields requiring wireless communication/connection (e.g., 5G) between devices.

Hereinafter, the communication system will be described in more detail with reference to drawings. In the following drawings/descriptions, the same reference numerals will refer to the same or corresponding hardware blocks, software blocks, or functional blocks, if not differently described.

FIG. 23 illustrates a communication system 10 applied to the present disclosure.

Referring to 23, a communication system 10 applied to the present disclosure includes a wireless device, a BS, and a network. Here, the wireless device may mean a device that performs communication by using a wireless access technology (e.g., 5G New RAT (NR) or Long Term Evolution (LTE)) and may be referred to as a communication/wireless/ 5G device. Although not limited thereto, the wireless device may include a robot 1000a, vehicles 1000b-1 and 1000b-2, an eXtended Reality (XR) device 1000c, a hand-held device 1000d, a home appliance 1000e, an Internet of Thing (IoT) device 1000f, and an AI device/server 4000. For example, the vehicle may include a vehicle with a wireless communication function, an autonomous vehicle, a vehicle capable of performing inter-vehicle communication, and the like. Further, the vehicle may include an unmanned aerial vehicle (UAV) (e.g., drone). The XR device may include an augmented reality (AR)/virtual reality (VR)/mixed reality (MR) device and may be implemented as a head-mounted device (HMD), a head-up display (HUD) provided in the vehicle, a television, a smart phone, a computer, a wearable device, a home appliance device, digital signage, a vehicle, a robot, etc. The hand-held device may include a smart phone, a smart pad, a wearable device (e.g., a smart watch, a smart glass), a computer (e.g., a notebook, etc.), and the like. The home appliance device may include a TV, a refrigerator, a washing machine, and the like. The IoT device may include a sensor, a smart meter, and the like. For example, the base station and the network may be implemented even as the wireless device, and a specific wireless device 2000a may operate as a base station/network node for other wireless devices.

The wireless devices 1000a to 1000f may be connected to a network 3000 over a base station 2000. An artificial intelligence (AI) technology may be applied to the wireless devices 1000a to 1000f, and the wireless devices 1000a to 1000f may be connected to the AI server 4000 over the network 3000. The network 3000 may be comprised using a 3G network, a 4G (e.g., LTE) network, or a 5G (e.g., NR) network. The wireless devices 1000a to 1000f may communicate with each other over the base station 2000/network 3000, but may directly communicate with each other without going through the base station/network (sidelink communication). For example, the vehicles 1000b-1 and 1000b-2 may perform direct communication (e.g., Vehicle to Vehicle (V2V)/Vehicle to everything (V2X) communication). Further, the IoT device (e.g., sensor) may perform direct communication with other IoT devices (e.g., sensor) or other wireless devices 1000a to 1000f.

Wireless communications/connections 1500a, 1500b, and 1500c may be made between the wireless devices 1000a to 1000f and the base station 2000 and between the base station 2000 and the base station 2000. The wireless communication/connection may be made through various wireless access technologies (e.g., 5G NR) such as uplink/downlink communication 1500a, sidelink communication 1500b (or D2D communication), and inter-base station communication 1500c (e.g., relay, integrated access backhaul (IAB)). The wireless device and the base station/the wireless device and the base station and the base station may transmit/receive radio signals to/from each other through wireless communications/connections 1500a, 1500b, and 1500c. For example, the wireless communications/connections 1500a, 1500b, and 1500c may transmit/receive signals on various physical channels. To this end, based on various descriptions of the present disclosure, at least some of various configuration information setting processes, various signal processing processes (e.g., channel encoding/decoding, modulation/demodulation, resource mapping/de-mapping, etc.), a resource allocation process, etc. for transmission/reception of the radio signal may be performed.

Example of Wireless Device to which the Present Disclosure is Applied

FIG. 24 illustrates a wireless device applicable to the present disclosure.

Referring to FIG. 24, a first wireless device 1000 and a second wireless device 2000 may transmit and receive radio signals through various wireless access technologies (e.g., LTE and NR). The first wireless device 1000 and the second wireless device 2000 may correspond to the wireless device 1000x and the base station 2000 and/or the wireless device 1000x and the wireless device 1000x of FIG. 21.

The first wireless device 1000 may include one or more processors 1020 and one or more memories 1040 and may further include one or more transceivers 1060 and/or one or more antennas 1080. The processor 1020 may control the memory 1040 and/or the transceiver 1060 and may be configured to implement descriptions, functions, procedures, proposals, methods, and/or operation flows described in the present disclosure. For example, the processor 1020 may process information in the memory 1040 and generate first information/signal and then transmit a radio signal including the first information/signal through the transceiver 1060. Further, the processor 1020 may receive a radio signal including second information/signal through the transceiver 1060 and then store in the memory 1040 information obtained from signal processing of the second information/signal. The memory 1040 may be connected to the processor 1020 and store various information related to an operation of the processor 1020. For example, the memory 1040 may store a software code including instructions for performing some or all of processes controlled by the processor 1020 or performing the descriptions, functions, procedures, proposals, methods, and/or operation flowcharts described in the present disclosure. The processor 1020 and the memory 1040 may be a part of a communication modem/circuit/chip designed to implement the wireless communication technology (e.g., LTE and NR). The transceiver 1060 may be connected to the processor 1020 and may transmit and/or receive the radio signals through one or more antennas 1080. The transceiver 1060 may include a transmitter and/or a receiver. The transceiver 1060 may be mixed with a radio frequency (RF) unit. In the present disclosure, the wireless device may mean the communication modem/circuit/chip.

The second wireless device 2000 may include one or more processors 2020 and one or more memories 2040 and may further include one or more transceivers 2060 and/or one or more antennas 2080. The processor 2020 may control the memory 2040 and/or the transceiver 2060 and may be configured to implement descriptions, functions, procedures, proposals, methods, and/or operation flows described in the present disclosure. For example, the processor 2020 may process information in the memory 2040 and generate third information/signal and then transmit a radio signal including the third information/signal through the transceiver 2060. Further, the processor 2020 may receive a radio signal including fourth information/signal through the transceiver 2060 and then store in the memory 2040 information obtained from signal processing of the fourth information/signal. The memory 2040 may be connected to the processor 2020 and store various information related to an operation of the processor 2020. For example, the memory 2040 may store a software code including instructions for performing some or all of processes controlled by the processor 2020 or performing the descriptions, functions, procedures, proposals, methods, and/or operation flowcharts described in the present disclosure. The processor 2020 and the memory 2040 may be a part of a communication modem/circuit/chip designated to implement the wireless communication technology (e.g., LTE and NR). The transceiver 2060 may be connected to the processor 2020 and may transmit and/or receive the radio signals through one or more antennas 2080. The transceiver 2060 may include a transmitter and/or a receiver, and the transceiver 2060 may be mixed with the RF unit. In the present disclosure, the wireless device may mean the communication modem/circuit/chip.

Hereinafter, hardware elements of the wireless devices 1000 and 2000 will be described in more detail. Although not limited thereto, one or more protocol layers may be implemented by one or more processors 1020 and 2020. For example, one or more processors 1020 and 2020 may implement one or more layers (e.g., functional layers such as PHY, MAC, RLC, PDCP, RRC, and SDAP). One or more processors 1020 and 2020 may generate one or more protocol data units (PDUs) and/or one or more service data units (SDUs) according to the descriptions, functions, procedures, proposals, methods, and/or operation flowcharts described in the present disclosure. One or more processors 1020 and 2020 may generate a message, control information, data, or information according to the descriptions, functions, procedures, proposals, methods, and/or operation flowcharts described in the present disclosure. One or more processors 1020 and 2020 may generate a signal (e.g., a baseband signal) including the PDU, the SDU, the message, the control information, the data, or the information according to the function, the procedure, the proposal, and/or the method described in the present disclosure and provide the generated signal to one or more transceivers 1060 and 2060. One or more processors 1020 and 2020 may receive the signal (e.g. baseband signal) from one or more transceivers 1060 and 2060 and acquire the PDU, the SDU, the message, the control information, the data, or the information according to the descriptions, functions, procedures, proposals, methods, and/or operation flowcharts described in the present disclosure.

One or more processors 1020 and 2020 may be referred to as a controller, a microcontroller, a microprocessor, or a microcomputer. One or more processors 1020 and 2020 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in one or more processors 1020 and 2020. The descriptions, functions, procedures, proposals, and/or operation flowcharts described in the present disclosure may be implemented by using firmware or software and the firmware or software may be implemented to include modules, procedures, functions, and the like. Firmware or software configured to perform the descriptions, functions, procedures, proposals, and/or operation flowcharts described in the present disclosure may be included in one or more processors 1020 and 2020 or stored in one or more memories 1040 and 2040 and driven by one or more processors 1020 and 2020. The descriptions, functions, procedures, proposals, and/or operation flowcharts described in the present disclosure may be implemented by using firmware or software in the form of a code, the instruction and/or a set form of the instruction.

One or more memories 1040 and 2040 may be connected to one or more processors 1020 and 2020 and may store various types of data, signals, messages, information, programs, codes, indications and/or instructions. One or more memories 1040 and 2040 may be comprised of a ROM, a RAM, an EPROM, a flash memory, a hard drive, a register, a cache memory, a computer reading storage medium and/or a combination thereof. One or more memories 1040 and 2040 may be positioned inside and/or outside one or more processors 1020 and 2020. Further, one or more memories 1040 and 2040 may be connected to one or more processors 1020 and 2020 through various technologies such as wired or wireless connection.

One or more transceivers 1060 and 2060 may transmit to one or more other devices user data, control information, a wireless signal/channel, etc., mentioned in the methods and/or operation flowcharts of the present disclosure. One or more transceivers 1060 and 2060 may receive from one or more other devices user data, control information, a wireless signal/channel, etc., mentioned in the descriptions, functions, procedures, proposals, methods, and/or operation flowcharts described in the present disclosure. For example, one or more transceivers 1060 and 2060 may be connected to one or more processors 1020 and 2020 and transmit and receive the radio signals. For example, one or more processors 1020 and 2020 may control one or more transceivers 1060 and 2060 to transmit the user data, the control information, or the radio signal to one or more other devices. Further, one or more processors 1020 and 2020 may control one or more transceivers 1060 and 2060 to receive the user data, the control information, or the radio signal from one or more other devices. Further, one or more transceivers 1060 and 2060 may be connected to one or more antennas 1080 and 2080, and one or more transceivers 1060 and 2060 may be configured to transmit and receive the user data, control information, wireless signal/channel, etc., mentioned in the descriptions, functions, procedures, proposals, methods, and/or operation flowcharts described in the present disclosure through one or more antennas 1080 and 2080. In the present disclosure, one or more antennas may be a plurality of physical antennas or a plurality of logical antennas (e.g., antenna ports). One or more transceivers 1060 and 2060 may convert the received radio signal/channel from an RF band signal into a baseband signal, in order to process the received user data, control information, radio signal/channel, etc., using one or more processors 1020 and 2020. One or more transceivers 1060 and 2060 may convert the user data, control information, radio signal/channel, etc., processed using one or more processors 1020 and 2020, from the baseband signal into the RF band signal. To this end, one or more transceivers 1060 and 2060 may include an (analog) oscillator and/or filter.

Example of Signal Processing Circuit to which the Present Disclosure is Applied

FIG. 25 illustrates a signal processing circuit for a Tx signal.

Referring to FIG. 25, a signal processing circuit 10000 may include a scrambler 10100, a modulator 10200, a layer mapper 10300, a precoder 10400, a resource mapper 10500, and a signal generator 10600. Although not limited thereto, an operation/function of FIG. 25 may be performed by the processors 1020 and 2020 and/or the transceivers 1060 and 2060 of FIG. 24. Hardware elements of FIG. 25 may be implemented in the processors 1020 and 2020 and/or the transceivers 1060 and 2060 of FIG. 24. For example, blocks 10100 to 10600 may be implemented in the processors 1020 and 2020 of FIG. 24. Further, blocks 10100 to 10500 may be implemented in the processors 1020 and 2020 of FIG. 24, and the block 10600 may be implemented in the transceivers 1060 and 2060 of FIG. 24.

A codeword may be transformed into a radio signal via the signal processing circuit 10000 of FIG. 25. The codeword is an encoded bit sequence of an information block. The information block may include transport blocks (e.g., a UL-SCH transport block, a DL-SCH transport block, etc.). The radio signal may be transmitted on various physical channels (e.g., PUSCH, PDSCH, etc).

Specifically, the codeword may be transformed into a bit sequence scrambled by the scrambler 10100. A scramble sequence used for scrambling may be generated based on an initialization value, and the initialization value may include ID information, etc. of a wireless device. The scrambled bit sequence may be modulated into a modulated symbol sequence by the modulator 10200. A modulation scheme may include pi/2-binary phase shift keying (BPSK), m-phase shift keying (PSK), m-quadrature amplitude modulation (QAM), etc. A complex modulated symbol sequence may be mapped to one or more transport layers by the layer mapper 10300. Modulated symbols of each transport layer may be mapped to a corresponding antenna port(s) by the precoder 10400 (precoding). An output z of the precoder 10400 may be obtained by multiplying an output y of the layer mapper 10300 by a precoding matrix W of N*M, where N is the number of antenna ports, and M is the number of transport layers. The precoder 10400 may perform precoding after performing transform precoding (e.g., DFT transform) on complex modulated symbols. Further, the precoder 10400 may perform the precoding without performing the transform precoding.

The resource mapper 10500 may map the modulated symbols of each antenna port to time-frequency resources. The time-frequency resources may include a plurality of symbols (e.g., CP-OFDMA symbol and DFT-s-OFDMA symbol) in a time domain and include a plurality of subcarriers in a frequency domain. The signal generator 10600 may generate the radio signal from the mapped modulated symbols, and the generated radio signal may be transmitted to another device over each antenna. To this end, the signal generator 10600 may include an inverse fast Fourier transform (IFFT) module, a cyclic prefix (CP) insertor, a digital-to-analog converter (DAC), a frequency uplink converter, and the like.

A signal processing process for a received signal in the wireless device may be configured in the reverse of the signal processing processes 10100 to 10600 of FIG. 25. For example, the wireless device (e.g., 1000 and 2000 of FIG. 24) may receive the radio signal from the outside through the antenna port/transceiver. The received radio signal may be converted into a baseband signal through a signal reconstructor. To this end, the signal reconstructor may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Utilization Example of Wireless Device to which the Present Disclosure is Applied FIG. 26 illustrates another example of a wireless device applied to the present disclosure.

The wireless device may be implemented in various types of devices according to usage examples/services (see FIG. 23). Referring to FIG. 26, wireless devices 1000 and 2000 may correspond to the wireless devices 1000 and 2000 of FIG. 24 and may be comprised of various elements, components, units, and/or modules. For example, the wireless devices 1000 and 2000 may include a communication unit 1100, a control unit 1200, and a memory unit 1300, and an additional element 1400. The communication unit 1100 may include a communication circuit 1120 and a transceiver(s) 1140. For example, the communication circuit 1120 may include one or more processors 1020 and 2020 and/or one or more memories 1040 and 2040 of FIG. 22. For example, the transceiver(s) 1140 may include one or more transceivers 1060 and 2060 and/or one or more antennas 1080 and 2080 of FIG. 22. The control unit 1200 is electrically connected to the communication unit 1100, the memory unit 1300, and the additional element 1400 and controls an overall operation of the wireless device. For example, the control unit 1200 may an electrical/mechanical operation of the wireless device based on a program/code/instruction/information stored in the memory unit 1300. Further, the control unit 1200 may transmit the information stored in the memory unit 1300 to the outside (e.g., other communication devices) through the communication unit 1100 via a wireless/wired interface, or store information received from the outside (e.g., other communication devices) via the wireless/wired interface through the communication unit 1100.

The additional element 1400 may be variously configured according to the type of wireless device. For example, the additional element 1400 may include at least one of a power unit/battery, an input/output (I/O) unit, a driving unit, and a computing unit. Although not limited thereto, the wireless device may be implemented as a form such as the robot 1000a of FIG. 23, the vehicles 1000b-1 and 1000b-2 of FIG. 23, the XR device 1000c of FIG. 23, the portable device 1000d of FIG. 23, the home appliance 1000e of FIG. 23, the IoT device 1000f of FIG. 23, a digital broadcasting terminal, a hologram device, a public safety device, an MTC device, a medical device, a FinTech device (or financial device), a security device, a climate/environment device, an AI server/device 4000 of FIG. 23, the base station 2000 of FIG. 23, a network node, etc. The wireless device may be movable or may be used at a fixed place according to use examples/services.

In FIG. 26, all of various elements, components, units, and/or modules in the wireless devices 1000 and 2000 may be interconnected via the wired interface or at least may be wirelessly connected through the communication unit 1100. For example, the control unit 1200 and the communication 1100 in the wireless devices 1000 and 2000 may be wiredly connected and the control unit 1200 and the first unit (e.g., 1300 or 1400) may be wirelessly connected through the communication unit 1100. Further, each element, component, unit, and/or module in the wireless devices 1000 and 2000 may further include one or more elements. For example, the control unit 1200 may be constituted by one or more processor sets. For example, the control unit 1200 may be configured a set of a communication control processor, an application processor, an electronic control unit (ECU), a graphic processing processor, a memory control processor, etc. As another example, the memory unit 1300 may be configured as a random access memory (RAM), a dynamic RAM (DRAM), a read only memory (ROM), a flash memory, a volatile memory, a non-volatile memory, and/or combinations thereof.

FIG. 27 illustrates a portable device applied to the present disclosure.

The portable device may include a smart phone, a smart pad, a wearable device (e.g., a smart watch, a smart glass), and a portable computer (e.g., a notebook, etc.). The portable device may be referred to as a mobile station (MS), a user terminal (UT), a mobile subscriber station (MSS), a subscriber station (SS), an advanced mobile station (AMS), or a wireless terminal (WT).

Referring to FIG. 27, a portable device 1000 may include an antenna unit 1080, a communication unit 1100, a control unit 1200, a memory unit 1300, a power supply unit 1400a, an interface unit 1400b, and an input/output unit 1400c. The antenna unit 1080 may be configured as a part of the communication unit 1100. The blocks 1100 to 1300/1400a to 1400c correspond to the blocks 1100 to 1300/1400 of FIG. 26, respectively.

The communication unit 1100 may transmit/receive a signal (e.g., data, a control signal, etc.) to/from other wireless devices and base stations. The control unit 1200 may perform various operations by controlling components of the portable device 1000. The control unit 1200 may include an application processor (AP). The memory unit 1300 may store data/parameters/programs/codes/instructions required for driving the portable device 1000. Further, the memory unit 1300 may store input/output data/information, etc. The power supply unit 1400a may supply power to the portable device 1000 and include a wired/wireless charging circuit, a battery, and the like. The interface unit 1400b may support a connection between the portable device 1000 and another external device. The interface unit 1400b may include various ports (e.g., an audio input/output port, a video input/output port) for the connection with the external device. The input/output unit 1400c may receive or output a video information/signal, an audio information/signal, data, and/or information input from a user. The input/output unit 1400c may include a camera, a microphone, a user input unit, a display 1400d, a speaker, and/or a haptic module.

For example, in the case of data communication, the input/output unit 1400c may acquire information/signal (e.g., touch, text, voice, image, video, etc.) input from the user, and the acquired information/signal may be stored in the memory unit 1300. The communication unit 1100 may transform the information/signal stored in the memory into the radio signal and directly transmit the radio signal to another wireless device or transmit the radio signal to the base station. Further, the communication unit 1100 may receive the radio signal from another wireless device or base station and then reconstruct the received radio signal into original information/signal. The reconstructed information/signal may be stored in the memory unit 1300 and then output in various forms (e.g., text, voice, image, video, haptic) through the input/output unit 140c.

The embodiments described above are implemented by combinations of components and features of the present disclosure in predetermined forms. Each component or feature should be considered selectively unless specified separately. Each component or feature can be carried out without being combined with another component or feature. Moreover, some components and/or features are combined with each other and can implement embodiments of the present disclosure. The order of operations described in embodiments of the present disclosure can be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although the present disclosure has described a method of transmitting and receiving power information in a wireless communication system, focusing on examples applying to the 3GPP LTE/LTE-A system, and the 5G system (new RAT system), the present disclosure can be applied to various wireless communication systems other than these systems.

The invention claimed is:

1. A method performed by a user equipment (UE) with multiple panels in a wireless communication, the method comprising:
receiving a power headroom report (PHR) configuration related to two PHR modes for a first power headroom (PH) and a second PH;
identifying whether an event for triggering a PHR occurs based on the PHR configuration;
transmitting a each of the first PH and the second PH,
wherein the first PH for a first physical uplink shared channel (PUSCH) transmission is associated with a first sounding reference signal (SRS) resource set with a first SRS resource set identifier (ID), and the second PH for a second PUSCH transmission is associated with a second SRS resource set with a second SRS resource set ID,
wherein each of the first PH and the second PH are reported for each of the first SRS resource set and the second SRS resource set related to each of the multiple panels for each of multiple transmission and reception points (TRPs).

2. The method of claim 1,
wherein the serving cell of the UE is configured with two transmission reception point (TRP) PUSCH repetition,
wherein, in case that the event occurs, a serving cell of the UE is configured with two PUSCH repetition of the first PUSCH transmission associated with the first SRS resource set and the second PUSCH transmission associated with the second SRS resource set.

3. The method of claim 1, wherein the PHR configuration is a radio resource control (RRC) information element, and the UE is configured with the two PHR mode by the PHR configuration.

4. The method of claim 1, wherein the serving cell of the UE is configured for the two PUSCH transmissions corresponding to the first SRS resource set and the second SRS resource set.

5. The method of claim 1, further comprising:
transmitting, to the BS, one PCMAX for the serving cell of the UE together with the first PH and the second PH, in case that the UE is configured with the two PHR mode with the two PUSCH repetition, wherein the PCMAX is a configured maximum output power of the UE for the serving cell.

6. The method of claim 5, wherein the PCMAX is common for the first PH and the second PH.

7. The method of claim 5,
wherein the first SRS resource ID is lower than the second SRS resource ID, and
wherein, the first PH, the second PH, and the PCMAX are reported to the base station sequentially.

8. The method of claim 1, further comprising:
in case that the UE is configured with a plurality of serving cells, transmitting, to the BS, a PHR including PHs for the plurality of serving cells,
wherein the PHs for the plurality of serving cells are included in ascending order based on an index of the each serving cell, and
wherein the PHs for each serving cell are included in ascending order based on SRS resource ID for each of the PHs for the each serving cell.

9. A user equipment (UE) with multiple panels in a wireless communication, the UE comprising:
a transceiver; and
at least one processor operably coupled to the transceiver, and configured to:
receive a power headroom report (PHR) configuration related to two PHR modes for a first power headroom (PH) and a second PH;
identify whether an event for triggering a PHR occurs based on the PHR configuration;
transmit each of the first PH and the second PH,
wherein the first PH for a first physical uplink shared channel (PUSCH) transmission is associated with a first sounding reference signal (SRS) resource set with a first SRS resource set identifier (ID), and the second PH for a second PUSCH transmission is associated with a second SRS resource set with a second SRS resource set ID, wherein each of the first PH and the second PH are reported for each of the first SRS resource set and the second SRS resource set related to each of the multiple panels for each of multiple transmission and reception points (TRPs).

10. The UE of claim 9,
wherein the serving cell of the UE is configured with two transmission reception point (TRP) PUSCH repetition,
wherein, in case that the event occurs, a serving cell of the UE is configured with two PUSCH repetition of the first PUSCH transmission associated with the first SRS resource set and the second PUSCH transmission associated with the second SRS resource set.

11. The UE of claim 9, wherein the PHR configuration is a radio resource control (RRC) information element, and the UE is configured with the two PHR mode by the PHR configuration.

12. The UE of claim 9, wherein the serving cell of the UE is configured for the two PUSCH transmissions corresponding to the first SRS resource set and the second SRS resource set.

13. The UE of claim 9, wherein the at least one processor is further configured to:
transmit, to the BS, one PCMAX for the serving cell of the UE together with the first PH and the second PH, in case that the UE is configured with the two PHR mode with the two PUSCH repetition, wherein the PCMAX is a configured maximum output power of the UE for the serving cell.

14. The UE of claim 13, wherein the PCMAX is common for the first PH and the second PH.

15. The UE of claim 13,
wherein the first SRS resource ID is lower than the second SRS resource ID, and
wherein, the first PH, the second PH, and the PCMAX are reported to the base station sequentially.

16. The UE of claim 9,
in case that the UE is configured with a plurality of serving cells, transmitting, to the BS, a PHR including PHs for the plurality of serving cells, wherein the PHs for the plurality of serving cells are included in ascending order based on an index of the each serving cell, and
wherein the PHs for each serving cell are included in ascending order based on SRS resource ID for each of the PHs for the each serving cell.

17. A method performed by a base station (BS)-transmission and reception point (TRP) in a wireless communication, the method comprising:
transmitting, to a user equipment (UE) with multiple panels, a power headroom report (PHR) configuration related to two PHR modes for a first power headroom (PH) and a second PH;
receiving, from the UE, the first PH for a first physical uplink shared channel (PUSCH) transmission associated with a first sounding reference signal (SRS) resource set with a first SRS resource set identifier (ID) corresponding to a panel for the TRP,
wherein the second PH for a second PUSCH transmission is associated with a second SRS resource set with a second SRS resource set ID,
wherein each of the first PH and the second PH are related to each of the first SRS resource set and the second SRS resource set related to each of the multiple panels for each of multiple TRPs including the TRP.

18. The TRP of claim 17,
wherein the serving cell of the UE is configured with two transmission reception point (TRP) PUSCH repetition,
wherein, in case that the event occurs, a serving cell of the UE is configured with two PUSCH repetition of the first PUSCH transmission associated with the first SRS resource set and the second PUSCH transmission associated with the second SRS resource set.

19. The TRP of claim 17, wherein the PHR configuration is a radio resource control (RRC) information element, and the UE is configured with the two PHR mode by the PHR configuration.

20. The TRP of claim 17, wherein the serving cell of the UE is configured for the two PUSCH transmissions corresponding to the first SRS resource set and the second SRS resource set.

* * * * *